(12) United States Patent
Wang et al.

(10) Patent No.: US 11,615,215 B2
(45) Date of Patent: Mar. 28, 2023

(54) IMAGE DISPLAY METHOD AND TERMINAL

(71) Applicant: Huawei Technologies Co., Ltd., Shenzhen (CN)

(72) Inventors: Qi Wang, Shenzhen (CN); Wei Huang, Shenzhen (CN); Ping Fang, Shenzhen (CN); Huangwei Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 234 days.

(21) Appl. No.: 17/041,196

(22) PCT Filed: Mar. 31, 2018

(86) PCT No.: PCT/CN2018/081491
§ 371 (c)(1),
(2) Date: Sep. 24, 2020

(87) PCT Pub. No.: WO2019/183984
PCT Pub. Date: Oct. 3, 2019

(65) Prior Publication Data
US 2021/0034793 A1    Feb. 4, 2021

(51) Int. Cl.
*G06F 21/00* (2013.01)
*G06F 21/84* (2013.01)
*G06F 21/60* (2013.01)
*G06F 21/62* (2013.01)
*G06T 5/00* (2006.01)

(52) U.S. Cl.
CPC ............ *G06F 21/84* (2013.01); *G06F 21/604* (2013.01); *G06F 21/6254* (2013.01); *G06T 5/003* (2013.01)

(58) Field of Classification Search
CPC .... G06F 21/84; G06F 21/604; G06F 21/6254; G06F 21/6245; G06F 21/60; G06T 5/003
See application file for complete search history.

(56) References Cited

U.S. PATENT DOCUMENTS 6,370,272 B1    4/2002  Shimizu
9,292,959 B2 *  3/2016  Ge ........................ H04N 9/3185
(Continued)

FOREIGN PATENT DOCUMENTS

CN    101561852 A    10/2009
CN    103077361 A    5/2013
(Continued)

OTHER PUBLICATIONS

Lan Zhang, et al., "Kaleido: You Can Watch It But Cannot Record It," MobiCom'15, Sep. 7-11, 2015, Paris, France, pp. 372-385.

*Primary Examiner* — Ghazal B Shehni
(74) *Attorney, Agent, or Firm* — Conley Rose, P.C.

(57) ABSTRACT

An image display method includes displaying, by a terminal, a first image on a display at a first screen refresh rate, where an output frame rate of the first image is a first frame rate, and displaying, by the terminal, a second image on the display after detecting that a preset condition is met. A noise parameter is superimposed on a part of the second image, the part on which the noise parameter is superimposed is displayed at a second screen refresh rate, and an output frame rate of the part is a second frame rate. The second image includes a plurality of frames of noise-added sub-images. The second frame rate is higher than the first frame rate, and the second screen refresh rate is higher than the first screen refresh rate.

20 Claims, 34 Drawing Sheets

(56) References Cited

U.S. PATENT DOCUMENTS

| | | | |
|---|---|---|---|
| 9,342,621 B1 | 5/2016 | Raphel et al. | |
| 2004/0033060 A1 | 2/2004 | Beaton | |
| 2006/0045361 A1* | 3/2006 | Yokose | H04N 21/23895 |
| | | | 375/E7.255 |
| 2006/0129948 A1 | 6/2006 | Hamzy et al. | |
| 2011/0199624 A1* | 8/2011 | Iwaki | H04N 1/0044 |
| | | | 358/1.9 |
| 2014/0283100 A1 | 9/2014 | Harrison | |
| 2014/0307090 A1* | 10/2014 | Kobayashi | H04N 7/18 |
| | | | 348/143 |
| 2015/0009248 A1* | 1/2015 | Bracalente | G06F 21/16 |
| | | | 345/691 |
| 2015/0371014 A1 | 12/2015 | Raley et al. | |
| 2016/0269623 A1 | 9/2016 | Tang | |
| 2016/0371498 A1* | 12/2016 | Dai Zovi | G06F 21/6209 |

FOREIGN PATENT DOCUMENTS

| | | |
|---|---|---|
| CN | 103237113 A | 8/2013 |
| CN | 104469127 A | 3/2015 |
| CN | 104504350 A | 4/2015 |
| CN | 105308647 A | 2/2016 |
| CN | 105453106 A | 3/2016 |
| CN | 105827820 A | 8/2016 |
| CN | 106295425 A | 1/2017 |
| CN | 106407827 A | 2/2017 |
| CN | 107516486 A | 12/2017 |

\* cited by examiner $n^{th}$ frame of noise-added sub-image (n + k)$^{th}$ frame of noise-added sub-image

IMAGE DISPLAY METHOD AND TERMINAL

CROSS-REFERENCE TO RELATED APPLICATIONS

This application is a U.S. National Stage of International Patent Application No. PCT/CN2018/081491 filed on Mar. 31, 2018, which is hereby incorporated by reference in its entirety.

TECHNICAL FIELD

This application relates to the field of image processing technologies, and in particular, to an image display method and a terminal.

BACKGROUND

As photographing functions of various mobile intelligent devices become increasingly powerful, secret photography behavior on a screen is increasingly hidden and difficult to detect. Therefore, it is very difficult to protect documents in some scenarios in which photographing is prohibited and the documents need to be displayed on a display for presentation and communication. In particular, for important scientific and technical materials, confidential documents, internal information, copyrights of works, or the like, if secret photography cannot be effectively prevented, a severe threat is posed to protection of the important scientific and technical materials, the confidential documents, the internal information, the copyrights of works, or the like.

Most of existing measures for preventing secret photography are to monitor a site and send an alarm for warning. However, these measures are passive and can only be used for warning, but cannot fundamentally prevent the secret photography behavior. Content on the screen still cannot be effectively protected.

SUMMARY

Embodiments of this application provide an image display method and a terminal, to effectively protect displayed content on the terminal and reduce a possibility of leakage of the displayed content on the terminal.

According to a first aspect, an embodiment of this application provides an image display method, applied to a terminal having a display, where the image display method includes: displaying, by the terminal, a first image on the display at a first screen refresh rate, where an output frame rate of the first image is a first frame rate; and displaying, by the terminal, a second image on the display after detecting that a preset condition is met. A noise parameter is superimposed on at least a part of the second image, the at least a part on which the noise parameter is superimposed is displayed at a second screen refresh rate, and an output frame rate of the at least a part is a second frame rate. The second image includes a plurality of frames of noise-added sub-images. The second frame rate is higher than the first frame rate, and the second screen refresh rate is higher than the first screen refresh rate.

In this embodiment of this application, after detecting that the preset condition is met, the terminal may display, at the second screen refresh rate, the at least a part (the noise parameter is superimposed on the at least a part) of the second image including the plurality of frames of noise-added sub-images. The output frame rate of the at least a part is the second frame rate. In addition, the second screen refresh rate is higher than the first screen refresh rate, and the second frame rate is higher than the first frame rate. In this way, an image of the at least a part of the second image may be divided into a plurality of frames of noise-added sub-images and output frame by frame, and a secret photography device photographs a noise-added sub-image when secretly photographing a screen of the terminal. This can reduce a possibility of leakage of displayed content on the terminal, and effectively protect the displayed content on the terminal.

In a possible design manner of the first aspect, the detecting that a preset condition is met may be that the terminal detects an operation of enabling a noise addition option by a user. Specifically, the displaying, by the terminal, a second image on the display after detecting that a preset condition is met includes: entering, by the terminal, a noise addition mode in response to the operation of enabling the noise addition option, and displaying, by the terminal, the second image on the display. The noise addition option may be displayed on a setting screen or a notification panel of the terminal.

In another possible design manner of the first aspect, the detecting that a preset condition is met may be that the second image includes a sensitive feature. Specifically, the displaying, by the terminal, a second image on the display after detecting that a preset condition is met includes: when the second image includes the sensitive feature, automatically entering, by the terminal, a noise addition mode, and displaying the second image on the display. The sensitive feature may include at least one of a preset control, a currency symbol, and a preset text, the preset control includes at least one of a password input box, a user name input box, and an identity card number input box, and the preset text includes at least one of a balance, a password, a salary, and an account.

In another possible design manner of the first aspect, the detecting that a preset condition is met may be that the second image is a screen of an application of a preset type. Specifically, the displaying, by the terminal, a second image on the display after detecting that a preset condition is met includes: when displaying the screen of the application of the preset type, automatically entering, by the terminal, a noise addition mode, and displaying the second image on the display. The application of the preset type includes at least one of a bank-type application, a payment-type application, and a communication-type application.

In another possible design manner of the first aspect, the detecting that a preset condition is met may be that current scenario information meets the preset condition. Specifically, the displaying, by the terminal, a second image on the display after detecting that a preset condition is met includes: automatically entering, by the terminal, a noise addition mode when the current scenario information meets the preset condition. The current scenario information includes at least one of time information, address information, and environment information. The time information is used to indicate a current time, and the address information is used to indicate a current location of the terminal, for example, a home, a company, or a shopping mall. The environment information may be used to indicate a quantity of people around the terminal, whether there is a stranger around the terminal, and the like. The terminal may determine, through sound recognition or by capturing an image by using a camera, the quantity of people around the terminal and whether there is a stranger around the terminal.

In another possible design manner of the first aspect, the noise parameter is superimposed on the sensitive feature of the second image, and the at least a part of the second image may be at least one sensitive area (an area including the sensitive feature) in the second image. That the noise parameter is superimposed on the at least a part of the second image may be specifically: the noise parameter is superimposed on the at least one sensitive area in the second image.

In another possible design manner of the first aspect, before the displaying, by the terminal, the second image on the display, the method in this embodiment of this application further includes: generating, by the terminal, N frames of first noise-added sub-images based on an image of the sensitive area. The N frames of first noise-added sub-images are displayed in the sensitive area at the second screen refresh rate, an output frame rate of the N frames of first noise-added sub-images is the second frame rate, the second frame rate is N times the first frame rate, the second screen refresh rate is N times the first screen refresh rate, and N is an integer greater than or equal to 2.

Optionally, N is a preconfigured fixed value. N may be any natural number greater than 2. For example, N=4.

Optionally, to avoid a case in which when N is a preconfigured fixed value, a secret photography device traces a rule of performing an operation on an image by the terminal to determine the fixed value, and performs restoration processing on a secretly photographed noise-added image, N in this embodiment of this application may randomly change within a specific range.

Optionally, N may be determined based on an amount of remaining electricity of the terminal. A larger value of N indicates more noise-added sub-images displayed by the terminal and higher power consumption of displaying the images by the terminal. Therefore, the terminal may determine a value of N based on the amount of remaining electricity. Specifically, the generating, by the terminal, N frames of first noise-added sub-images based on an image of the sensitive area includes: when an amount of remaining electricity of the terminal is greater than or equal to a first threshold, generating, by the terminal, N1 frames of first noise-added sub-images based on the image of the sensitive area; or when an amount of remaining electricity of the terminal is less than the first threshold, generating, by the terminal, N2 frames of first noise-added sub-images based on the image of the sensitive area, where N1>N2.

Optionally, N may be determined based on a sensitivity degree of the sensitive area. In other words, N may be determined based on a sensitivity degree of the sensitive feature in the sensitive area. The terminal may further store a sensitivity degree of each sensitive feature, and sensitivity degrees of different sensitive features are different. Specifically, the generating, by the terminal, N frames of first noise-added sub-images based on an image of the sensitive area includes: generating, by the terminal, the N frames of first noise-added sub-images based on a sensitivity degree of the sensitive area. A plurality of sensitive areas including different sensitive features have different sensitivity degrees. A higher sensitivity degree of the sensitive area indicates a larger value of N.

Optionally, N may be determined based on an amount of remaining electricity of the terminal and a sensitivity degree of the sensitive area. In this case, when the amount of remaining electricity of the terminal is fixed, a higher sensitivity degree of the sensitive area indicates a larger quantity N of frames of noise-added sub-images generated for the sensitive area. When the sensitivity degree of the sensitive area is fixed, a larger amount of remaining electricity of the terminal indicates a larger quantity N of frames of noise-added sub-images generated for the sensitive area.

In another possible design manner of the first aspect, the generating, by the terminal, N frames of first noise-added sub-images based on an image of the sensitive area includes: determining, by the terminal, a pixel value of each pixel in the image of the sensitive area; determining, by the terminal, at least one group of noise parameters of the sensitive area, where each group of noise parameters includes N noise parameters, and a sum of the N noise parameters is zero, or a sum of the N noise parameters falls within a preset parameter range; and calculating, by the terminal, a pixel value of each pixel in one frame of noise-added sub-image by using $a_{n,i}=A_i+W_{n,i}$, to obtain the frame of noise-added sub-image.

$A_i$ is a pixel value of a pixel i in the image of the sensitive area, $i \in \{1, 2, \ldots, Q\}$, Q is a total quantity of pixels in the image of the sensitive area, $W_{n,i}$ is a noise parameter of an $i^{th}$ pixel in an $n^{th}$ frame of first noise-added sub-image, $n \in \{1, 2, \ldots, N\}$, $$\sum_{n=1}^{N} W_{n,i} = 0,$$

and $a_{n,i}$ is a pixel value of the pixel i in the $n^{th}$ frame of first noise-added sub-image.

It should be noted that, in this embodiment of this application, noise parameters used for all pixels in one frame of first noise-added sub-image may be the same. For example, in the $n^{th}$ frame of first noise-added sub-image, the noise parameter $W_{n,i}$ of the $i^{th}$ pixel is the same as a noise parameter $W_{n,i+k}$ of an $(i+k)^{th}$ pixel. Alternatively, noise parameters used for different pixels in one frame of first noise-added sub-image may be different. For example, in the $n^{th}$ frame of first noise-added sub-image, the noise parameter $W_{n,i}$ of the $i^{th}$ pixel is different from a noise parameter $W_{n,i+k}$ of an $(i+k)^{th}$ pixel.

It may be understood that, for noise addition processing performed on the image of the sensitive area in the second image, a sum of each of the at least one group of used noise parameters is zero, or a sum of each of the at least one group of used noise parameters is within a preset parameter range. For example, $\{W_{1,i}, W_{2,i}, \ldots, W_{n,i}, \ldots, \text{and } W_{N,i}\}$ meets $$\sum_{n=1}^{N} W_{n,i} = 0.$$

Therefore, an average value $\overline{A_i}$ of pixel values of pixels i in the N frames of first noise-added sub-images is $A_i$. $A_i$ is a pixel value of the pixel i in the sensitive area before noise addition processing is performed. In this way, based on a low-pass effect of human vision, human eyes cannot perceive a difference between an image obtained after noise addition processing and an image existing before noise addition processing, so that it can be ensured that the image obtained after noise addition processing and the image existing before noise addition processing are the same from a perspective of human eyes, and visual experience of a user can be ensured.

In another possible design manner of the first aspect, the pixel value of the pixel includes a color value of a color component of the pixel, and the color component includes three basic colors: red, green, and blue (Red Green Blue, RGB). A method in which the terminal calculates the pixel value $a_{n,i}$ of the pixel i in the $n^{th}$ frame of first noise-added sub-image includes: calculating, by the terminal, color components of the $i^{th}$ pixel in the $n^{th}$ frame of first noise-added sub-image by using $R_{n,i}=R_i+W_{n,i}$, $G_{n,i}=G_i+W_{n,i}$ and $B_{n,i}=B_i+W_{n,i}$, where $R_i$, $G_i$, and $B_i$ are color values of color components of the pixel i before noise addition processing, $R_{n,i}$ is a color value obtained after noise addition processing is performed based on $R_i$, $G_{n,i}$ is a color value obtained after noise addition processing is performed based on $G_i$, and $B_{n,i}$ is a color value obtained after noise addition processing is performed based on $B_i$; and determining the pixel value $a_{n,i}$ of the pixel i in the $n^{th}$ frame of first noise-added sub-image according to $R_{n,i}$, $G_{n,i}$, and $B_{n,i}$.

In another possible design manner of the first aspect, due to a limitation of hardware of the display of the terminal, a range of a pixel value $A_i$ of a pixel (for example, the pixel i) in the image displayed by the terminal is [0, P]. Therefore, it needs to be ensured that a range of a pixel value of each pixel in each frame of first noise-added sub-image obtained after noise addition processing is [0, P]. For example, $0 \leq a_{n,i} \leq P$. According to $0 \leq a_{n,i} \leq P$, and $$\sum_{n=1}^{N} W_{n,i} = 0,$$

it may be determined that an $n^{th}$ noise parameter $W_{n,i}$ of the sensitive area meets the following condition:

$$\max\left(-A_i, (N-n)(A_i - P) - \sum_{k=1}^{n-1} W_{k,i}\right) \leq$$

$$W_{n,i} \leq \min\left(P - A_i, (N-n)A_i - \sum_{k=1}^{n-1} W_{k,i}\right).$$

max(x, y) indicates that a maximum value in x and y is selected, min(x, y) indicates that a minimum value in x and y is selected, and $$\sum_{k=1}^{n-1} W_{k,i}$$

is used to represent a sum of noise parameters of $i^{th}$ pixels in first n−1 frames of first noise-added sub-images in the N frames of noise-added sub-images.

In another possible design manner of the first aspect, the N noise parameters are random values, or the N noise parameters meet even distribution or Gaussian distribution.

In another possible design manner of the first aspect, a fluctuation of the N noise parameters is directly proportional to the sensitivity degree of the sensitive area, and the fluctuation of the N noise parameters is represented by a variance of pixel values of pixels i in the N frames of first noise-added sub-images. For example, the fluctuation of the N noise parameters $\{W_{1,i}, W_{2,i}, \ldots, W_{n,i}, \ldots,$ and $W_{N,i}\}$ for the $i^{th}$ pixels is directly proportional to the sensitivity degree of the sensitive area. The fluctuation of the N noise parameters is represented by the variance of the pixel values of the pixels i in the N frames of first noise-added sub-images. The variance of the pixel values of the pixels i in the N frames of noise-added sub-images is:

$$s^2 = \frac{1}{N} \times \sum_{n=1}^{N} W_{n,i}^2.$$

If the sensitivity degree of the sensitive area is higher, the fluctuation of the group of noise parameters $\{W_{1,i}, W_{2,i}, \ldots, W_{n,i}, \ldots,$ and $W_{N,i}\}$ used by the terminal to perform noise addition processing on the $i^{th}$ pixels in the sensitive area is larger, in other words, the variance $s^2$ of the pixel values of the pixels i in the N frames of first noise-added sub-images is larger.

In another possible design manner of the first aspect, an insensitive area of the second image is displayed at the first screen refresh rate, and an output frame rate of the insensitive area is the first frame rate. In this way, processing and screen refresh rate adjustment need to be performed on only the sensitive area, so that an effect of preventing secret photography can be achieved with relatively low complexity and relatively low power consumption.

In another possible design manner of the first aspect, an insensitive area of the second image is displayed at the second screen refresh rate, and an output frame rate of the insensitive area is the second frame rate. The insensitive area is an area other than the sensitive area in the second image.

The terminal may output N frames of noise-added sub-images in the sensitive area and the insensitive area at a same screen refresh rate and a same frame rate. In other words, the terminal may display all content of the second image at a same screen refresh rate (namely, the second screen refresh rate) and a same frame rate (the second frame rate), and a screen does not need to support different refresh rates in different display areas. This greatly reduces a requirement for the screen. In addition, the terminal may scramble the sensitive area and the insensitive area at different degrees.

In another possible design manner of the first aspect, after the terminal enters the noise addition mode and before the terminal displays the second image on the display, the method in this embodiment of this application further includes: generating, by the terminal, N frames of second noise-added sub-images based on an image of the insensitive area. The N frames of second noise-added sub-images are displayed in the insensitive area at the second screen refresh rate, an output frame rate of the N frames of second noise-added sub-images is the second frame rate, the second frame rate is N times the first frame rate, the second screen refresh rate is N times the first screen refresh rate, and N is an integer greater than or equal to 2. A noise parameter used by the terminal to generate the N frames of second noise-added sub-images is different from a noise parameter used by the terminal to generate the N frames of first noise-added sub-images.

In a possible design manner of the first aspect, a method in which the terminal determines the at least one sensitive area of the second image may include: determining, by the terminal, that the second image includes the sensitive feature; and determining, by the terminal, the at least one sensitive area based on a location of the sensitive feature in the second image.

For example, that the terminal determines that the second image includes the sensitive feature includes: when the second image is an image of an application of a preset type in the terminal, an image of an encrypted document, an image of an encrypted picture, or an image of a private video, the terminal may determine that the second image includes the sensitive feature; or the terminal identifies the second image to be displayed, obtains one or more image features included in the second image, and compares the obtained one or more image features with a pre-stored sensitive feature, and when the obtained one or more image features include an image feature that matches the sensitive feature, the terminal may determine that the second image includes the sensitive feature.

In another possible design manner of the first aspect, to more clearly identify the sensitive area in the second image, the terminal may segment the second image into M sub-areas, and identify an image of each sub-area, to determine whether a corresponding sub-area is the sensitive area. Specifically, a method in which the terminal determines the at least one sensitive area of the second image may include: segmenting, by the terminal, the second image into M sub-areas, where M≥2; identifying images of the M areas to extract an image feature of each sub-area; for each sub-area, when an image feature of the sub-area includes the sensitive feature, determining the sub-area as a sensitive area. M is a preconfigured fixed value, or M is determined based on a processing capability of the terminal and an amount of remaining electricity of the terminal.

The processing capability of the terminal may be specifically a processing capability of a processor of the terminal, and the processor of the terminal may include a CPU and a graphics processing unit (Graphics Processing Unit, GPU). The processing capability of the processor may include parameters such as a dominant frequency, a core quantity (for example, a multi-core processor), a bit quantity, and a cache of the processor.

According to a second aspect, an embodiment of this application provides a terminal, where the terminal includes a display unit and a control unit. The display unit is configured to display a first image at a first screen refresh rate, where an output frame rate of the first image is a first frame rate. The control unit is configured to detect that the terminal meets a preset condition. The display unit is further configured to display a second image after the control unit detects that the preset condition is met, where a noise parameter is superimposed on at least a part of the second image displayed by the display unit, the at least a part is displayed at a second screen refresh rate, an output frame rate of the at least a part is a second frame rate, and the second image displayed by the display unit includes a plurality of frames of noise-added sub-images. The second frame rate is higher than the first frame rate, and the second screen refresh rate is higher than the first screen refresh rate.

In a possible design of the second aspect, the control unit is specifically configured to control, in response to an operation of enabling a noise addition option, the terminal to enter a noise addition mode.

In another possible design of the second aspect, the control unit is specifically configured to: when the second image includes a sensitive feature, control the terminal to automatically enter a noise addition mode.

In another possible design of the second aspect, the control unit is specifically configured to: when the display unit displays a screen of an application of a preset type, control the terminal to automatically enter a noise addition mode. The application of the preset type includes at least one of a bank-type application, a payment-type application, and a communication-type application.

In another possible design of the second aspect, the noise parameter is superimposed on the sensitive feature of the second image displayed by the display unit, the at least a part includes at least one sensitive area of the second image, and the sensitive area includes the sensitive feature.

In another possible design of the second aspect, the terminal further includes a generation unit. The generation unit is configured to generate N frames of first noise-added sub-images based on an image of the sensitive area. The N frames of first noise-added sub-images are displayed in the sensitive area at the second screen refresh rate, an output frame rate of the N frames of first noise-added sub-images is the second frame rate, the second frame rate is N times the first frame rate, the second screen refresh rate is N times the first screen refresh rate, and N is an integer greater than or equal to 2.

In another possible design of the second aspect, the generation unit is specifically configured to: when an amount of remaining electricity of the terminal is greater than or equal to a first threshold, generate N1 frames of first noise-added sub-images based on the image of the sensitive area; or when an amount of remaining electricity of the terminal is less than the first threshold, generate N2 frames of first noise-added sub-images based on the image of the sensitive area, where N1>N2.

In another possible design of the second aspect, the generation unit is specifically configured to generate the N frames of first noise-added sub-images based on a sensitivity degree of the sensitive area, the sensitivity degree is determined based on the sensitive feature of the sensitive area, and a plurality of sensitive areas including different sensitive features have different sensitivity degrees.

In another possible design of the second aspect, the display unit displays an image of an insensitive area of the second image at the first screen refresh rate, and an output frame rate of the insensitive area is the first frame rate.

In another possible design of the second aspect, the display unit displays an image of an insensitive area of the second image at the second screen refresh rate, and an output frame rate of the insensitive area is the second frame rate.

In another possible design of the second aspect, the generation unit is further configured to generate N frames of second noise-added sub-images based on the image of the insensitive area. The N frames of second noise-added sub-images are displayed in the insensitive area at the second screen refresh rate, an output frame rate of the N frames of second noise-added sub-images is the second frame rate, the second frame rate is N times the first frame rate, the second screen refresh rate is N times the first screen refresh rate, and N is an integer greater than or equal to 2. A noise parameter used by the generation unit to generate the N frames of second noise-added sub-images is different from a noise parameter used by the terminal to generate the N frames of first noise-added sub-images.

According to a third aspect, an embodiment of this application provides a terminal, where the terminal includes a processor, a memory, and a display, the memory and the display are coupled to the processor, the display is configured to display an image, the memory includes a non-volatile storage medium, the memory is configured to store computer program code, the computer program code includes a computer instruction, and when the processor executes the computer instruction, the processor is configured to display a first image on the display at a first screen refresh rate, where an output frame rate of the first image is a first frame rate; and the processor is further configured to display a second image on the display after detecting that a preset condition is met, where a noise parameter is superimposed on at least a part of the second image displayed on the display, the at least a part is displayed at a second screen refresh rate, an output frame rate of the at least a part is a second frame rate, the second image includes a plurality of frames of noise-added sub-images, the second frame rate is higher than the first frame rate, and the second screen refresh rate is higher than the first screen refresh rate.

In a possible design of the third aspect, that the processor is configured to display a second image on the display after detecting that a preset condition is met includes: the processor is specifically configured to: enter a noise addition mode in response to an operation of enabling a noise addition option, and display the second image on the display.

In another possible design of the third aspect, that the processor is configured to display a second image on the display after detecting that a preset condition is met includes: the processor is specifically configured to: when the second image includes a sensitive feature, automatically enter a noise addition mode, and display the second image on the display.

In a possible design of the third aspect, that the processor is configured to display a second image on the display after detecting that a preset condition is met includes: the processor is specifically configured to: when the display displays a screen of an application of a preset type, automatically enter a noise addition mode, and display the second image on the display.

In a possible design of the third aspect, the noise parameter is superimposed on the sensitive feature of the second image displayed by the display, the at least a part includes at least one sensitive area of the second image, and the sensitive area includes the sensitive feature.

In a possible design of the third aspect, the processor is further configured to generate N frames of first noise-added sub-images based on an image of the sensitive area before the display displays the second image. The N frames of first noise-added sub-images displayed on the display are displayed in the sensitive area at the second screen refresh rate, an output frame rate of the N frames of first noise-added sub-images is the second frame rate, the second frame rate is N times the first frame rate, the second screen refresh rate is N times the first screen refresh rate, and N is an integer greater than or equal to 2.

In a possible design of the third aspect, that the processor is configured to generate N frames of first noise-added sub-images based on an image of the sensitive area includes: the processor is specifically configured to: when an amount of remaining electricity of the terminal is greater than or equal to a first threshold, generate N1 frames of first noise-added sub-images based on the image of the sensitive area; or when an amount of remaining electricity of the terminal is less than the first threshold, generate N2 frames of first noise-added sub-images based on the image of the sensitive area, where N1>N2.

In a possible design of the third aspect, that the processor is configured to generate N frames of first noise-added sub-images based on an image of the sensitive area includes: the processor is specifically configured to generate the N frames of first noise-added sub-images based on a sensitivity degree of the sensitive area, where the sensitivity degree is determined based on the sensitive feature of the sensitive area.

In a possible design of the third aspect, that the processor is configured to generate N frames of first noise-added sub-images based on an image of the sensitive area includes: the processor is specifically configured to: determine a pixel value of each pixel in the image of the sensitive area; determine at least one group of noise parameters of the sensitive area, where each group of noise parameters includes N noise parameters, and a sum of the N noise parameters is zero, or a sum of the N noise parameters falls within a preset parameter range; and calculate a pixel value of each pixel in one frame of noise-added sub-image by using $a_{n,\,i}=A_i+W_{n,\,i}$, to obtain the frame of noise-added sub-image.

In a possible design of the third aspect, the processor displays an image of an insensitive area of the second image on the display at the first screen refresh rate, and an output frame rate of the insensitive area is the first frame rate.

In a possible design of the third aspect, the processor displays an image of an insensitive area of the second image on the display at the second screen refresh rate, and an output frame rate of the insensitive area is the second frame rate.

In a possible design of the third aspect, the processor is further configured to generate N frames of second noise-added sub-images based on the image of the insensitive area before the display displays the second image, the N frames of second noise-added sub-images displayed on the display are displayed in the insensitive area at the second screen refresh rate, an output frame rate of the N frames of second noise-added sub-images is the second frame rate, the second frame rate is N times the first frame rate, the second screen refresh rate is N times the first screen refresh rate, and N is an integer greater than or equal to 2. A noise parameter used by the processor to generate the N frames of second noise-added sub-images is different from a noise parameter used by the terminal to generate the N frames of first noise-added sub-images.

It should be noted that for specific content of the sensitive feature, the application of the preset type, $A_i$, Q, $W_{n,\,i}$, $$\sum_{n=1}^{N} W_{n,i} = 0,$$

$a_{n,\,i}$, and the insensitive area in the possible design manners of the second aspect and the third aspect, refer to the description in the possible design manner of the first aspect. Details are not described herein again in this embodiment of this application.

According to a fourth aspect, an embodiment of this application provides a control device, where the control device includes a processor and a memory, the memory is configured to store computer program code, the computer program code includes a computer instruction, and when the processor executes the computer instruction, the control device performs the method according to any one of the first aspect and the possible design manners of the first aspect in the embodiments of this application.

According to a fifth aspect, an embodiment of this application provides a computer storage medium, where the computer storage medium includes a computer instruction, and when the computer instruction is run on a terminal, the terminal is enabled to perform the method according to any one of the first aspect and the possible design manners of the first aspect in the embodiments of this application.

According to a sixth aspect, an embodiment of this application provides a computer program product. When the computer program product is run on a computer, the computer is enabled to perform the method according to any one of the first aspect and the possible design manners of the first aspect in the embodiments of this application.

In addition, for technical effects brought by the second aspect, the third aspect, any design manner of the second aspect and the third aspect, the fourth aspect, the fifth aspect, and the sixth aspect, refer to technical effects brought by different design manners of the first aspect. Details are not described herein again.

DESCRIPTION OF EMBODIMENTS

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the description of this application, unless otherwise stated, "a plurality of" means two or more than two.

An image display method provided in the embodiments of this application may be applied to a process in which a terminal displays an image. The image in the embodiments of this application may include an image that can be displayed by the terminal, for example, an image in a picture, an image in a video, and an application screen of the terminal.

In the embodiments of this application, after entering a noise addition mode, the terminal may adjust an output frame rate and a screen refresh rate that are used by the terminal to display the image, and output a plurality of frames of noise-added sub-images of the image frame by frame by using an adjusted output frame rate and screen refresh rate. Even if a secret photography device photographs displayed content on the terminal, the secret photography device photographs a frame of noise-added sub-image, but cannot obtain a frame of complete image. Therefore, the displayed content on the terminal can be effectively protected from being secretly photographed, and a possibility of leakage of the displayed content on the terminal can be reduced. The noise addition mode in the embodiments of this application is a working mode of the terminal when the terminal performs the method in the embodiments of this application. When working in the foregoing noise addition mode, the terminal may perform the method in the embodiments of this application, to perform noise addition processing on the image displayed by the terminal. The noise addition mode may also be referred to as a noise addition display mode, an image protection mode, or the like. This is not limited in the embodiments of this application.

For example, the terminal in the embodiments of this application may be a device having a display function (including a display), for example, a portable terminal (such as a mobile phone 100 shown in FIG. 1), a notebook computer, a personal computer (Personal Computer, PC), a wearable electronic device (for example, a smartwatch), a tablet computer, an automated teller machine (Automated Teller Machine, ATM), an augmented reality (augmented reality, AR) device/a virtual reality (virtual reality, VR)

device, or an in-vehicle computer. A specific form of the terminal is not specifically limited in the following embodiments.

Figure 1:
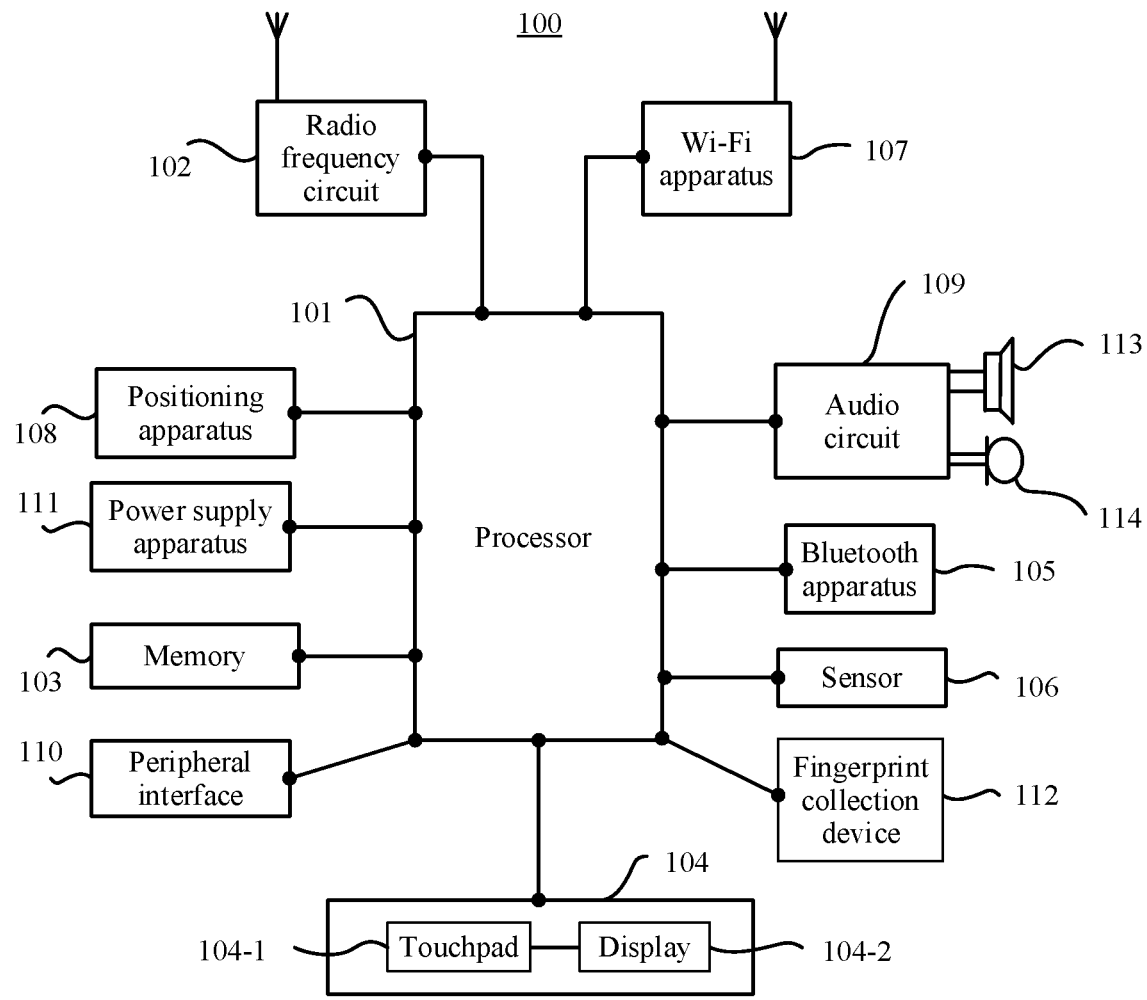
FIG. 1 is a schematic diagram of a hardware structure of a mobile phone according to an embodiment of this application.

As shown in FIG. 1, the mobile phone 100 is used as an example of the terminal. The mobile phone 100 may specifically include components such as a processor 101, a radio frequency (Radio Frequency, RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power supply apparatus 111. These components may perform communication by using one or more communications buses or signal cables (not shown in FIG. 1). A person skilled in the art may understand that a hardware structure shown in FIG. 1 does not constitute a limitation on the mobile phone, and the mobile phone 100 may include more or fewer components than those shown in the figure, may combine some components, or may have different component arrangements.

The following describes in detail the components of the mobile phone 100 with reference to FIG. 1.

The processor 101 is a control center of the mobile phone 100. The processor 101 is connected to all parts of the mobile phone 100 by using various interfaces and cables, and performs various functions of the mobile phone 100 and processes data by running or executing an application program stored in the memory 103, and invoking data stored in the memory 103. In some embodiments, the processor 101 may include one or more processing units. The processor 101 in this embodiment of this application may include a central processing unit (Central Processing Unit, CPU) and a graphics processing unit (Graphics Processing Unit, GPU).

The radio frequency circuit 102 may be configured to receive and send radio signals. Particularly, after receiving downlink data from a base station, the radio frequency circuit 102 may send the downlink data to the processor 101 for processing, and sends related uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. Any communications standard or protocol may be used for the wireless communication, and includes but is not limited to a global system for mobile communications, a general packet radio service, code division multiple access, wideband code division multiple access, long term evolution, and the like.

The memory 103 is configured to store the application program and the data. The processor 101 performs various functions of the mobile phone 100 and processes data by running the application program and the data that are stored in the memory 103. The memory 103 mainly includes a program storage area and a data storage area. The program storage area may store an operating system, and an application program required by at least one function (for example, a sound playing function or an image playing function). The data storage area may store data (for example, audio data or a phone book) created based on use of the mobile phone 100. In addition, the memory 103 may include a high-speed random access memory (Random Access Memory, RAM), and may further include a non-volatile memory such as a magnetic disk storage device, a flash memory device, or another volatile solid-state memory device. The memory 103 may store various operating systems. The memory 103 may be standalone, and is connected to the processor 101 by using the communications bus; or the memory 103 may be integrated with the processor 101.

The touchscreen 104 may specifically include a touchpad 104-1 and a display 104-2.

The touchpad 104-1 can collect a touch event performed by a user of the mobile phone 100 on or near the mobile phone 100 (for example, an operation performed by the user on the touchpad 104-1 or near the touchpad 104-1 by using any suitable object such as a finger or a stylus), and send collected touch information to another component (such as the processor 101). The touch event of the user near the touchpad 104-1 may be referred to as floating touch control. The floating touch control may mean that the user does not need to directly touch the touchpad to select, move, or drag a target (for example, an icon), but instead, the user needs only to be near a device to implement a desired function. In addition, the touchpad 104-1 may be implemented in a plurality of types such as a resistive type, a capacitive type, an infrared type, and a surface acoustic wave type.

The display (also referred to as a display) 104-2 may be configured to display information entered by the user or information provided for the user, and various menus of the mobile phone 100. The display 104-2 may be configured in a form such as a liquid crystal display or an organic light emitting diode. The touchpad 104-1 may cover the display 104-2. When detecting a touch event on or near the touchpad 104-1, the touchpad 104-1 transfers the touch event to the processor 101 to determine a type of the touch event. Then, the processor 101 can provide corresponding visual output on the display 104-2 based on the type of the touch event.

It should be noted that, although the touchpad 104-1 and the display 104-2 are used as two independent components to implement input and output functions of the mobile phone 100 in FIG. 1, the touchpad 104-1 and the display 104-2 may be integrated to implement the input and output functions of the mobile phone 100 in some embodiments. It may be understood that the touchscreen 104 is formed by stacking a plurality of layers of materials. In this embodiment of this application, only the touchpad (layer) and the display (layer) are described, and another layer is not recorded in this embodiment of this application. In addition, the touchpad 104-1 may be disposed on a front side of the mobile phone 100 in a full panel form, and the display 104-2 may also be disposed on the front side of the mobile phone 100 in a full panel form. In this way, a bezel-less structure can be implemented on the front side of the mobile phone.

In addition, the mobile phone 100 may further have a fingerprint recognition function. For example, a fingerprint collection device (namely, a fingerprint sensor) 112 may be configured on a rear side of the mobile phone 100 (for example, below a rear-facing camera), or a fingerprint collection device 112 may be configured on the front side of the mobile phone 100 (for example, below the touchscreen 104). For another example, a fingerprint collection device 112 may be disposed on the touchscreen 104 to implement the fingerprint recognition function. In other words, the fingerprint collection device 112 and the touchscreen 104 may be integrated to implement the fingerprint recognition function of the mobile phone 100. In this case, the fingerprint collection device 112 is disposed on the touchscreen 104, and may be a part of the touchscreen 104, or may be disposed on the touchscreen 104 in another manner. A main component of the fingerprint collection device 112 in this embodiment of this application is a fingerprint sensor. The fingerprint sensor may use any type of sensing technology, which includes but is not limited to an optical sensing technology, a capacitive sensing technology, a piezoelectric sensing technology, an ultrasonic sensing technology, or the like.

The mobile phone 100 may further include the Bluetooth apparatus 105, configured to implement short-range data exchange between the mobile phone 100 and another device (for example, a mobile phone or a smartwatch). In this embodiment of this application, the Bluetooth apparatus may be an integrated circuit, a Bluetooth chip, or the like.

The one or more sensors 106 include a sensor configured to detect a press operation of the user on a side edge and a slide operation of the user on the side edge.

Certainly, the one or more sensors 106 include but are not limited to the foregoing sensor. For example, the one or more sensors 106 may further include a light sensor, a motion sensor, and another sensor. Specifically, the light sensor may include an ambient light sensor and a proximity sensor. The ambient light sensor may adjust luminance of the display of the touchscreen 104 based on intensity of ambient light. The proximity sensor may power off the display when the mobile phone 100 approaches an ear. As one type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between a landscape screen and a vertical screen, a related game, and magnetometer posture calibration), a function related to vibration recognition (such as a pedometer and a knock), and the like. Other sensors such as a gyroscope, a barometer, a hygrometer, a thermometer, and an infrared sensor may be further configured in the mobile phone 100. Details are not described herein.

The Wi-Fi apparatus 107 is configured to provide network access complying with a Wi-Fi related standard and protocol for the mobile phone 100. By using the Wi-Fi apparatus 107, the mobile phone 100 may access a Wi-Fi hotspot, and further help the user send and receive e-mails, browse web pages, access streaming media, and the like. The Wi-Fi apparatus 107 provides wireless broadband internet access for the user. In some other embodiments, the Wi-Fi apparatus 107 may also be used as a Wi-Fi wireless access point, to provide Wi-Fi network access for another device.

The positioning apparatus 108 is configured to provide a geographic location for the mobile phone 100. It may be understood that the positioning apparatus 108 may be specifically a receiver of a positioning system such as a global positioning system (Global Positioning System, GPS), a BeiDou navigation satellite system, or a Russian GLONASS.

After receiving the geographic location sent by the positioning system, the positioning apparatus 108 sends the information to the processor 101 for processing, or sends the information to the memory 103 for storage. In some other embodiments, the positioning apparatus 108 may be alternatively a receiver of an assisted global positioning system (Assisted Global Positioning System, AGPS). The AGPS system assists the positioning apparatus 108 as an assisted server, to implement ranging and positioning services. In this case, the assisted positioning server communicates with a device such as the positioning apparatus 108 (namely, the GPS receiver) of the mobile phone 100 through a wireless communications network, to provide positioning assistance. Alternatively, in some other embodiments, the positioning apparatus 108 may be a positioning technology based on a Wi-Fi hotspot. Because each Wi-Fi hotspot has a globally unique media access control (Media Access Control, MAC) address, the device may scan and capture broadcast signals of nearby Wi-Fi hotspots when Wi-Fi is enabled, and therefore can obtain MAC addresses broadcast by the Wi-Fi hotspots; the device sends, to a location server by using a wireless communications network, data (for example, the MAC addresses) that can identify the Wi-Fi hotspots; and the location server retrieves a geographic location of each Wi-Fi hotspot, calculates the geographic location of the device with reference to strength of the Wi-Fi broadcast signals, and sends the geographic location to the positioning apparatus 108 of the device.

The audio circuit 109, a speaker 113, and a microphone 114 may provide an audio interface between the user and the mobile phone 100. The audio circuit 109 may convert received audio data into an electrical signal and transmit the electrical signal to the speaker 113. The speaker 113 converts the electrical signal into a sound signal for output. In addition, the microphone 114 converts a collected sound signal into an electrical signal. The audio circuit 109 receives the electrical signal, converts the electrical signal into audio data, and outputs the audio data to the RF circuit 102 to send the audio data to another mobile phone, or outputs the audio data to the memory 103 for further processing.

The peripheral interface 110 is configured to provide various interfaces for an external input/output device (for example, a keyboard, a mouse, an external display, an external memory, or a subscriber identification module card). For example, the mobile phone 100 is connected to the mouse by using a universal serial bus (Universal Serial Bus, USB) interface, and the mobile phone 100 is connected, by using a metal contact on a card slot of the subscriber identification module card, to the subscriber identification module (Subscriber Identification Module, SIM) card provided by a telecommunications operator. The peripheral interface 110 may be configured to couple the external input/output device to the processor 101 and the memory 103.

In this embodiment of the present invention, the mobile phone 100 may communicate with another device in a device group by using the peripheral interface 110, for example, may receive, by using the peripheral interface 110, display data sent by another device, and display the display data. This is not limited in this embodiment of the present invention.

The mobile phone 100 may further include the power supply apparatus 111 (for example, a battery and a power management chip) that supplies power to the components. The battery may be logically connected to the processor 101 by using the power management chip, so that functions such as charging, discharging, and power consumption management are implemented by using the power supply apparatus 111.

Although not shown in FIG. 1, the mobile phone 100 may further include a camera (a front-facing camera and/or a rear-facing camera), a flash, a micro projection apparatus, a near field communication (Near Field Communication, NFC) apparatus, and the like. Details are not described herein.

All methods in the following embodiments may be implemented in the mobile phone 100 having the foregoing hardware structure.

The following describes terms in the embodiments of this application.

An output frame rate, for example, a first frame rate and a second frame rate, is frames per second (Frames per Second, FPS) that are displayed by a display of a terminal.

A screen refresh rate, for example, a first screen refresh rate and a second screen refresh rate, is a quantity of times that the display of the terminal refreshes a screen per second.

The output frame rate and the screen refresh rate in the embodiments of this application may be the same. In this case, a scenario in which the terminal plays a video is used as an example. A GPU of the terminal outputs a different image to the display each time. In other words, the display displays a different frame of image each time.

Certainly, the output frame rate and the screen refresh rate may alternatively be different. For example, when a screen refresh rate B is twice an output frame rate A, images output by the GPU to the display every two times are a same frame of image.

In the embodiments of this application, specific scenarios to which the image display method provided in the embodiments of this application is applied are described herein in different cases.

Usually, when a user operates the terminal (such as the mobile phone 100 shown in FIG. 1) to display private information, if another user secretly photographs a screen of the mobile phone 100 by using another terminal, privacy of the user may be leaked, resulting in a property loss or another loss to the user. The following describes a scenario in which the terminal displays the private information in the embodiments of this application.

Scenario 1: When a screen displayed on the terminal includes a password input box, if another user uses another terminal to secretly photograph a screen of the terminal, a password in the password input box displayed on the terminal is leaked.

Figure 2:
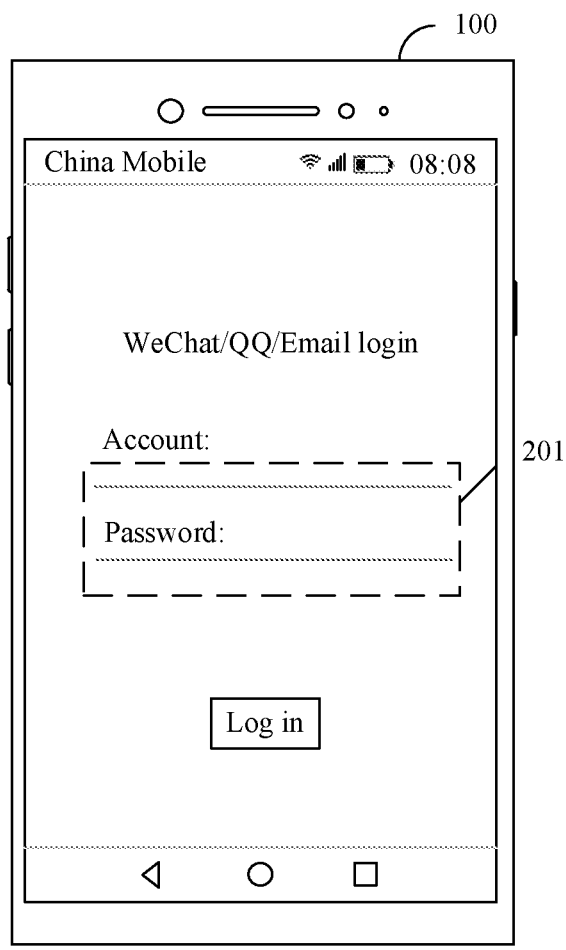
FIG. 2 is a schematic diagram 1 of an example of a display screen according to an embodiment of this application.

For example, the screen including the password input box in the embodiments of this application may include an account login screen of an application (for example, WeChat, Alipay, QQ, or an email box) in a portable terminal such as a mobile phone or a tablet computer, such as a WeChat account login screen shown in FIG. 2, an electronic payment screen (for example, a payment screen of Alipay, WeChat, or a bank-type application) on a portable terminal such as a mobile phone or a tablet computer, an ATM password input screen, and the like.

Scenario 2: When the terminal displays a private document (for example, a private document 1 shown in FIG. 3(*a*)) or a private picture (for example, a picture 1 shown in FIG. 3(*b*)), or the terminal plays a private video (for example, a video 1 shown in FIG. 4), if another user uses another terminal to secretly photograph a screen of the terminal, the private document, the private picture, or the private video displayed on the terminal is leaked.

Figure 5:
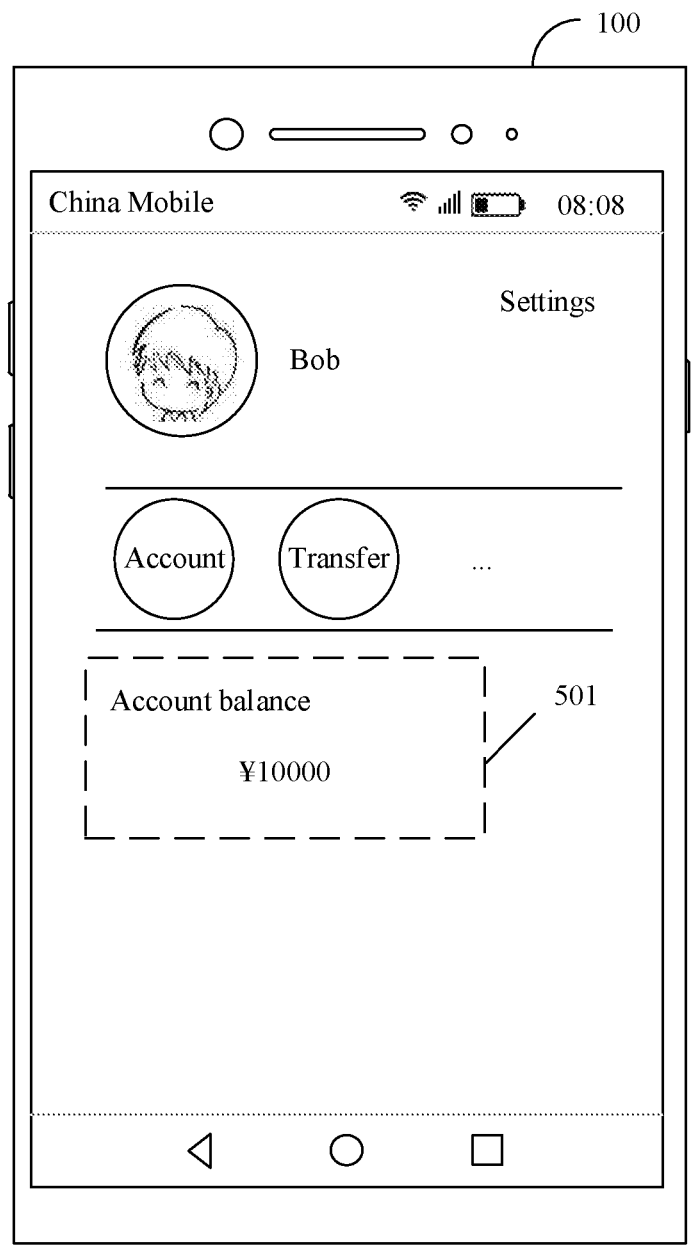
FIG. 5 is a schematic diagram 4 of an example of a display screen according to an embodiment of this application.

Scenario 3: When the terminal displays an account amount (for example, an account management screen shown in FIG. 5 includes an account balance), if another user uses another terminal to secretly photograph a screen of the terminal, the account amount displayed on the terminal is leaked.

Figure 6A:
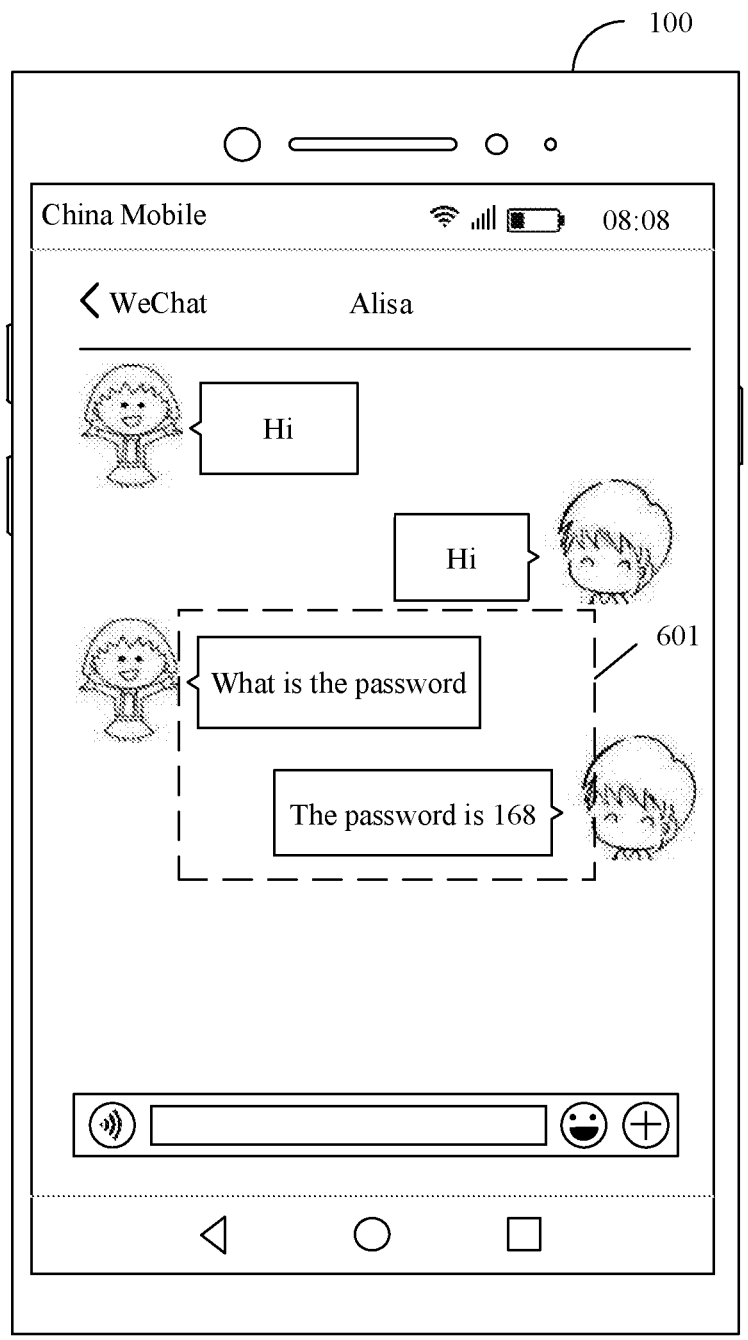
FIG. 6(a) and FIG. 6(b) are a schematic diagram 5 of an example of a display screen according to an embodiment of this application.

Scenario 4: When the terminal displays a chat screen (for example, a WeChat chat screen shown in FIG. 6(*a*)) or an email screen (for example, an email screen shown in FIG. 6(*b*)), if another user uses another terminal to secretly photograph a screen of the terminal, communication content displayed on the terminal is leaked.

Scenario 5: The terminal in the embodiments of this application is a cinema projection device. When the cinema projection device delivers a movie, if a movie viewer uses another terminal to secretly photograph a screen, the movie played on the screen is recorded.

The image display method provided in the embodiments of this application may be performed by an image display apparatus. The image display apparatus may be any one of the foregoing terminals (for example, the image display apparatus may be the mobile phone 100 shown in FIG. 1). Alternatively, the image display apparatus may be a central processing unit (English: Central Processing Unit, CPU for short) of the terminal, or a control module that is in the terminal and that is configured to perform the image display method. In the embodiments of this application, an example in which the terminal performs the image display method is used to describe the image display method provided in the embodiments of this application.

Figure 7:
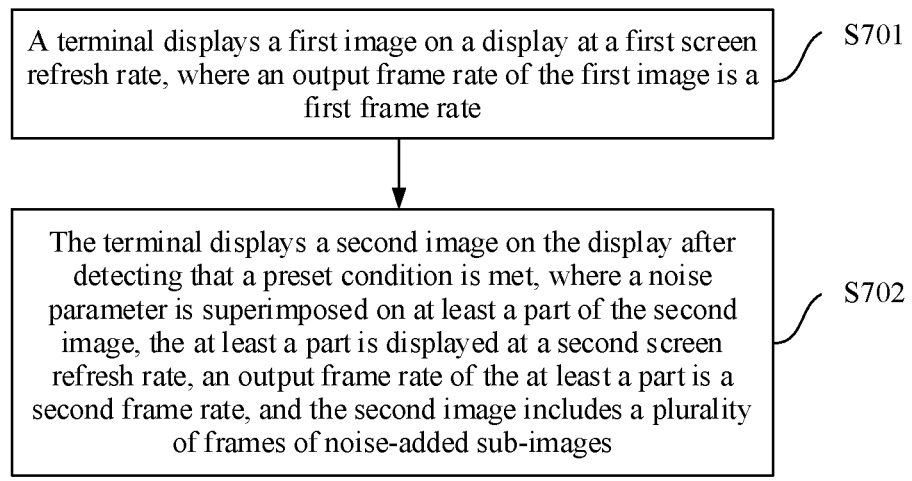
FIG. 7 is a flowchart 1 of an image display method according to an embodiment of this application.

An embodiment of this application provides an image display method. As shown in FIG. 7, the image display method includes S701 and S702.

S701. A terminal displays a first image on a display at a first screen refresh rate, where an output frame rate of the first image is a first frame rate.

S702. The terminal displays a second image on the display after detecting that a preset condition is met, where a noise parameter is superimposed on at least a part of the second image, the at least a part is displayed at a second screen refresh rate, an output frame rate of the at least a part is a second frame rate, and the second image includes a plurality of frames of noise-added sub-images.

The second frame rate is higher than the first frame rate, and the second screen refresh rate is higher than the first screen refresh rate.

After detecting that the preset condition is met, the terminal may enter a noise addition mode. After entering the noise addition mode, the terminal may display the second image on the display. The first frame rate is an output frame rate used when the terminal displays an image before the terminal enters the noise addition mode. The first screen refresh rate is a screen refresh rate used when the terminal displays an image before the terminal enters the noise addition mode.

The noise parameter in this embodiment of this application is used to perform noise addition processing on an image, to obtain a noise-added image. Specifically, the noise addition parameter may be superimposed on a pixel value of a pixel in the image, to change the pixel value of the pixel to obtain a noise-added sub-image, so as to achieve an objective of adding noise to the image.

In an implementation (1) of this embodiment of this application, the detecting that a preset condition is met may be that the terminal detects an operation of enabling a noise addition option by a user. Specifically, S702 may include S702*a*.

S702*a*. The terminal enters the noise addition mode in response to the operation of enabling the noise addition option, and displays the second image on the display.

The noise addition option in this embodiment of this application may be a user interface that is provided by the terminal and that helps the user operate the terminal to enter the noise addition mode. For example, the noise addition option may be an option on a setting screen, or the noise addition option may be an on/off key on a notification panel displayed on the terminal. The noise addition option may also be referred to as a noise addition key, a noise addition display option, or the like. This is not limited in this embodiment of this application.

Figure 8A:
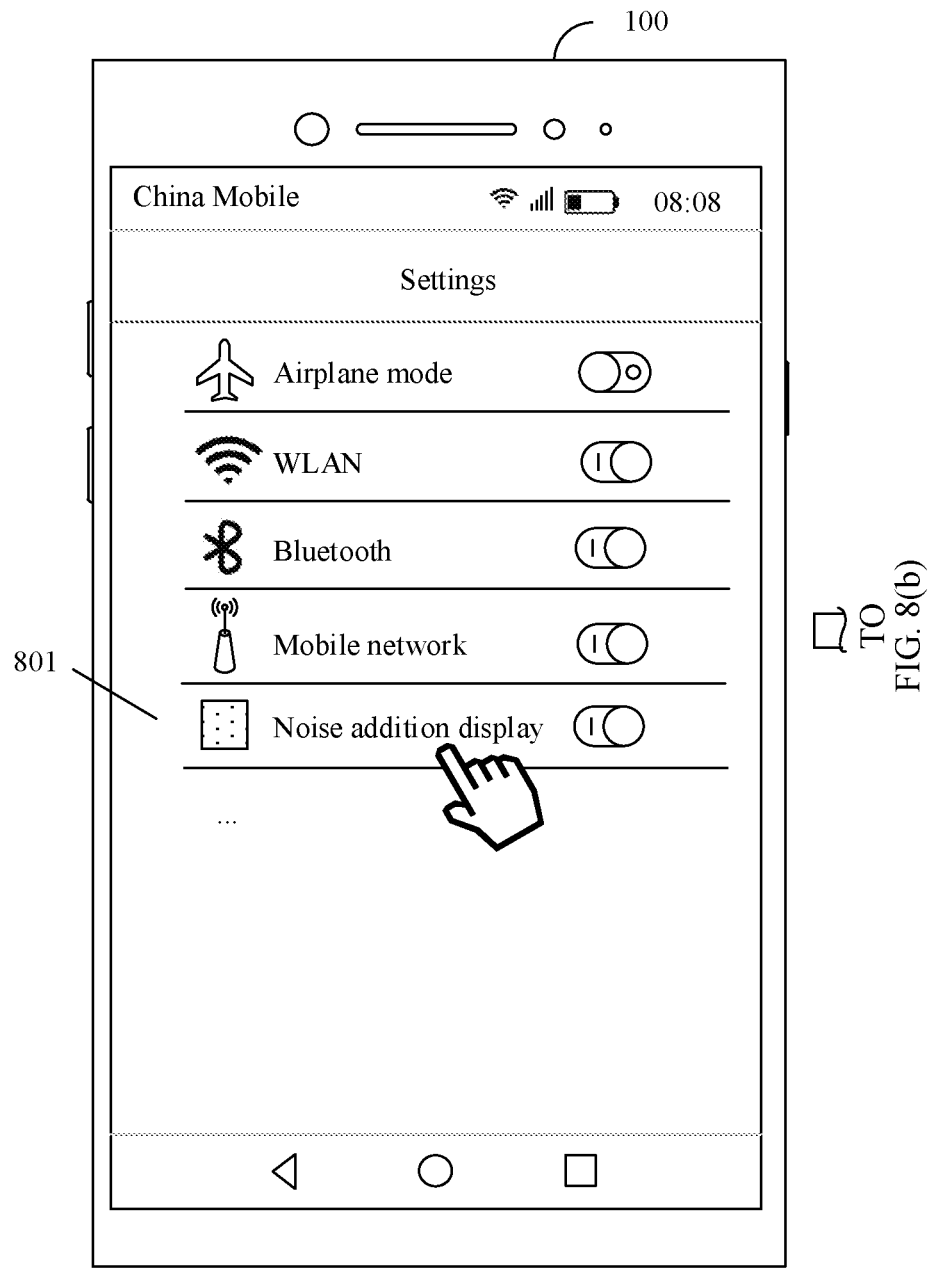
FIG. 8(a) to FIG. 8(c) are a schematic diagram 6 of an example of a display screen according to an embodiment of this application.
Figure 8B:
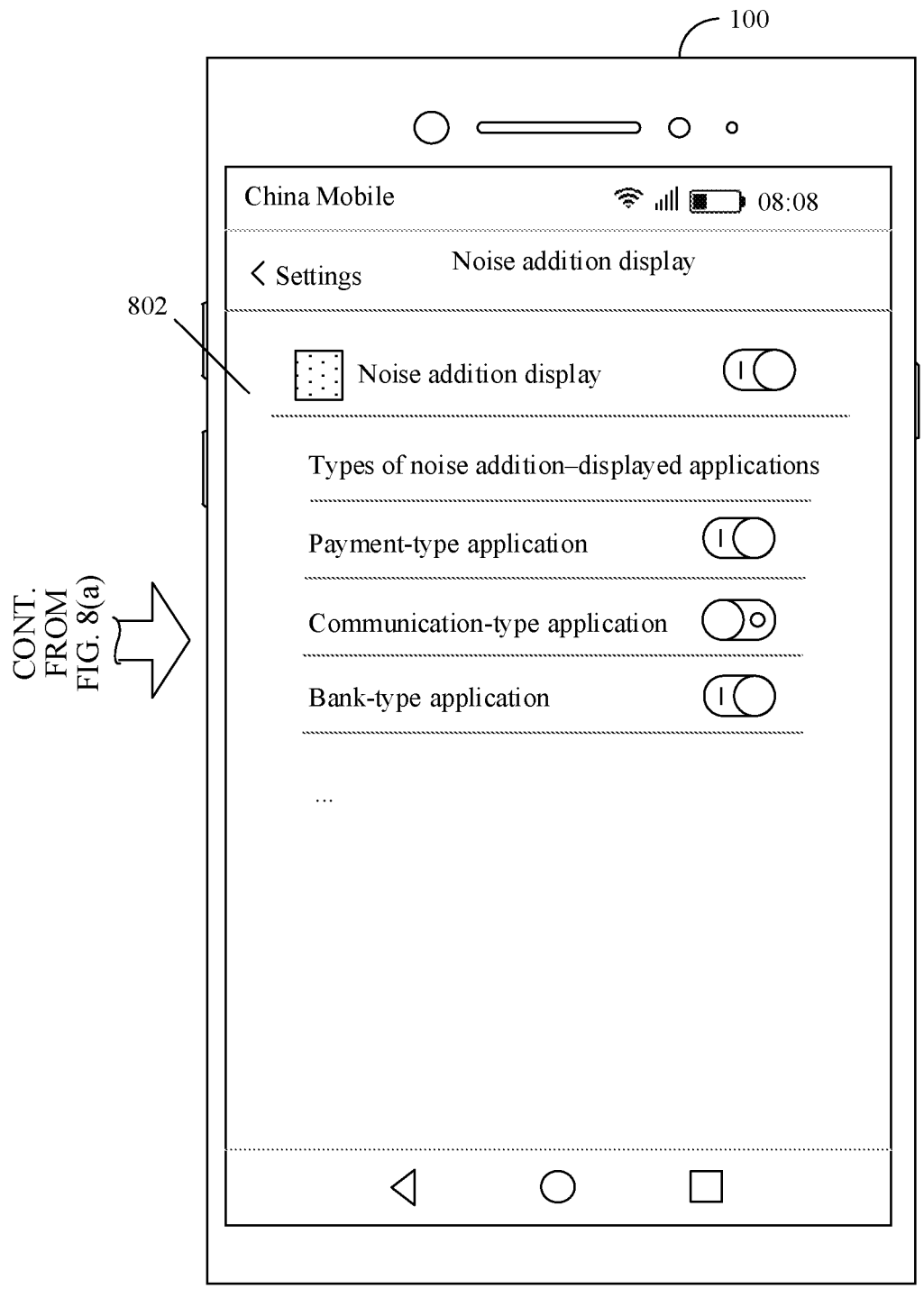
Figure 8C:
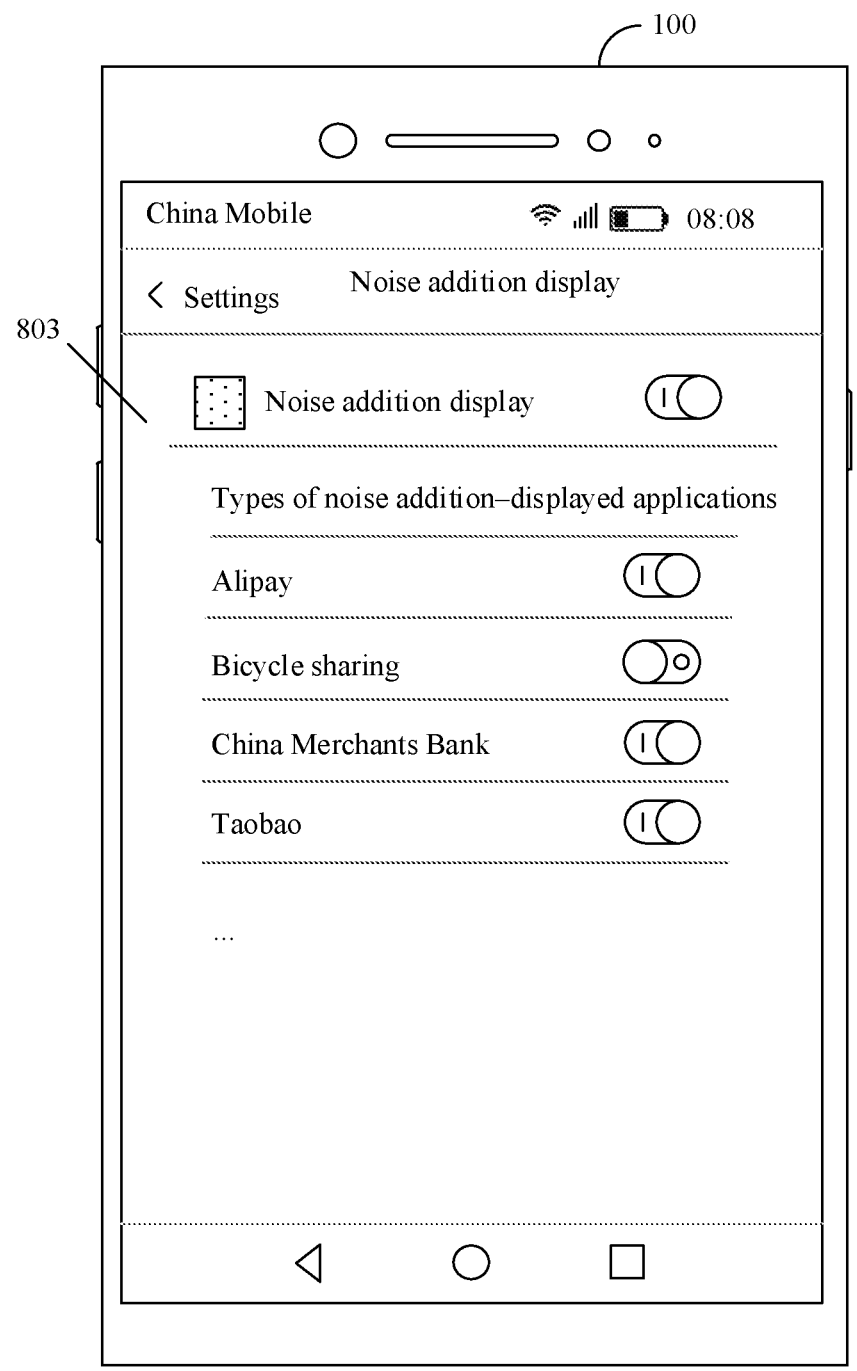

For example, the terminal is the mobile phone 100. As shown in FIG. 8(*a*), a setting screen of the mobile phone 100 may include a noise addition option "noise addition display" 801. The mobile phone 100 may enter the noise addition mode in response to an operation of enabling the noise addition option "noise addition display" 801 by the user. In addition, the mobile phone 100 may display, in response to an operation of tapping the noise addition option "noise addition display" 801 by the user, a noise addition control screen 802 shown in FIG. 8(*b*). The noise addition control screen 802 includes options of applications of a plurality of types, for example, an option of a bank-type application, an option of a payment-type application, and an option of a communication-type application. Alternatively, the mobile phone 100 may display, in response to an operation of tapping the noise addition option "noise addition display" 801 by the user, a noise addition control screen 803 shown in FIG. 8(*c*). The noise addition control screen 803 includes options of a plurality of applications, for example, an option of Alipay, an option of bicycle sharing, an option of the China Merchants Bank, and an option of Taobao.

In response to an operation of enabling each option on the noise addition control screen 802 and the noise addition control screen 803 by the user, after the mobile phone 100 enters the noise addition mode, the mobile phone 100 may perform the image display method provided in this embodiment of this application to display an image of an application corresponding to the enabling operation.

Figure 9:
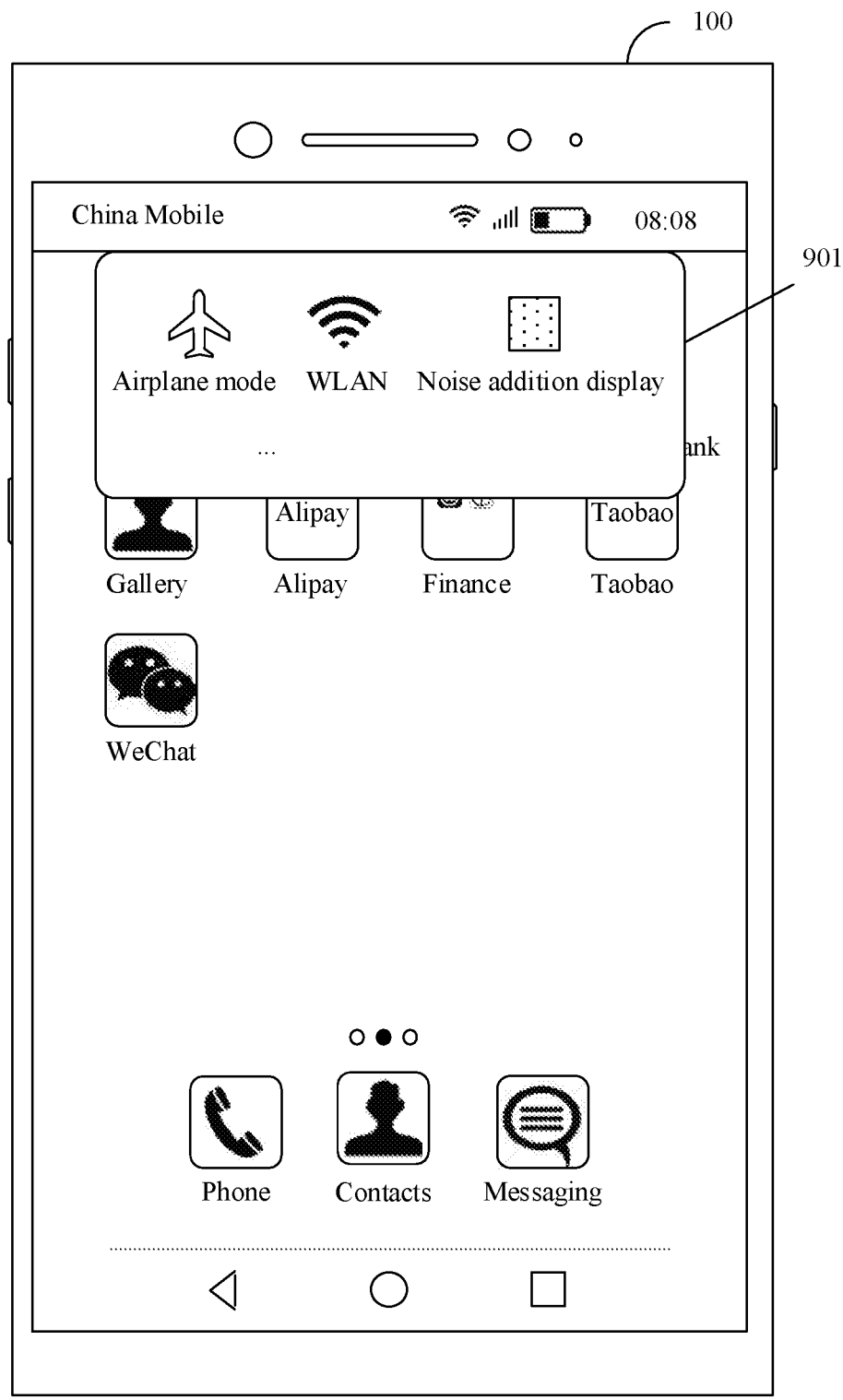
FIG. 9 is a schematic diagram 7 of an example of a display screen according to an embodiment of this application.

Alternatively, when the terminal displays any screen (for example, a home screen or a screen of any application), the terminal may enter or exit the noise addition mode in response to an operation of tapping a noise addition option "noise addition display" in a drop-down list by the user. For example, a drop-down list 901 shown in FIG. 9 includes a noise addition option "noise addition display", and the mobile phone 100 enters the noise addition mode in response to an operation of enabling the noise addition option "noise addition display" by the user.

In an implementation (2) of this embodiment of this application, the detecting that a preset condition is met may be that the second image includes a sensitive feature. Specifically, S702 may include S702*b*.

S702*b*. When the second image includes the sensitive feature, the terminal automatically enters the noise addition mode, and displays the second image on the display.

The sensitive feature in this embodiment of this application may include at least one of a preset control, a currency symbol, and a preset text. The preset control includes at least one of a password input box, a user name input box, and an identity card number input box, and the preset text includes at least one of a balance, a password, a salary, and an account.

For example, the currency symbol may be a currency symbol of each country, for example, a CNY symbol ¥, a dollar symbol $, and a euro symbol €. The preset text includes but is not limited to the balance, the password, the salary, the account, and the like. For example, the preset text may further include the "private document" shown in FIG. 3(*a*).

It should be noted that the sensitive feature in this embodiment of this application includes but is not limited to the foregoing listed features. For example, the sensitive feature may further include information in a preset format, such as a bank card number, an identity card number, a bank card password, and an email address.

Optionally, in the foregoing implementation (2), a method for determining, by the terminal, that the second image includes the sensitive feature may further include: when the second image is an image of an application of a preset type in the terminal, an image of an encrypted document, an image of an encrypted picture, or an image of a private video, the terminal may determine that the second image includes the sensitive feature.

Optionally, in the foregoing implementation (2), a method for determining, by the terminal, that the second image includes the sensitive feature may further include: the terminal identifies the second image to be displayed, obtains one or more image features included in the second image, and compares the obtained one or more image features with a pre-stored sensitive feature, and when the obtained one or more image features include an image feature that matches the sensitive feature, the terminal may determine that the second image includes the sensitive feature.

In an implementation (3) of this embodiment of this application, the detecting that a preset condition is met may be that the second image is a screen of an application of a preset type. Specifically, S702 may include S702*c*.

S702*c*. When displaying the screen of the application of the preset type, the terminal automatically enters the noise addition mode, and displays the second image on the display.

In this embodiment of this application, the application of the preset type may include at least one of a bank-type application (for example, a China Merchants Bank APP and a Bank of China APP), a payment-type application (for example, Alipay and WeChat), and a communication-type application (for example, an email, and instant messaging applications such as WeChat and QQ).

The application of the preset type may be specified by the user in the terminal. For example, the user may set the application of the preset type in the noise addition control screen 802 shown in FIG. 8(*b*). Different from "after the mobile phone 100 enters the noise addition mode, the mobile phone 100 performs the image display method provided in this embodiment of this application to display a screen of an application enabled in the noise addition control screen 802" in the implementation (1), in the implementation (2), in response to an operation of enabling each option in the noise addition control screen 802 by the user, the mobile phone 100 may enter the noise addition mode when the mobile phone 100 displays an image of an application corresponding to the enabling operation. For example, after the user performs a noise addition display enabling operation on the payment-type application, when the mobile phone 100 displays a screen of Alipay, the mobile phone 100 enters the noise addition mode.

In an implementation (4) of this embodiment of this application, the detecting that a preset condition is met may be that current scenario information meets the preset condition. Specifically, S702 may include S702*d*.

S702*d*. The terminal automatically enters the noise addition mode when the current scenario information meets the preset condition.

The current scenario information includes at least one of time information, address information, and environment information. The time information is used to indicate a current time, and the address information is used to indicate a current location of the terminal, for example, a home, a company, or a shopping mall. The terminal may determine the current location of the terminal by using an existing positioning method. The existing positioning method includes but is not limited to GPS positioning and Wi-Fi positioning. The environment information may be used to indicate a quantity of people around the terminal, whether there is a stranger around the terminal, and the like. The terminal may determine, through sound recognition or by capturing an image by using a camera, the quantity of people around the terminal and whether there is a stranger around the terminal.

It should be noted that, in this embodiment of this application, a manner in which the terminal enters the noise addition mode includes but is not limited to the foregoing listed manners. For example, the terminal may enable the noise addition mode in response to a preset gesture entered by the user. In other words, when the user needs to control the terminal to display a private image, and needs to avoid leakage caused by secretly photographing the private image by another device, regardless of a screen currently displayed by the terminal, the user may control, by using the preset gesture, the terminal to enable the noise addition mode. In other words, the terminal may receive and respond to, at any time, the preset gesture entered by the user, and enters the noise addition mode.

Figure 10A:
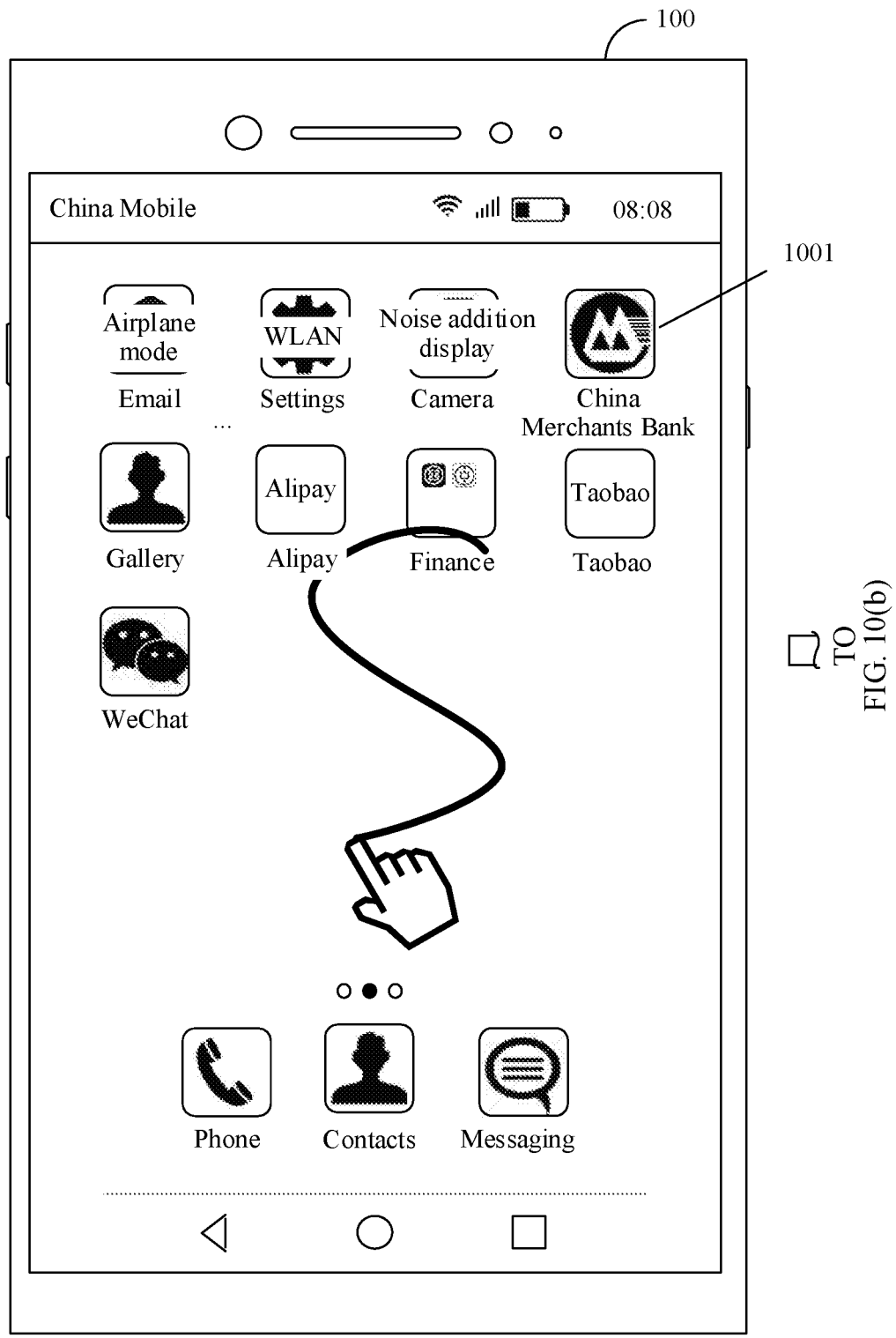
FIG. 10(a) and FIG. 10(b) are a schematic diagram 8 of an example of a display screen according to an embodiment of this application.
Figure 10B:
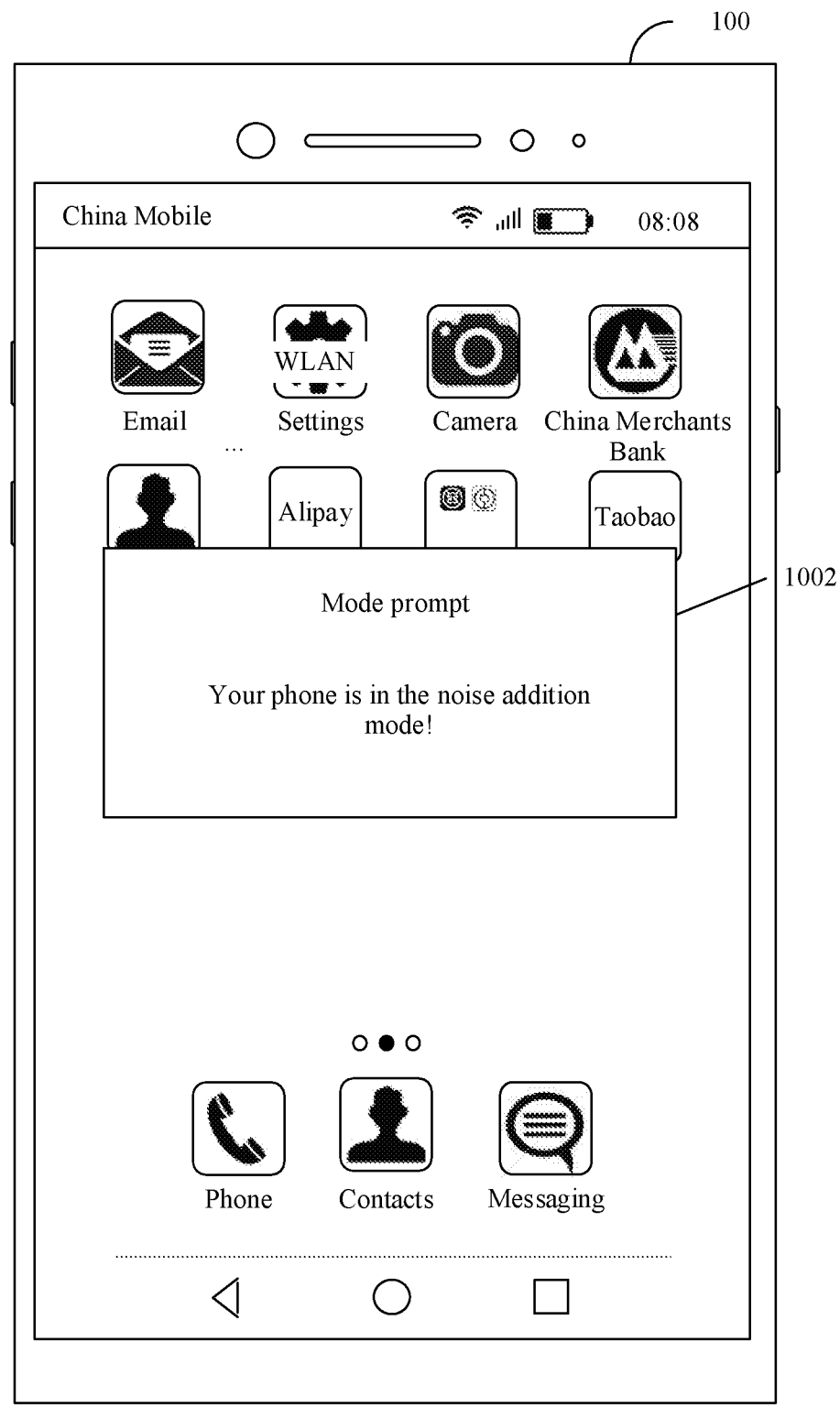

For example, as shown in FIG. 10(a), the mobile phone 100 may receive an "S-shaped gesture" entered by the user on a home screen 1001 of the mobile phone 100, and enter the noise addition mode. Optionally, the mobile phone 100 may display, in response to the "S-shaped gesture" entered by the user on the home screen 1001 of the mobile phone 100, a mode prompt window 1002 shown in FIG. 10(b). The mode prompt window 1002 is used to prompt the user that the mobile phone has entered the noise addition mode.

It may be understood that when the terminal displays a picture, a video, or an application screen of the terminal, the display of the terminal outputs images frame by frame based on an output frame rate and a screen refresh rate of the display. In other words, both the first image and the second image in this embodiment of this application may be one frame of image.

According to the image display method provided in this embodiment of this application, after detecting that the preset condition is met, the terminal may display, at the second screen refresh rate, the at least a part (the noise parameter is superimposed on the at least a part) of the second image including the plurality of frames of noise-added sub-images. The output frame rate of the at least a part is the second frame rate. In addition, the second screen refresh rate is higher than the first screen refresh rate, and the second frame rate is higher than the first frame rate. In this way, an image of the at least a part of the second image may be divided into a plurality of frames of noise-added sub-images and output frame by frame, and a secret photography device photographs a noise-added sub-image when secretly photographing a screen of the terminal. This can reduce a possibility of leakage of displayed content on the terminal, and effectively protect the displayed content on the terminal.

Figure 11A:
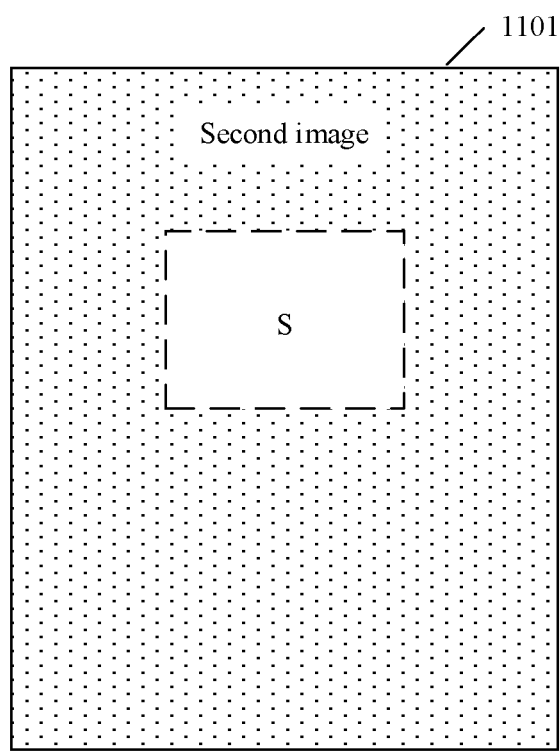
FIG. 11(a) to FIG. 11(c) are a schematic diagram of an example of a sensitive area in a second image according to an embodiment of this application.
Figure 11B:
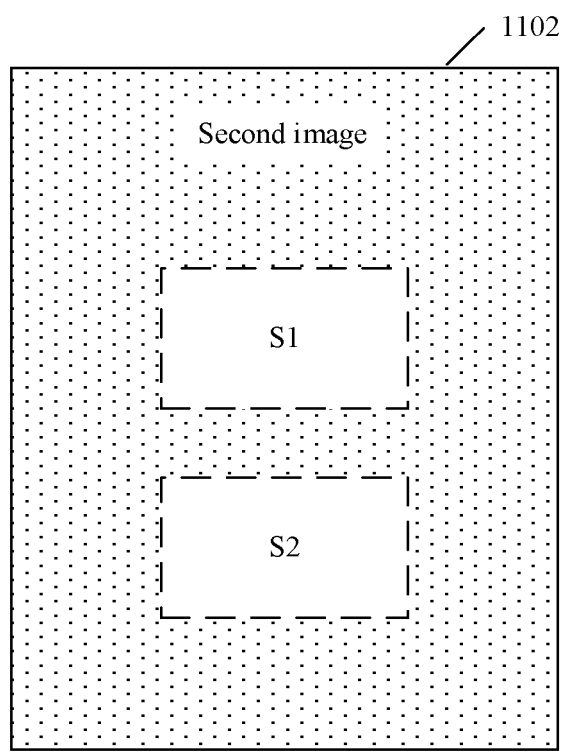

In a first application scenario of this embodiment of this application, the at least a part of the second image may be at least one sensitive area (an area including a sensitive feature) in the second image. For example, at least a part of a second image 1101 shown in FIG. 11(a) is a sensitive area S in the second image 1101. Alternatively, at least a part of a second image 1102 shown in FIG. 11(b) is a sensitive area S1 and a sensitive area S2 in the second image 1102.

In the first application scenario, that the noise parameter is superimposed on the at least a part of the second image may be specifically: the noise parameter is superimposed on the at least one sensitive area in the second image. For example, the noise parameter is superimposed on the sensitive area S shown in FIG. 11(a). That the second image includes a plurality of frames of noise-added sub-images is specifically: an image of the at least one sensitive area in the second image includes a plurality of frames of noise-added sub-images (for example, N frames of noise-added sub-images, where N is an integer greater than or equal to 2). A plurality of frames of noise-added sub-images in a sensitive area are obtained by superimposing the noise parameter on an image of the sensitive area.

An area other than the sensitive area in the second image is referred to as an insensitive area. The insensitive area is displayed at the second screen refresh rate, and an output frame rate of the insensitive area is the second frame rate. Alternatively, the insensitive area is displayed at the first screen refresh rate, and an output frame rate of the insensitive area is the first frame rate.

When the insensitive area is displayed at the second screen refresh rate, and the output frame rate of the insensitive area is the second frame rate, the terminal may display all content of the second image at a same screen refresh rate (namely, the second screen refresh rate) and a same frame rate (the second frame rate). A performance requirement for the display is greatly reduced, and the display does not need to support different refresh rates in different display areas. When the insensitive area is displayed at the first screen refresh rate, and the output frame rate of the insensitive area is the first frame rate, processing and screen refresh rate adjustment need to be performed on only the sensitive area, so that an effect of preventing secret photography can be achieved with low power consumption.

In this embodiment of this application, a method in which the terminal outputs the N frames of noise-added sub-images in the sensitive area after entering the noise addition mode in the first application scenario is described in detail herein.

Figure 12:
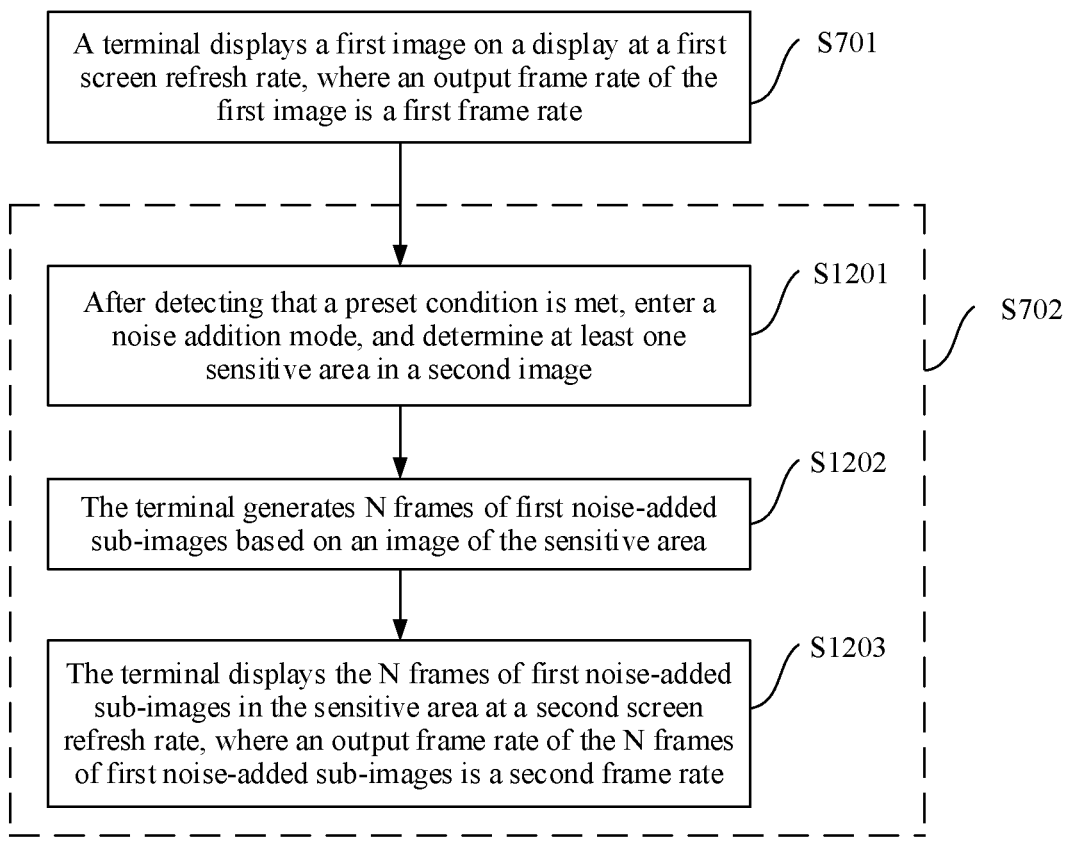
FIG. 12 is a flowchart 2 of an image display method according to an embodiment of this application.

After entering the noise addition mode, the terminal may first determine the sensitive area of the second image before the display displays the second image. Specifically, as shown in FIG. 12, S702 in FIG. 7 may include S1201 to S1203.

S1201. After detecting that the preset condition is met, enter the noise addition mode, and determining the at least one sensitive area in the second image.

In the first application scenario, as shown in FIG. 11(a), the terminal may determine the sensitive area S in the second image 1101. As shown in FIG. 11(b), the terminal may determine two sensitive areas: the sensitive area S1 and the sensitive area S2 in the second image 1102.

Optionally, in an implementation, the terminal may identify the second image; and when identifying that the second image includes the sensitive feature, determine one or more sensitive areas based on a location of the sensitive feature in the second image. Specifically, S1201 may include S1201a and S1201b.

S1201a. The terminal determines that the second image includes the sensitive feature.

When the second image is an image of an application of a preset type in the terminal, an image of an encrypted document, an image of an encrypted picture, or an image of a private video, the terminal may determine that the second image includes the sensitive feature.

The terminal may identify the second image to be displayed, obtain one or more image features included in the second image, and then compare the obtained one or more image features with a pre-stored sensitive feature. When the obtained one or more image features include an image feature that matches the sensitive feature, the terminal may determine that the second image includes the sensitive feature. The terminal may pre-store a plurality of sensitive features.

S1201b. The terminal determines the at least one sensitive area in the second image based on the location of the sensitive feature in the second image.

When determining that the second image includes the sensitive feature, the terminal may determine the location of the sensitive feature in the second image. Then, the terminal may determine, as the sensitive area based on the determined location, an area that is in the second image and that includes the sensitive feature.

It may be understood that the second image may include one or more sensitive features. Therefore, the terminal may determine the at least one sensitive area based on the one or more sensitive features.

Figure 6B:
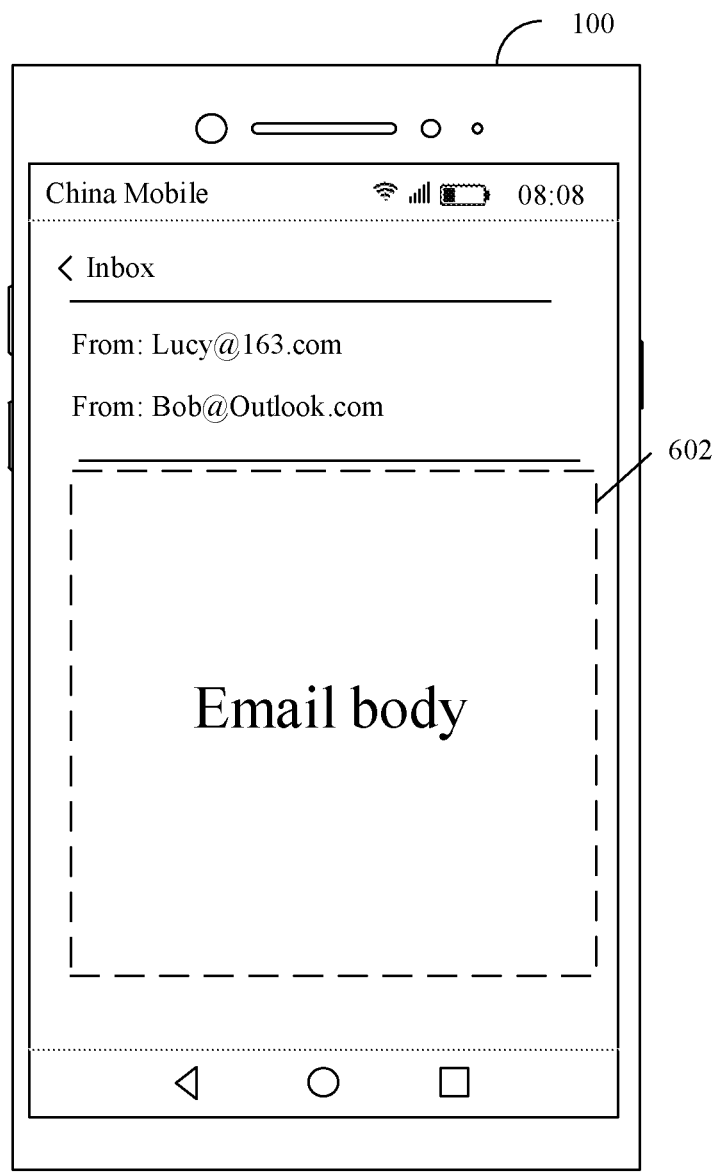

For example, because the display screen shown in FIG. 2 includes a password input box, the mobile phone 100 may determine that the display screen includes a sensitive feature, and determine a sensitive area 201 based on a location of the password input box in the image. Because the display screen shown in FIG. 5 includes a CNY symbol ¥, the mobile phone 100 may determine that the display screen includes a sensitive feature, and determine a sensitive area 501 based on a location of the CNY symbol ¥ in the image. Because the WeChat chat screen shown in FIG. 6(a) includes a preset text "password", the mobile phone 100 may determine that the display screen includes a sensitive feature, and determine a sensitive area 601 based on a location of the preset text "password" in the image. Because an email box is an application of a preset type, the mobile phone 100 may determine that a sensitive area 602 shown in FIG. 6(b) is an email body of an email.

Figure 3A:
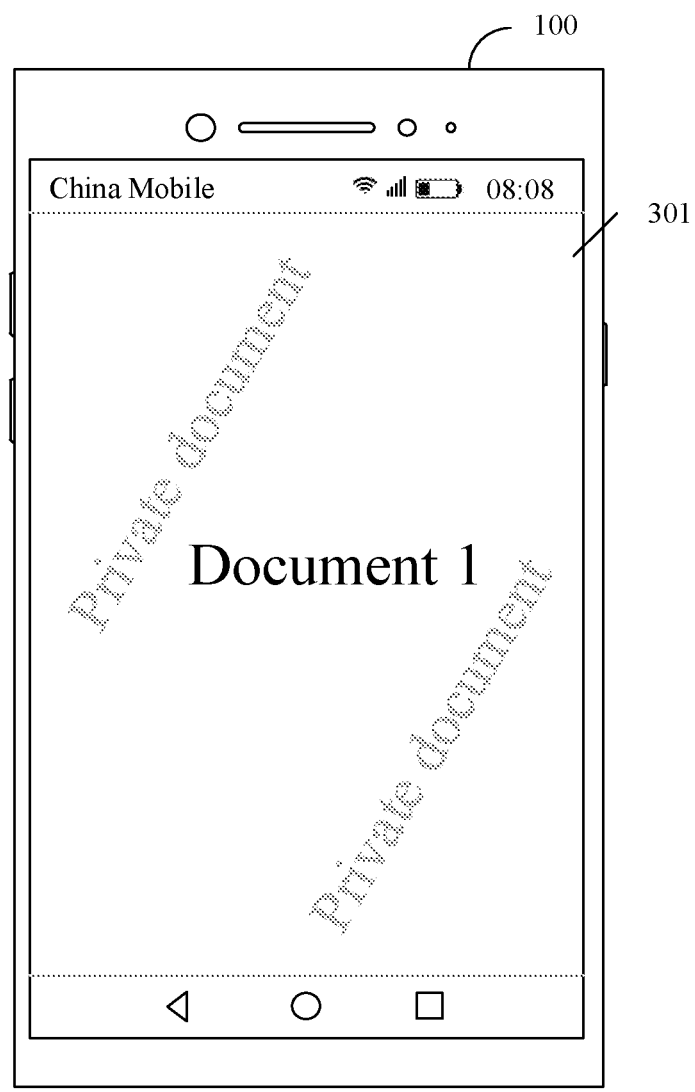
FIG. 3(a) and FIG. 3(b) are a schematic diagram 2 of an example of a display screen according to an embodiment of this application.
Figure 3B:
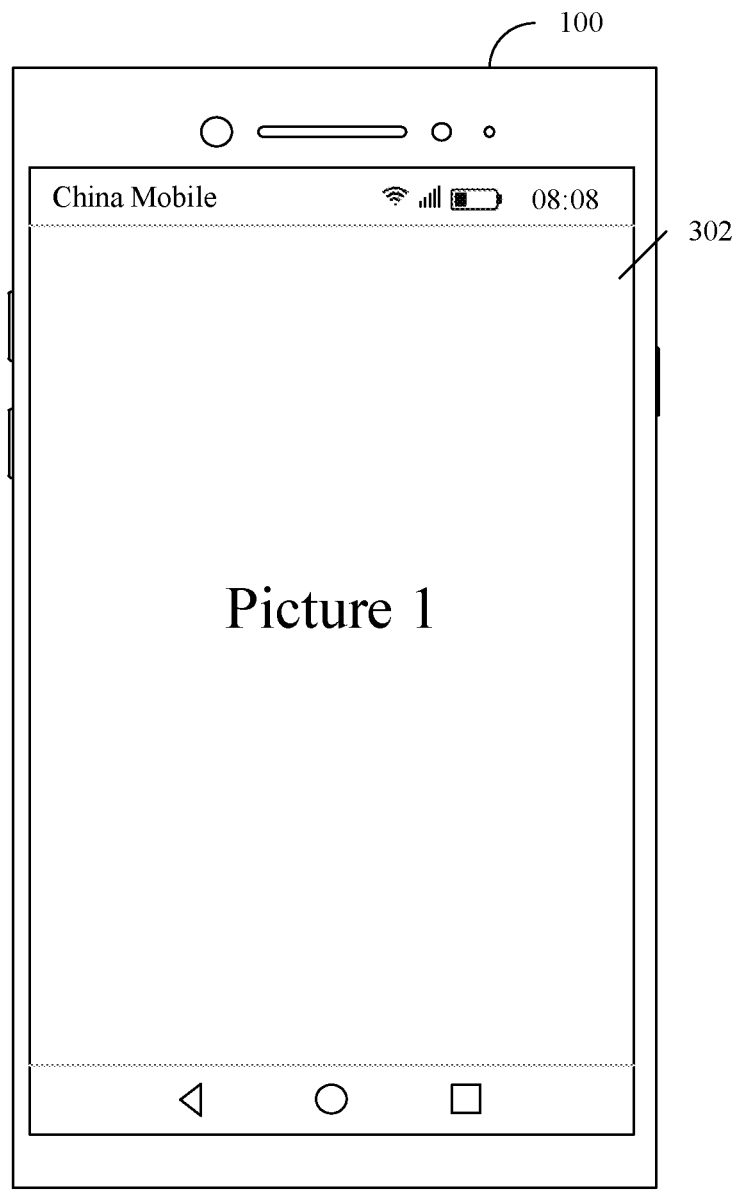
Figure 4:
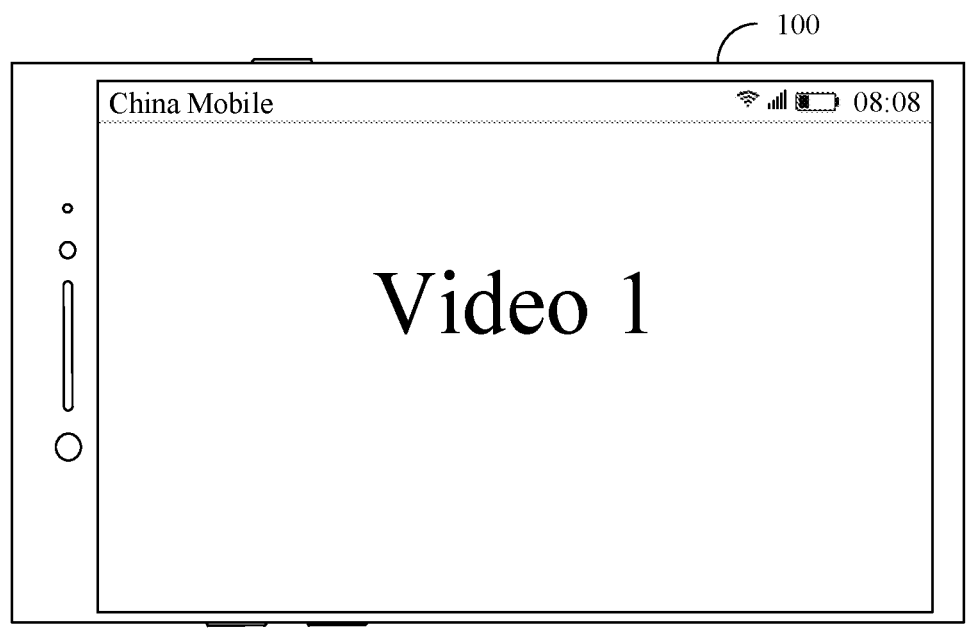
FIG. 4 is a schematic diagram 3 of an example of a display screen according to an embodiment of this application.

It should be noted that when the second image is the image of the encrypted document, the image of the encrypted picture, or the image of the private video, because sensitive features are distributed in an entire area of this frame of image, noise addition display needs to be performed on the entire area of this frame of image. Therefore, in this case, the at least one sensitive area determined by the terminal is the entire area of the second image. For example, as shown in FIG. 3(a), the document 1 displayed on the mobile phone 100 is a private document. In this case, an entire area of an image of the document 1 displayed on the mobile phone 100 is sensitive. As shown in FIG. 3(b), the picture 1 displayed on the mobile phone 100 is a private picture. In this case, an entire area of an image of the picture 1 displayed on the mobile phone 100 is sensitive. As shown in FIG. 4, the video 1 played by the mobile phone 100 is a private video. In this case, an entire area of an image of the video 1 displayed on the mobile phone 100 is sensitive.

Optionally, in another implementation, to more clearly identify the sensitive area in the second image, the terminal may segment the second image into M sub-areas, and identify an image of each sub-area, to determine whether a corresponding sub-area is the sensitive area. Specifically, S1201 may include S1201c to S1201e.

S1201c. The terminal segments the second image into the M sub-areas, where M≥2.

Figure 13A:
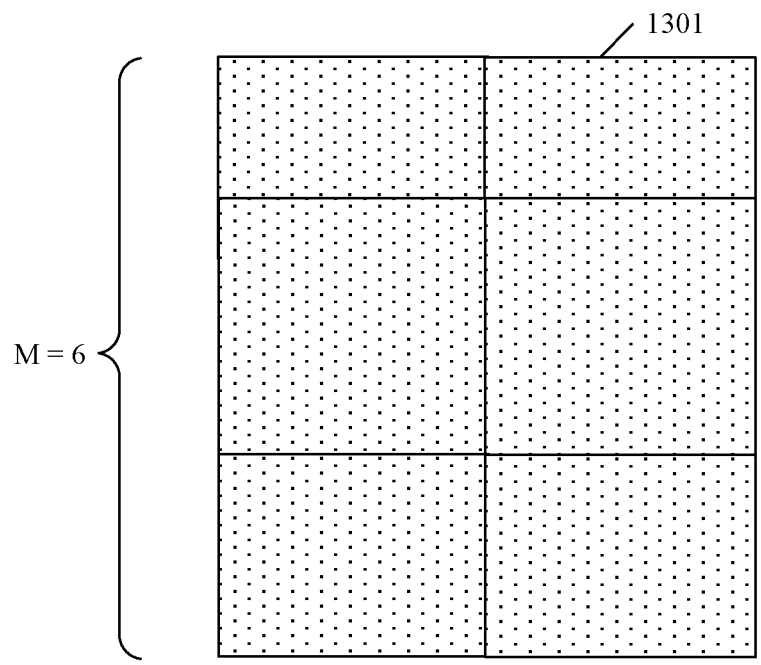
FIG. 13(a) to FIG. 13(c) are a schematic diagram of an example of segmentation into sub-areas according to an embodiment of this application.
Figure 13B:
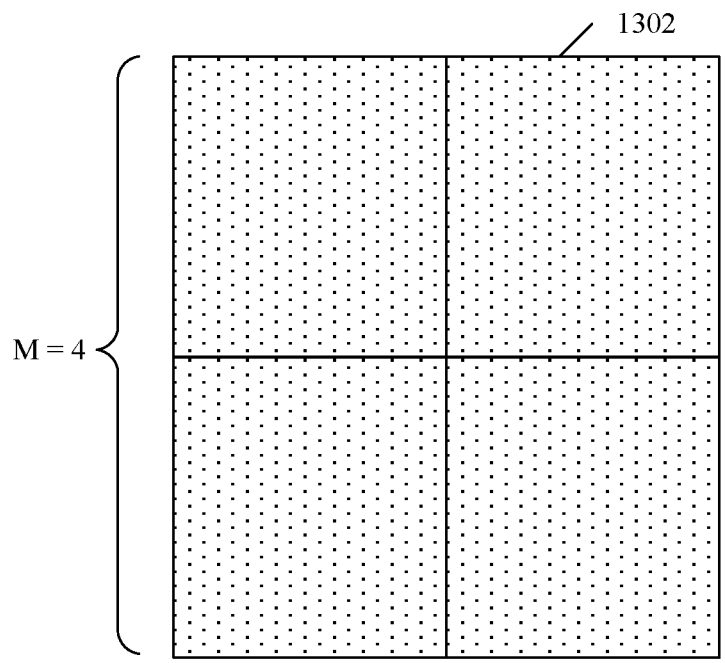
Figure 13C:
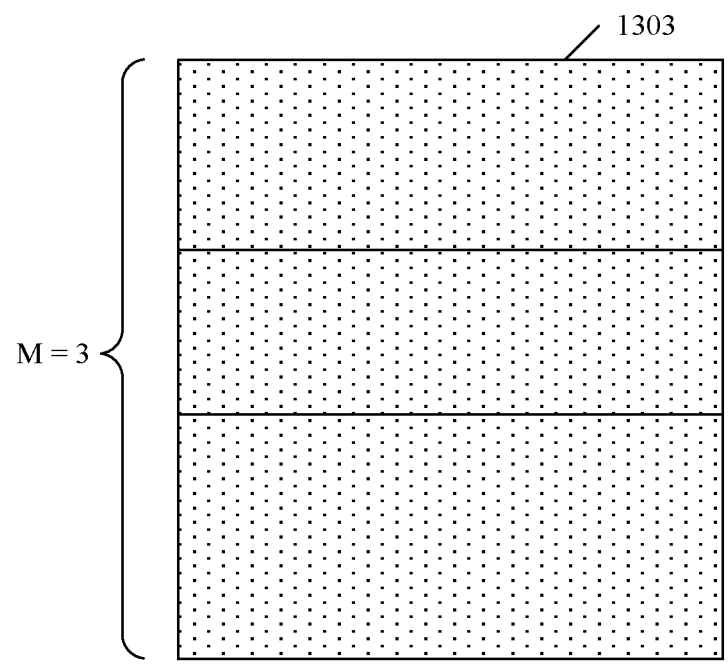

For example, M in this embodiment of this application may be a preconfigured fixed value. For example, as shown in FIG. 13(a), M=6, and the terminal may segment a second image 1301 into six sub-areas. As shown in FIG. 13(b), M=4, and the terminal may segment a second image 1302 into four sub-areas. As shown in FIG. 13(c), M=3, and the terminal may segment a second image 1303 into three sub-areas.

Alternatively, M may be determined based on a first parameter of the terminal, and the first parameter includes a processing capability of the terminal and an amount of remaining electricity of the terminal. The processing capability of the terminal may be specifically a processing capability of a processor of the terminal, and the processor of the terminal may include a CPU and a GPU. The processing capability of the processor may include parameters such as a dominant frequency, a core quantity (for example, a multi-core processor), a bit quantity, and a cache of the processor.

It should be noted that the terminal may evenly segment the second image into the M sub-areas. In other words, the M sub-areas have a same size. For example, the four sub-areas shown in FIG. 13(b) have a same size. Alternatively, the M sub-areas have different sizes. For example, the six sub-areas shown in FIG. 13(a) have different sizes.

It may be understood that an image display function provided in the method in this embodiment of this application may be implemented in an application, and the terminal may install the application to perform the method in this embodiment of this application. Different terminals have different processors and the processors have different processing capabilities. Therefore, in this embodiment of this application, for different processors, values of M are different. In addition, a processing capability of a processor of a terminal is fixed, but an amount of remaining electricity of the terminal may change. Therefore, for terminals having a same processing capability, values of M depend on quantities of remaining electricity of the terminals. Specifically, a higher processing capability of the terminal indicates a larger value of M. When the processing capability of the terminal is fixed, a larger amount of remaining electricity indicates a larger value of M. For example, Table 1 shows an example of a table of a relationship between M and both of a processing capability and an amount of remaining electricity of a terminal according to an embodiment of this application.

TABLE 1

Table of a relationship between M and both of a processing capability and an amount of remaining electricity of a terminal

| Amount of remaining electricity | [0, 10%] | (11%, 30%] | ... | (70%, 100%] |
|---|---|---|---|---|
| Processor 1 | 2 | 3 | ... | 6 |
| Processor 2 | 4 | 6 | ... | 10 |
| ... | ... | ... | ... | ... |
| Processor n | 6 | 8 | ... | 16 |

Processing capabilities of the processor 1 to the processor n in Table 1 are increasingly high. As shown in Table 1, when the amount of remaining electricity of the terminal falls within the range [0, 10%], because a processing capability of the processor n is higher than a processing capability of the processor 2, a terminal including the processor n may segment one frame of image into six sub-areas, and a terminal including the processor 2 may segment one frame of image into four sub-areas. As shown in Table 1, when the processing capability of the terminal is fixed (for example, the processor of the terminal is the processor 1), if the amount of remaining electricity of the terminal falls within the range (11%, 30%], the terminal may segment one frame of image into three sub-areas, or if the amount of remaining electricity of the terminal falls within the range (70%, 100%], the terminal may segment one frame of image into six sub-areas. In other words, when the processing capability of the terminal is fixed, a larger amount of remaining electricity indicates a larger value of M.

S1201d. The terminal identifies image content of the M sub-areas to extract an image feature of each sub-area.

For a method in which the terminal identifies the image content of the M sub-areas to extract the image feature of each sub-area, refer to a method in which a terminal identifies an image to extract an image feature in a conventional technology. Details are not described herein in this embodiment of this application.

It may be understood that the terminal may extract the image feature of each of the M sub-areas by performing S702b2, and then the terminal may perform S702c for each sub-area.

S1201e. When an image feature of a sub-area includes the sensitive feature, the terminal determines the sub-area as the sensitive area.

When image features of a plurality of the M sub-areas all include the sensitive feature, the terminal may determine that the plurality of sub-areas are all sensitive areas.

It may be understood that the terminal may determine the at least one sensitive area in the second image by performing S1201, and then perform S1202 and S1203 for each of the at least one sensitive area.

S1202. The terminal generates N frames of first noise-added sub-images based on an image of the sensitive area.

In a first implementation, N in this embodiment of this application may be a preconfigured fixed value. N may be any natural number greater than 2. For example, N=4.

In a second implementation, to avoid a case in which when N is a preconfigured fixed value, a secret photography device traces a rule of performing an operation on an image by the terminal to determine the fixed value, and performs restoration processing on a secretly photographed noise-added image, N in this embodiment of this application may randomly change within a specific range. For example, when displaying the second image for the first time, the terminal generates three frames of first noise-added sub-images for an image of a sensitive area a in the second image; and when displaying the second image for the second time, the terminal generates four frames of first noise-added sub-images for the image of the sensitive area a in the second image. Alternatively, when displaying the second image within a first preset time (for example, 8:00 a.m. to 9:00 a.m.), the terminal generates four frames of first noise-added sub-images for an image of a sensitive area b in the second image; and when displaying the second image within a second preset time (for example, 10:00 a.m. to 12:00 a.m.), the terminal generates two frames of first noise-added sub-images for the image of the sensitive area b in the second image.

In a third implementation, N may be determined based on the amount of remaining electricity of the terminal. A larger value of N indicates more first noise-added sub-images displayed by the terminal and higher power consumption of displaying the images by the terminal. Therefore, the terminal may determine a value of N based on the amount of remaining electricity. For example, when the amount of remaining electricity of the terminal is greater than or equal to a first threshold, the terminal may generate N1 frames of first noise-added sub-images based on the image of the sensitive area. When the amount of remaining electricity of the terminal is less than the first threshold, the terminal may generate N2 frames of first noise-added sub-images based on the image of the sensitive area, where N1>N2.

Optionally, the terminal may determine a quantity of frames of generated first noise-added sub-images based on a value range in which the amount of remaining electricity is greater than or equal to the first threshold and a value range in which the amount of remaining electricity is less than the first threshold, and the terminal may more finely divide a value range of the amount of remaining electricity, and store a correspondence between N and an amount of remaining electricity. For example, Table 2 shows an example of a table of a relationship between N and an amount of remaining electricity of a terminal according to an embodiment of this application.

TABLE 2

Table of a relationship between N and an amount of remaining electricity

| Amount of remaining electricity | [0, 10%] | (11%, 30%] | ... | (50%, 70%] | (70%, 100%] |
|---|---|---|---|---|---|
| N | 2 | 3 | ... | 6 | 8 |

As shown in Table 2, a larger amount of remaining electricity of the terminal indicates a larger value of N. It should be noted that Table 2 merely provides the correspondence between N and an amount of remaining electricity of a terminal by using an example. A value of N in this embodiment of this application includes but is not limited to the values shown in Table 2.

In a fourth implementation, N may be determined based on an image type of the second image. The image type may indicate whether the second image is a dynamic image or a static image. In this embodiment of this application, the dynamic image may be a frame of image in a video. A display time of the dynamic image is relatively short. Therefore, a value of N may be relatively small. The static image may include a home screen image of the terminal, a screen image of an application, a picture displayed on the terminal, or the like. A display time of the static image is relatively long. Therefore, a value of N may be relatively large. For example, when the second image is the static image, the terminal generates N1 frames of noise-added sub-images for the second image. When the second image is the dynamic image, the terminal generates N2 frames of noise-added sub-images for the second image.

Figure 17:
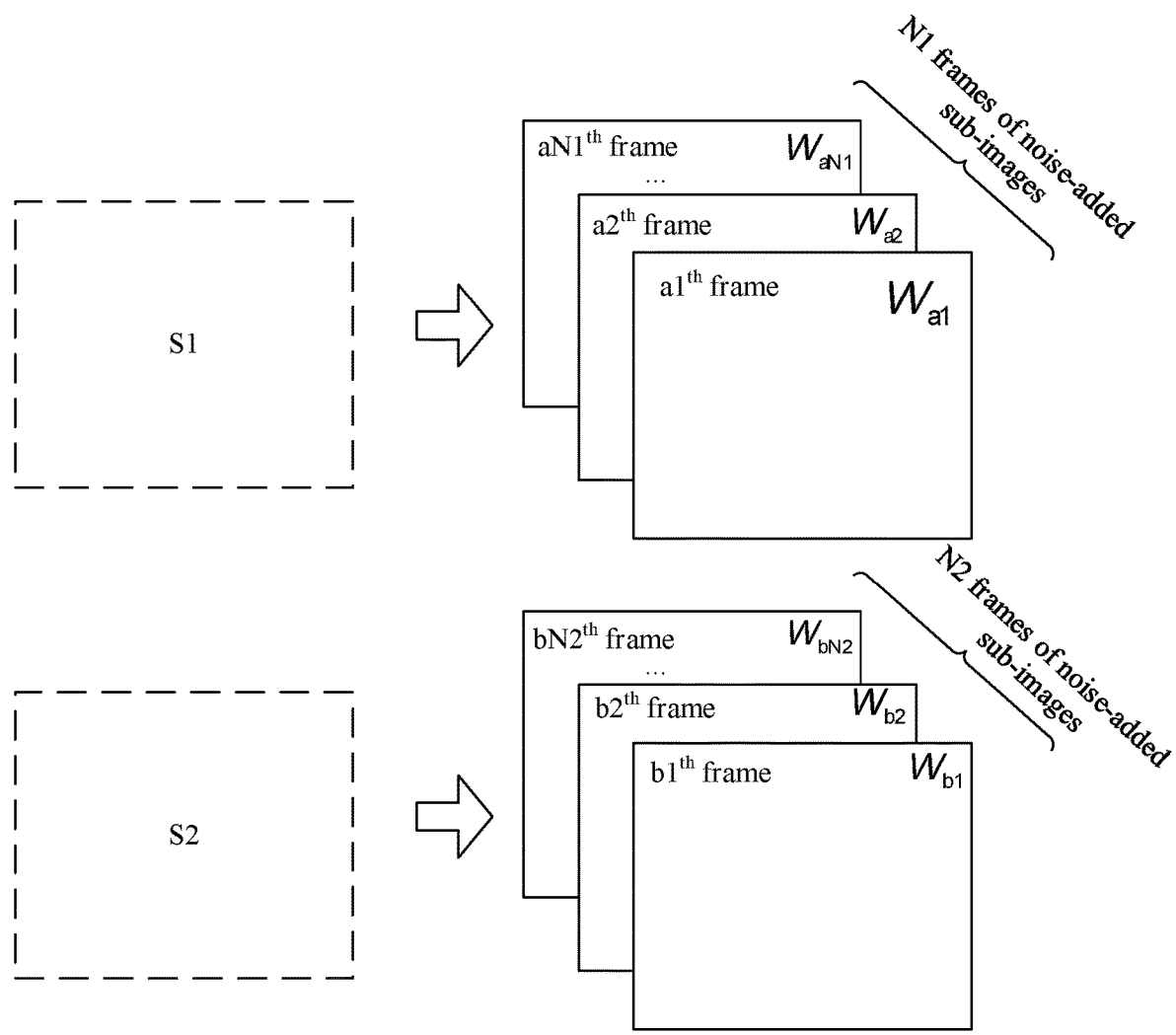
FIG. 17 is a schematic diagram 2 of an example of a sensitive area and N noise-added sub-images of the sensitive area according to an embodiment of this application.

It should be noted that, in the foregoing four implementations, when the second image includes a plurality of sensitive areas, quantities of frames of first noise-added sub-images generated for the plurality of sensitive areas may be the same or may be different. For example, the second image 1102 shown in FIG. 11(b) includes two sensitive areas (the sensitive area S1 and the sensitive area S2). The terminal may generate N frames of first noise-added sub-images for both the sensitive area S1 and the sensitive area S2. Alternatively, as shown in FIG. 17, the terminal may generate N1 frames of first noise-added sub-images for the sensitive area S1, and generate N2 frames of first noise-added sub-images for the sensitive area S2, where N1 is not equal to N2.

In a fifth implementation, N may be determined based on a sensitivity degree of the sensitive area. In other words, N may be determined based on the sensitivity degree of the sensitive area. The terminal may further store a sensitivity degree of each sensitive feature, and sensitivity degrees of different sensitive features are different.

The terminal may determine a sensitivity degree of a sensitive area based on a sensitivity degree of a sensitive feature in the sensitive area. Specifically, when one sensitive area includes one sensitive feature, a sensitivity degree of the sensitive area is a sensitivity degree of the sensitive feature. When one sensitive area includes a plurality of sensitive features, a sensitivity degree of the sensitive area is a sum of sensitivity degrees of the plurality of sensitive features. Different types of sensitive features have different sensitivity degrees. For example, a sensitivity degree of a preset text "password" is higher than a sensitivity degree of a currency symbol (for example, ¥).

The terminal may store a correspondence between a sensitivity degree and N. For example, Table 3 shows an example of a table of a relationship between N and a sensitivity degree according to an embodiment of this application.

TABLE 3

| Table of a relationship between N and a sensitivity degree | | | | |
|---|---|---|---|---|
| Sensitivity degree | [0, a] | (a, b] | ... | (e, f] | (f, g] |
| N | 2 | 3 | ... | 6 | 8 |

The sensitivity degree a to the sensitivity degree g shown in Table 3 are in ascending order. For example, if a sensitive area a includes only a sensitive feature "¥", a sensitivity degree of the sensitive area a falls within the range [0, a]; and if a sensitive area b includes sensitive features "¥" and "password", a sensitivity degree of the sensitive area a falls within the range (a, b].

As shown in Table 3, when a sensitivity degree of a sensitive area falls within the range [0, a], N=2; when a sensitivity degree of a sensitive area falls within the range (a, b], N=3; when a sensitivity degree of a sensitive area falls within the range (e, f], N=6; or when a sensitivity degree of a sensitive area falls within the range (f, g], N=8. It can be learned from Table 3 that a higher sensitivity degree of a sensitive area indicates a larger quantity N of frames of first noise-added sub-images generated for the sensitive area.

In a sixth implementation, N may be determined based on the amount of remaining electricity of the terminal and the sensitivity degree of the sensitive area. In other words, N is determined based on the amount of remaining electricity of the terminal and the sensitivity degree of the sensitive area. In this case, when the amount of remaining electricity of the terminal is fixed, a higher sensitivity degree of the sensitive area indicates a larger quantity N of frames of first noise-added sub-images generated for the sensitive area.

It should be noted that, in the fourth implementation and the fifth implementation, it is assumed that one frame of image includes a plurality of sensitive areas. If sensitivity degrees of two of the plurality of sensitive areas fall within a same range, the terminal generates a same quantity N of frames of first noise-added sub-images for the two sensitive areas; or if sensitivity degrees of the two sensitive areas fall within different ranges, the terminal generates different quantities N of frames of first noise-added sub-images for the two sensitive areas.

In this embodiment of this application, the terminal may add noise to a sub-image by using a group of noise parameters $\{W_1, W_2, \ldots, W_N\}$, and generate N frames of first noise-added sub-images based on an image of a sensitive area.

$$\sum_{n=1}^{N} W_n = 0,$$

and $W_n$ is an $n^{th}$ noise parameter in the sensitive area.

Figure 14:
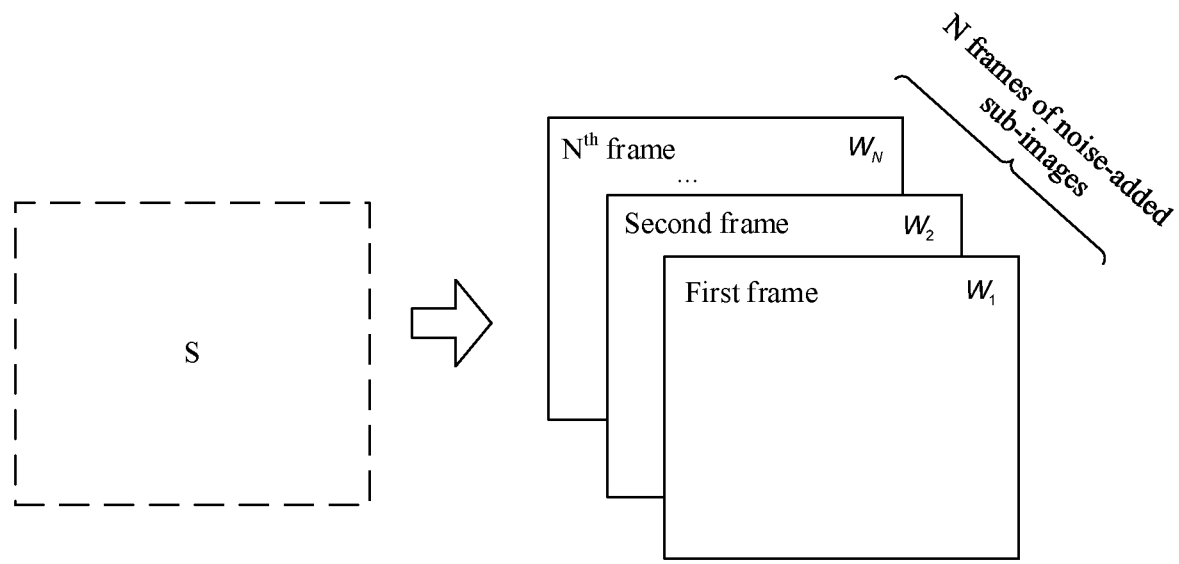
FIG. 14 is a schematic diagram 1 of an example of a sensitive area and N noise-added sub-images of the sensitive area according to an embodiment of this application.

For example, one frame of image 1101 shown in FIG. 11(a) includes one sensitive area S. As shown in FIG. 14, the terminal may generate N frames of first noise-added sub-images based on an image of the sensitive area S by using a group of noise parameters $\{W_1, W_2, \ldots, W_N\}$. In the N frames of first noise-added sub-images, a noise parameter corresponding to a first frame of first noise-added sub-image is $W_1$, a noise parameter corresponding to a second frame of first noise-added sub-image is $W_2, \ldots$, a noise parameter corresponding to an $n^{th}$ frame of first noise-added sub-image is $W_n, \ldots$, and a noise parameter corresponding to an $N^{th}$ frame of first noise-added sub-image is $W_N$.

Specifically, a method in which the terminal generates the N frames of first noise-added sub-images based on the image of the sensitive area may include S1202a to S1202c. In other words, S1202 may include S1202a to S1202c.

S1202a. The terminal determines a pixel value of each pixel in the image of the sensitive area.

Figure 15A:
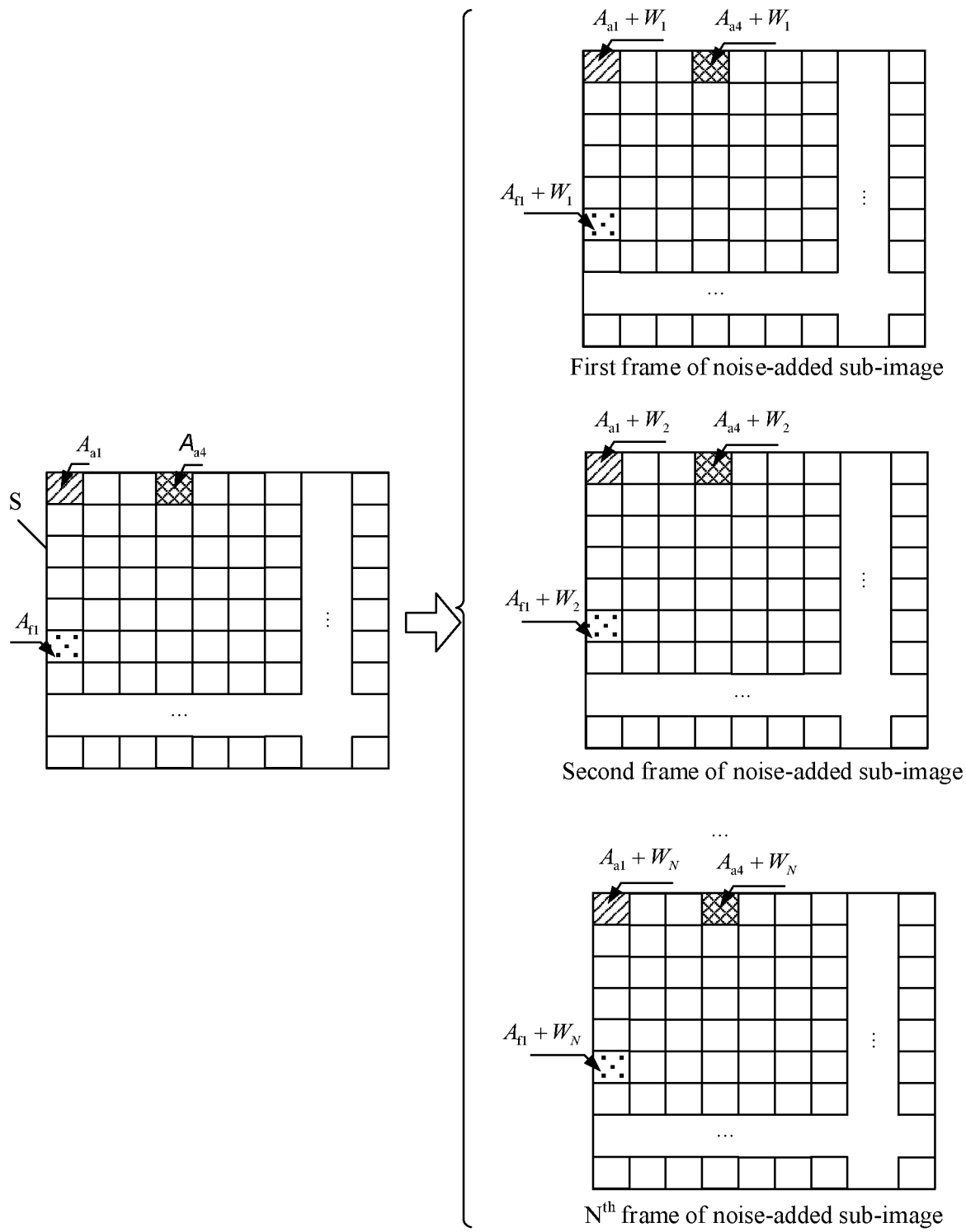
FIG. 15A is a schematic diagram 1 of a principle of generating N noise-added sub-images according to an embodiment of this application.

For example, the sensitive area S shown in FIG. 14 is used as an example. As shown in FIG. 15A, a pixel value of the first pixel (which is referred to as an $a1^{th}$ pixel for short) in the first row of the sensitive area S is $A_{a1}$, a pixel value of the fourth pixel (which is referred to as an $a4^{th}$ pixel for short) in the first row is $A_{a4}$, and a pixel value of the first pixel (which is referred to as an $f1^{th}$ pixel for short) in the sixth row is $A_{11}$.

S1202b. The terminal determines N noise parameters in the sensitive area, where a sum of the N noise parameters is zero.

In an implementation, the N noise parameters $\{W_1, W_2, \ldots, W_N\}$ may be random values, provided that the N noise parameters meet $$\sum_{n=1}^{N} W_n = 0.$$

In another implementation, the N noise parameters $\{W_1, W_2, \ldots, W_N\}$ may conform to even distribution or Gaussian distribution, provided that the N noise parameters meet $$\sum_{n=1}^{N} W_n = 0.$$

The terminal may perform S1202c for each of the N noise parameters, to calculate a pixel value of each pixel in a frame of first noise-added sub-image, so as to obtain the frame of first noise-added sub-image.

S1202c. The terminal calculates the pixel value of each pixel in the frame of first noise-added sub-image by using a formula (1), to obtain the frame of first noise-added sub-image.

$a_{n,i} = A_i + W_n$  Formula (1)

$A_i$ is a pixel value of a pixel i in the image of the sensitive area, $i \in \{1, 2, \ldots, Q\}$, is a total quantity of pixels in the image of the sensitive area, $W_n$ is the $n^{th}$ noise parameter in the sensitive area, $n \in \{1, 2, \ldots, N\}, \sum_{n=1}^{N} W_n = 0,$ and $a_{n,i}$ is a pixel value of the pixel i in the $n^{th}$ frame of first noise-added sub-image.

For example, the sensitive area S shown in FIG. 14 is used as an example. As shown in FIG. 15A, the terminal may obtain the following through calculation by using the formula (1).

In the first frame of first noise-added sub-image, in other words, when n=1, a pixel value of the first pixel (namely, the a1$^{th}$ pixel) in the first row is $a_{i, a1}=A_{a1}+W_1$, a pixel value of the fourth pixel (the a4$^{th}$ pixel for short) in the first row is $a_{i, a4}=A_{a4}+W_1$, and a pixel value of the first pixel (the f1$^{th}$ pixel for short) in the sixth row is $a_{1, f1}=A_{f1}+W_1$.

In the second frame of first noise-added sub-image, in other words, when n=2, a pixel value of the first pixel (namely, the a1$^{th}$ pixel) in the first row is $a_{2, a1}=A_{a1}+W_2$, a pixel value of the fourth pixel (the a4$^{th}$ pixel for short) in the first row is $a_{2, a4}=A_{a4}+W_2$, and a pixel value of the first pixel (the f1$^{th}$ pixel for short) in the sixth row is $a_{2, f1}=A_{f1}+W_2$.

In the N$^{th}$ frame of first noise-added sub-image, in other words, when n=N, a pixel value of the first pixel (namely, the a1$^{th}$ pixel) in the first row is $a_{N, a1}=A_{a1}+W_N$, a pixel value of the fourth pixel (the a4$^{th}$ pixel for short) in the first row is $a_{N, a4}=A_{a4}+W_N$, and a pixel value of the first pixel (the f1$^{th}$ pixel for short) in the sixth row is $a_{N, f1}=A_{f1}+W_N$.

It should be noted that, in this embodiment of this application, a method for calculating a pixel value of another pixel in the first frame of first noise-added sub-image, the second frame of first noise-added sub-image, and the N$^{th}$ frame of first noise-added sub-image is not described herein in this embodiment of this application. In addition, a method for calculating a pixel value of each pixel in another first frame of noise-added sub-image other than the first frame of first noise-added sub-image, the second frame of first noise-added sub-image, and the N$^{th}$ frame of first noise-added sub-image in the N frames of noise-added sub-images is not described herein in this embodiment of this application.

The terminal may sequentially perform noise addition processing (in other words, superimpose a noise parameter on the image of the sensitive area) on the image of the sensitive area in the frame of image by using each noise parameter (for example, $W_n$) in the foregoing group of noise parameters $\{W_1, W_2, \ldots, \text{and } W_N\}$, to obtain the second image including the N frames of first noise-added sub-images. A same noise parameter is used for noise addition processing of all pixels in each frame of first noise-added sub-image. For example, as shown in FIG. 14, in the first frame of first noise-added sub-image, a noise parameter $W_1$ is used for noise addition processing of all pixels. Different noise parameters are used for noise addition processing of different frames of first noise-added sub-images. For example, as shown in FIG. 14, a noise parameter $W_1$ is used for noise addition processing of the first frame of first noise-added sub-image, a noise parameter $W_2$ is used for noise addition processing of the second frame of first noise-added sub-image, and $W_1$ is different from $W_2$.

It should be noted that, as shown in FIG. 15A, in this embodiment of this application, noise parameters used for all pixels in one frame of first noise-added sub-image may be the same.

Optionally, in this embodiment of this application, noise parameters used for different pixels in one frame of first noise-added sub-image may be alternatively different. For example, the sensitive area includes Q pixels, and the terminal may perform noise addition processing on the image of the sensitive area by using Q groups of noise parameters. A group of noise parameters used for noise addition processing of $i^{th}$ pixels in the N frames of first noise-added sub-images are $\{W_{1, i}, W_{2, i}, \ldots, W_{n, i}, \ldots,$ and $W_{N, i}\}$, and $\sum_{n=1}^{N} W_{n,i} = 0.$ $W_{n, i}$ is a noise parameter for an $i^{th}$ pixel in the $n^{th}$ frame of first noise-added sub-image. Noise parameters for all pixels in the $n^{th}$ frame of first noise-added sub-image are $\{W_{n, 1}, W_{n, 2}, \ldots, W_{n, 1}, \ldots,$ and $W_{n, Q}\}$.

In other words, the formula (1) may be replaced with a formula (2):

$a_{n,i}=A_i+W_{n,i}$            Formula (2)

Figure 15B:
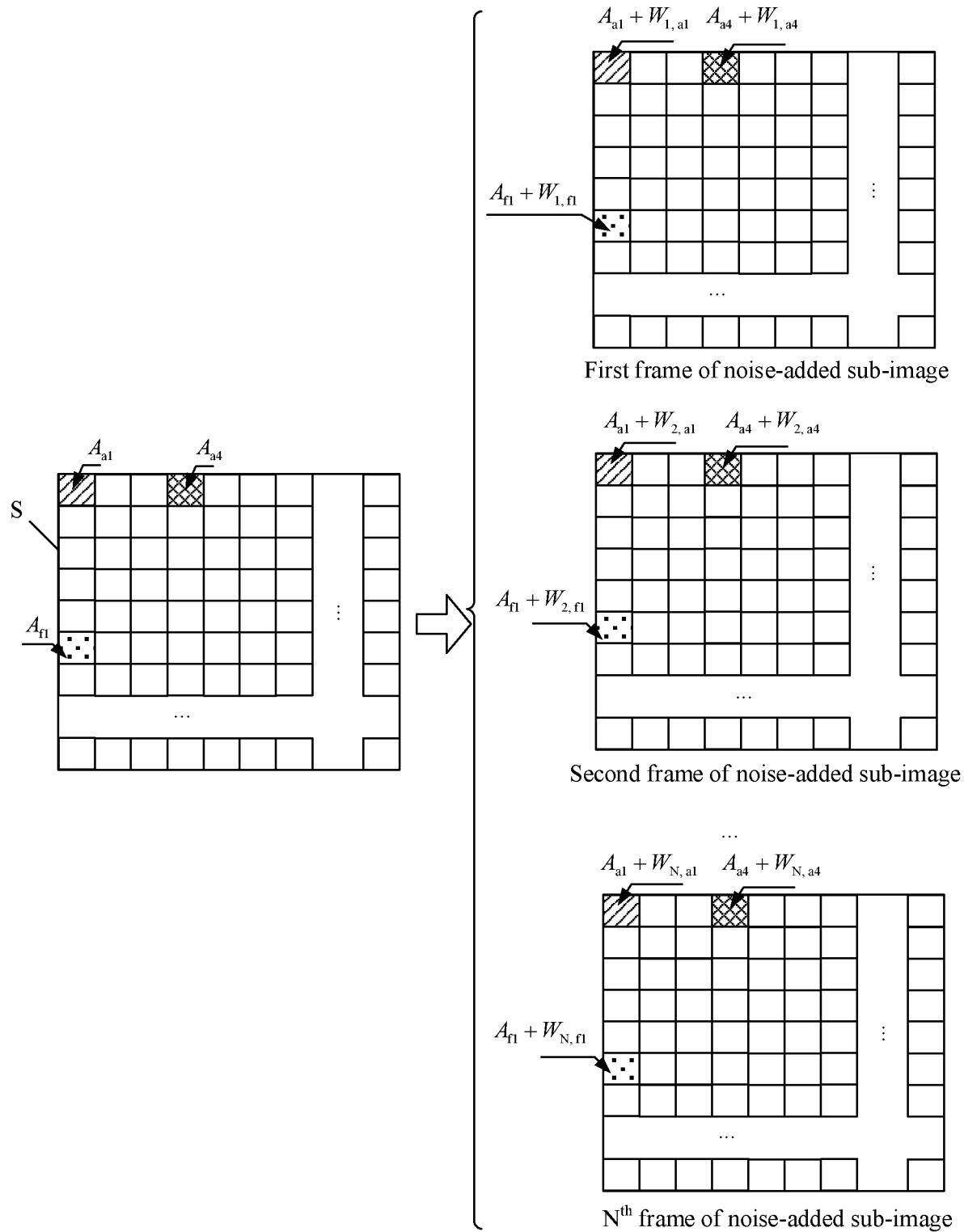
FIG. 15B is a schematic diagram 2 of a principle of generating N noise-added sub-images according to an embodiment of this application.

For example, the sensitive area S shown in FIG. 14 is used as an example. As shown in FIG. 15B, a pixel value of the first pixel (which is referred to as an a1$^{th}$ pixel for short) in the first row of the sensitive area S is $A_{a1}$, a pixel value of the fourth pixel (which is referred to as an a4$^{th}$ pixel for short) in the first row is $A_{a4}$, and a pixel value of the first pixel (which is referred to as an f1$^{th}$ pixel for short) in the sixth row is $A_{f1}$. As shown in FIG. 15B, the terminal may obtain the following through calculation by using the formula (1).

In the first frame of first noise-added sub-image, in other words, when n=1, a pixel value of the first pixel (namely, the a1$^{th}$ pixel) in the first row is $a_{1, a1}=A_{a1}+W_{1, a1}$, a pixel value of the fourth pixel (the a4$^{th}$ pixel for short) in the first row is $a_{1, a4}=A_{a4}+W_{1, a4}$, and a pixel value of the first pixel (the f1$^{th}$ pixel for short) in the sixth row is $a_{1, f1}=A_{f1}+W_{1, f1}$.

In the second frame of first noise-added sub-image, in other words, when n=2, a pixel value of the first pixel (namely, the a1$^{th}$ pixel) in the first row is $a_{2, a1}=A_{a1}+W_{2, a2}$, a pixel value of the fourth pixel (the a4$^{th}$ pixel for short) in the first row is $a_{2, a4}=A_{a4}+W_{2, a4}$, and a pixel value of the first pixel (the f1$^{th}$ pixel for short) in the sixth row is $a_{2, f1}=A_{f1}+W_{2, f1}$.

In the N$^{th}$ frame of first noise-added sub-image, in other words, when n=N, a pixel value of the first pixel (namely, the a1$^{th}$ pixel) in the first row is $a_{N, a1}=A_{a1}+W_{N, a1}$, a pixel value of the fourth pixel (the a4$^{th}$ pixel for short) in the first row is $a_{N, a4}=A_{a4}+W_{N, a4}$, and a pixel value of the first pixel (the f1$^{th}$ pixel for short) in the sixth row is $a_{N, f1}=A_{f1}+W_{N, f1}$.

$\sum_{n=1}^{N} W_{n,a1} = 0, \sum_{n=1}^{N} W_{n,a4} = 0, \text{ and } \sum_{n=1}^{N} W_{n,f1} = 0.$ It may be understood that, a sum of each group of noise parameters in at least one group of noise parameters used to perform noise addition processing on the image of the sensitive area in the frame of image is zero. For example, $\{W_{1, i}, W_{2, i}, \ldots, W_{n, i}, \ldots,$ and $W_{N, i}\}$ meet $\sum_{n=1}^{N} W_{n,i} = 0.$ Therefore, an average value $\overline{A}_i$ of pixel values of the pixels i in the N frames of first noise-added sub-images is $A_i$. $A_i$ is a pixel value of the pixel i in the sensitive area before noise addition processing is performed. In this way, based on a low-pass effect of human vision, human eyes cannot perceive a difference between an image obtained after noise addition processing and an image existing before noise addition processing, so that it can be ensured that the image obtained after noise addition processing and the image existing before noise addition processing are the same from a perspective of human eyes, and visual experience of a user can be ensured.

Specifically, a pixel value of the pixel i in the first frame of first noise-added sub-image is $a_{1,i}=A_i+W_{1,i}$, a pixel value of the pixel i in the second frame of first noise-added sub-image is $a_{2,i}=A_i+W_{2,i}$, ..., a pixel value of the pixel i in the $n^{th}$ frame of first noise-added sub-image is $a_{n,i}=A_i+W_{n,i}$, ..., and a pixel value of the pixel i in the $N^{th}$ frame of first noise-added sub-image is $a_{N,i}=A_i+W_{N,i}$.

In this case, the average value of the pixel values of the pixels i in the N frames of first noise-added sub-images is $$\overline{A}_i = \frac{1}{N} \times \sum_{n=1}^{N} a_{n,i} = \frac{1}{N} \times (A_i + W_{1,i} + A_i + W_{2,i} + \ldots + A_i + W_{n,i} + \ldots +$$

$$A_i + W_{N,i}) = \frac{1}{N} \times \left(N \times A_i + \sum_{n=1}^{N} W_{n,i}\right) = A_i.$$

Optionally, in another implementation, a fluctuation of the N noise parameters $\{W_{1,i}, W_{2,i}, \ldots, W_{n,i}, \ldots,$ and $W_{N,i}\}$ for the $i^{th}$ pixels is directly proportional to the sensitivity degree of the sensitive area. The fluctuation of the N noise parameters is represented by a variance of the pixel values of the pixels i in the N frames of noise-added sub-images.

Based on the foregoing example, the variance of the pixel values of the pixels i in the N frames of first noise-added sub-images is:

$$s^2 = \frac{1}{N} \times ((a_{1,i}-A_i)^2 + (a_{2,i}-A_i)^2 + \ldots + (a_{n,i}-A_i)^2 + \ldots + (a_{N,i}-A_i)^2) =$$

$$\frac{1}{N} \times (W_{1,i}^2 + W_{2,i}^2 + \ldots + W_{n,i}^2 + \ldots + W_{N,i}^2) = \frac{1}{N} \times \sum_{n=1}^{N} W_{n,i}^2.$$

If the sensitivity degree of the sensitive area is higher, the fluctuation of the group of noise parameters $\{W_{1,i}, W_{2,i}, \ldots, W_{n,i}, \ldots,$ and $W_{N,i}\}$ used by the terminal to perform noise addition processing on the $i^{th}$ pixels in the sensitive area is larger, in other words, the variance $s^2$ of the pixel values of the pixels i in the N frames of first noise-added sub-images is larger.

Further, due to a limitation of hardware of the display of the terminal, a range of a pixel value $A_i$ of a pixel (for example, the pixel i) in the image displayed by the terminal is [0, P]. Therefore, it needs to be ensured that a range of a pixel value of each pixel in each frame of first noise-added sub-image obtained after noise addition processing is [0, P]. For example, $0 \leq a_{n,i} \leq P$. In other words, $0 \leq A_i \leq W_{n,i} \leq P$, and $-A_i \leq W_{n,i} \leq P - A_i$.

In addition, based on a low-pass effect of human vision, to ensure that an image obtained after noise addition processing and an image existing before noise addition processing are the same from a perspective of human eyes, the average value $\overline{A}_i$ of the pixel values of the pixels i in the N frames of first noise-added sub-images after noise addition is the same as the pixel value $A_i$ of the pixel i before noise addition processing. The terminal needs to compensate the $n^{th}$ frame for noise in first n–1 frames of noise-added sub-images. According to $$\sum_{n=1}^{N} W_{n,i} = 0,$$

it may be learned that $$W_{n,i} = -\sum_{k=1}^{n-1} W_{k,i} - \sum_{k=n+1}^{N} W_{k,i} \cdot \sum_{k=1}^{n-1} W_{k,i}$$

is a sum of noise parameters used for noise addition processing of the first n–1 frames of first noise-added sub-images in the N frames of first noise-added sub-images, $$\sum_{k=n+1}^{N} W_{k,i}$$

is a sum of noise parameters used for noise addition processing of the $(n+1)^{th}$ frame of first noise-added sub-image to the $N^{th}$ frame of first noise-added sub-image (a total of N–n frames) in the N frames of first noise-added sub-images, and $N \geq n$. When $N=n$, $$\sum_{k=n+1}^{N} W_{k,i} = 0.$$

Because a noise parameter used for noise addition processing of each frame of first noise-added sub-image meets $-A_i \leq W_{k,i} \leq P - A_i$, the sum $$\sum_{k=n+1}^{N} W_{k,i}$$

of the noise parameters used for noise addition processing of the N–n frames of first noise-added sub-images needs to meet the following formula (3):

$$-A_i \times (N-n) \leq \sum_{k=n+1}^{N} W_{k,i} \leq (P-A_i) \times (N-n) \quad \text{Formula (3)}$$

According to $$W_{n,i} = -\sum_{k=1}^{n-1} W_{k,i} - \sum_{k=n+1}^{N} W_{k,i},$$

it can be learned that $$\sum_{k=n+1}^{N} W_{k,i} = -W_{n,i} - \sum_{k=1}^{n-1} W_{k,i}.$$

According to $$\sum_{k=n+1}^{N} W_{k,i} = -W_{n,i} - \sum_{k=1}^{n-1} W_{k,i}$$

and the formula (3), it can be learned that:

$$-(N-n) \times A_i \le -W_{n,i} - \sum_{k=1}^{n-1} W_{k,i} \le (N-n) \times (P - A_i);$$

$$(N-n) \times (A_i - P) \le W_{n,i} + \sum_{k=1}^{n-1} W_{k,i} \le (N-n) \times A_i; \text{ and}$$

$$(N-n) \times (A_i - P) - \sum_{k=1}^{n-1} W_{k,i} \le W_{n,i} \le (N-n) \times A_i - \sum_{k=1}^{n-1} W_{k,i}.$$

In other words, $W_{n,i}$ meets both of the following condition (1) and condition (2):

$$-A_i \le W_{n,i} \le P - A_i. \quad \text{Condition (1)}$$

$$(N-n) \times (A_i - P) - \sum_{k=1}^{n-1} W_{k,i} \le \quad \text{Condition (2)}$$

$$W_{n,i} \le (N-n) \times A_i - \sum_{k=1}^{n-1} W_{k,i}.$$

It can be learned from the foregoing condition (1) and condition (2) that the $n^{th}$ noise parameter $W_{n,i}$ in the sensitive area meets a formula (4):

$$\max\left(-A_i, (N-n) \times (A_i - P) - \sum_{k=1}^{n-1} W_{k,i}\right) \le$$

$$W_{n,i} \le \min\left(P - A_i, (N-n) \times A_i - \sum_{k=1}^{n-1} W_{k,i}\right)$$

max(x, y) indicates that a maximum value in x and y is selected, and min(x, y) indicates that a minimum value in x and y is selected.

It should be noted that the pixel value in this embodiment of this application may be a color value of a color component of a pixel. The terminal may perform S1202a to S1202c for a color value of each color component of each pixel, to obtain a frame of first noise-added sub-image. Color components of the pixel may include three basic colors: red, green, and blue (Red Green Blue, RGB). For example, a method in which the terminal calculates a pixel value of the $i^{th}$ pixel in the $n^{th}$ frame of noise-added sub-image may include: calculating, by the terminal, color components of the $i^{th}$ pixel in the $n^{th}$ frame of first noise-added sub-image by using $R_{n,i} = R_i + W_{n,i}$, $G_{n,i} = G_i + W_{n,i}$, and $B_{n,i} = B_i + W_{n,i}$, where $R_i$, $G_i$, and $B_i$ are color values of color components of the pixel i before noise addition processing, $R_{n,i}$ is a color value obtained after noise addition processing is performed based on $R_i$, $G_{n,i}$ is a color value obtained after noise addition processing is performed based on $G_i$, and $B_{n,i}$ is a color value obtained after noise addition processing is performed based on $B_i$; and determining, by the terminal, the pixel value $a_{n,i}$ of the pixel i in the $n^{th}$ frame of first noise-added sub-image according to $R_{n,i}$, $G_{n,i}$, and $B_{n,i}$.

As described in the foregoing embodiment, the sum of the N noise parameters may be zero. Optionally, the sum of the group of noise parameters (namely, the N noise parameters) in this embodiment of this application may be alternatively within a preset parameter range. A difference between zero and each of an upper limit value and a lower limit value of the preset parameter range is less than a preset parameter threshold. For example, the preset parameter threshold may be 0.3 or 0.05. For example, the preset parameter threshold may be 0.3, and the preset parameter range may be [−0.3, 0.2].

S1203. The terminal displays the N frames of first noise-added sub-images in the sensitive area at the second screen refresh rate, where an output frame rate of the N frames of first noise-added sub-images is the second frame rate.

The second frame rate is N times the first frame rate, and the second screen refresh rate is N times the first screen refresh rate. The first frame rate is an output frame rate used when the terminal displays an image before the terminal enters the noise addition mode. The first screen refresh rate is a screen refresh rate used before the terminal enters the noise addition mode.

Figure 15C:
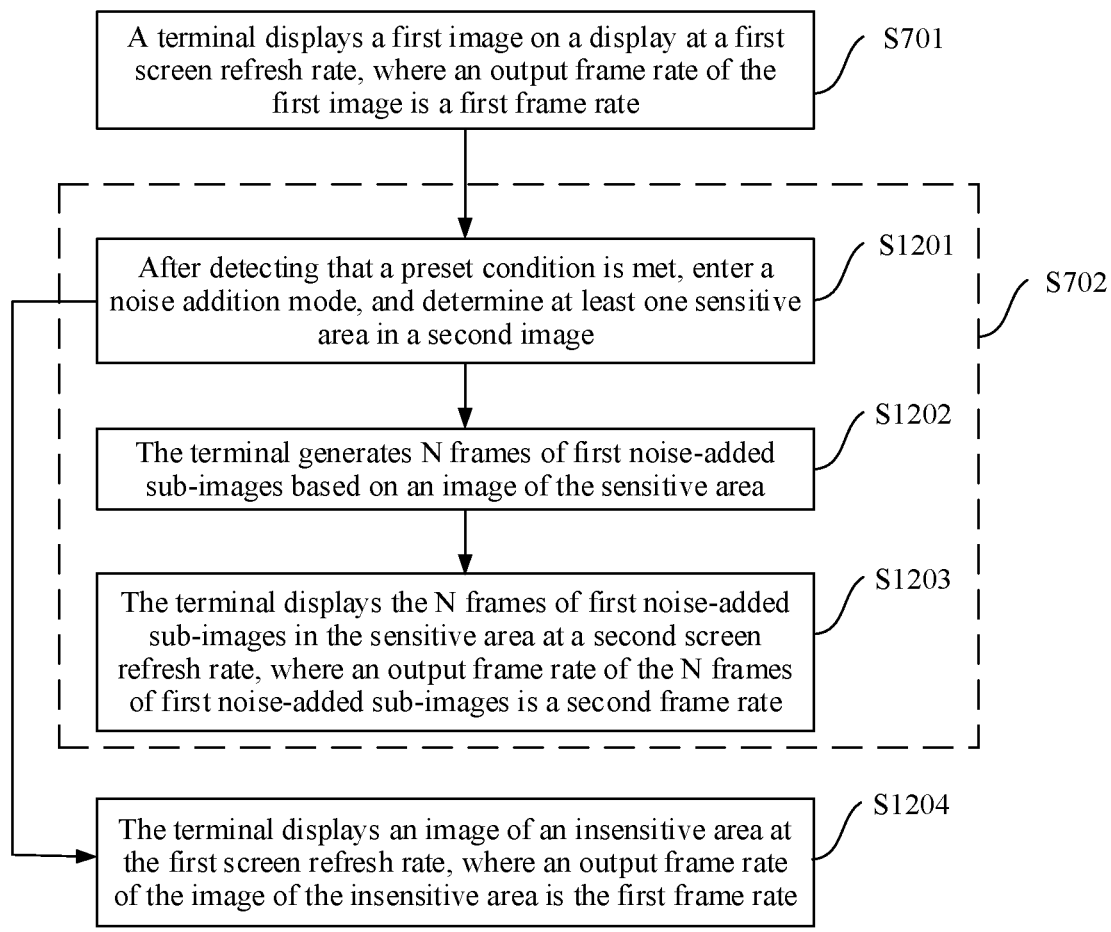
FIG. 15C is a flowchart 3 of an image display method according to an embodiment of this application.

In an implementation of the first application scenario, the insensitive area is displayed at the first screen refresh rate, and the output frame rate of the insensitive area is the first frame rate. As shown in FIG. 15C, after S1201 in FIG. 12, the method in this embodiment of this application may further include S1204.

S1204. The terminal displays an image of the insensitive area at the first screen refresh rate, where the output frame rate of the insensitive area is the first frame rate.

The second frame rate is N times the first frame rate, and the second screen refresh rate is N times the first screen refresh rate. In other words, when displaying the N frames of first noise-added sub-images in the sensitive area at the second screen refresh rate and the second frame rate, the terminal displays the image (one frame of image) of the insensitive area at the first screen refresh rate and the first frame rate. In this implementation, no noise is superimposed on the image of the insensitive area.

Figure 15D:
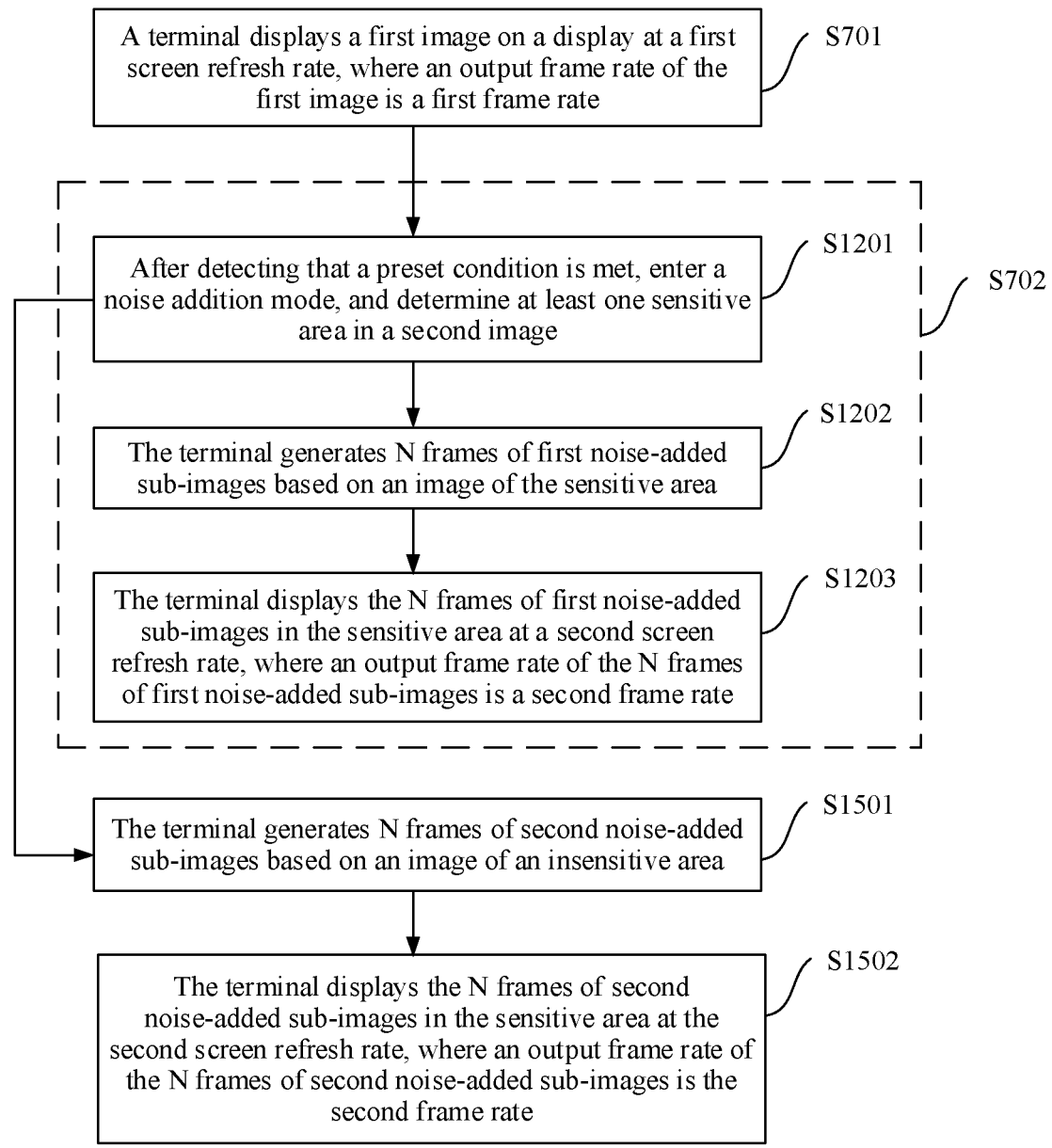
FIG. 15D is a flowchart 4 of an image display method according to an embodiment of this application.

In another implementation of the first application scenario, the insensitive area is displayed at the second screen refresh rate, and the output frame rate of the insensitive area is the second frame rate. As shown in FIG. 15D, after S1201 in FIG. 12, the method in this embodiment of this application may further include S1501 and S1502.

S1501. The terminal generates N frames of second noise-added sub-images based on an image of the insensitive area.

S1502. The terminal displays the N frames of second noise-added sub-images in the sensitive area at the second screen refresh rate, where an output frame rate of the N frames of second noise-added sub-images is the second frame rate.

For a method in which the terminal generates the N frames of second noise-added sub-images based on the image of the insensitive area, refer to the method in which the terminal generates the N frames of first noise-added sub-images based on the image of the sensitive area in S1202. Details are not described herein in this embodiment of this application.

A difference lies in that at least one group of noise parameters used by the terminal to generate the N frames of second noise-added sub-images are different from the at least one group of noise parameters used by the terminal to generate the N frames of first noise-added sub-images. Specifically, compared with that of the noise parameters used to generate the N frames of first noise-added sub-images, a fluctuation of the noise parameters used to generate the N frames of second noise-added sub-images is smaller. A larger fluctuation of noise parameters indicates a higher scrambling degree of an image on which the noise parameters are superimposed. In other words, although the terminal outputs N frames of noise-added sub-images in the sensitive area and the insensitive area at a same screen refresh rate and a same frame rate, a noise addition degree of the image of the sensitive area is higher than a noise addition degree of the image of the insensitive area.

In the image display method provided in this embodiment of this application, the terminal may output N frames of noise-added sub-images in the sensitive area and the insensitive area at the same screen refresh rate and the same frame rate. In other words, the terminal may display all content of the second image at a same screen refresh rate (namely, the second screen refresh rate) and a same frame rate (the second frame rate), and a screen does not need to support different refresh rates in different display areas. This greatly reduces a requirement for the screen. In addition, the terminal may scramble the sensitive area and the insensitive area at different degrees.

For example, in this embodiment of this application, an example in which the second image 1101 shown in FIG. 11(*a*) includes the sensitive area S is used herein to describe a method for displaying the second image in this embodiment of this application.

Figure 16:
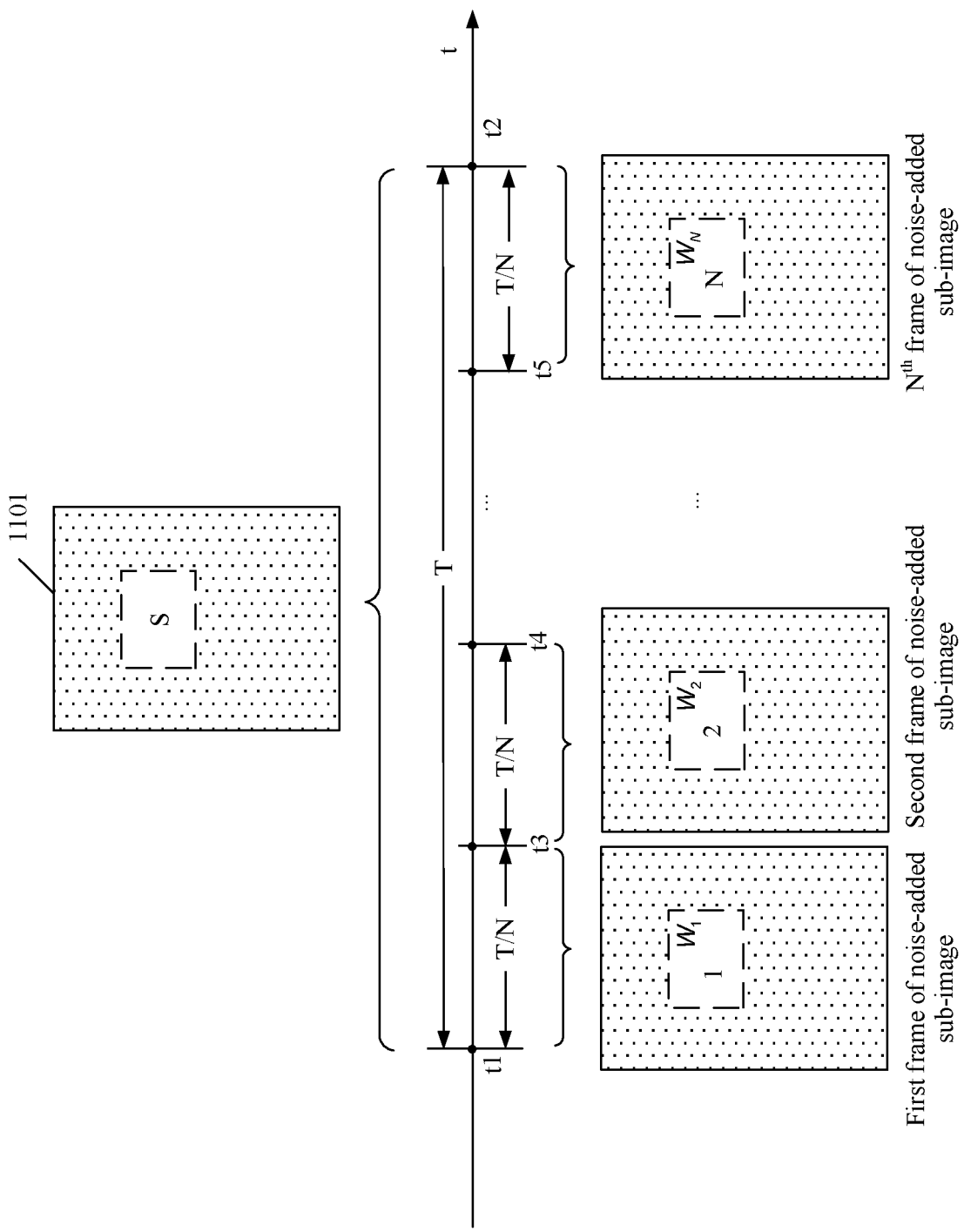
FIG. 16 is a schematic diagram 1 of a principle of an image display method according to an embodiment of this application.

As shown in FIG. 16, the second image 1101 includes the sensitive area S, and an area (an area filled with black dots) other than the sensitive area S in the second image 1101 is an insensitive area. A time period T from t1 to t2 is a time in which the terminal displays the second image 1101 by using a conventional solution.

As shown in FIG. 16, in the conventional solution, the terminal displays the second image 1101 in the time period T from t1 to t2. However, in the image display method provided in this embodiment of this application, the terminal may evenly divide the time period T from t1 to t2 into N segments, and in each segment of time T/N, the terminal may display one frame of first noise-added sub-image in the sensitive area S. For example, as shown in FIG. 16, in a time period T/N from t1 to t3, the terminal displays the first frame of first noise-added sub-image in the sensitive area S; in a time period T/N from t3 to t4, the terminal displays the second frame of first noise-added sub-image in the sensitive area S; . . . ; and in a time period T/N from t5 to t2, the terminal displays the $N^{th}$ frame of first noise-added sub-image in the sensitive area S.

In the time period T from t1 to t2, even if the terminal displays different first noise-added sub-images in the sensitive area S, a frame rate and a refresh rate of an image displayed in the insensitive area on the terminal remain unchanged.

Alternatively, in the time period T/N from t1 to t3, the terminal displays a first frame of second noise-added sub-image in the insensitive area; in the time period T/N from t3 to t4, the terminal displays a second frame of second noise-added sub-image in the insensitive area; . . . ; and in the time period T/N from t5 to t2, the terminal displays an $N^{th}$ frame of second noise-added sub-image in the insensitive area. In the time period T from t1 to t2, the terminal displays different second noise-added sub-images in the insensitive area.

For example, in this embodiment of this application, an example in which the second image 1102 shown in FIG. 11(*b*) includes two sensitive areas (the sensitive area S1 and the sensitive area S2) is used herein to describe a method for displaying the second image by the terminal when the second image includes a plurality of sensitive areas in this embodiment of this application.

As shown in FIG. 17, the terminal may generate N1 frames of first noise-added sub-images for the sensitive area S1, and generate N2 frames of first noise-added sub-images for the sensitive area S2. N1 is the same as N2. Alternatively, N1 is different from N2.

In addition, a group of noise parameters used by the terminal to perform noise addition processing on the sensitive area S1 are $\{W_{a1}, W_{a2}, \ldots, \text{and } W_{aN\,1}\}$, and $$\sum_{n=1}^{N1} W_{an} = 0.$$

A noise parameter used for noise addition processing of a first frame (which is also referred to as an $a1^{th}$ frame) of first noise-added sub-image is $W_{a1}$; a noise parameter used for noise addition processing of a second frame (which is also referred to as an $a2^{th}$ frame) of first noise-added sub-image is $W_{a2}$; . . . ; and a noise parameter used for noise addition processing of an $N1^{th}$ frame (which is also referred to as an a $N1^{th}$ frame) of first noise-added sub-image is $W_{aN\,1}$.

A group of noise parameters used by the terminal to perform noise addition processing on the sensitive area S2 are $\{W_{b1}, W_{b2}, \ldots, \text{and } W_{bN\,2}\}$, and $$\sum_{n=1}^{N2} W_{bn} = 0.$$

The noise parameters $\{W_{a1}, W_{a2}, \ldots, \text{and } W_{aN\,2}\}$ may be the same as or different from the noise parameters $\{W_{b1}, W_{b2}, \ldots, \text{and } W_{bN\,2}\}$. A noise parameter used for noise addition processing of a first frame (which is also referred to as a $b1^{th}$ frame) of first noise-added sub-image is $W_{b1}$; a noise parameter used for noise addition processing of a second frame (which is also referred to as a $b2^{th}$ frame) of first noise-added sub-image is $W_{b2}$; . . . ; and a noise parameter used for noise addition processing of an $N1^{th}$ frame (which is also referred to as a $bN2^{th}$ frame) of first noise-added sub-image is $W_{bN\,2}$.

Further, the noise parameters $\{W_{a1}, W_{a2}, \ldots, \text{and } W_{aN\,1}\}$ and the noise parameters $\{W_{b1}, W_{b2}, \ldots, \text{and } W_{bN\,2}\}$ may further meet a condition corresponding to the formula (3).

Figure 18:
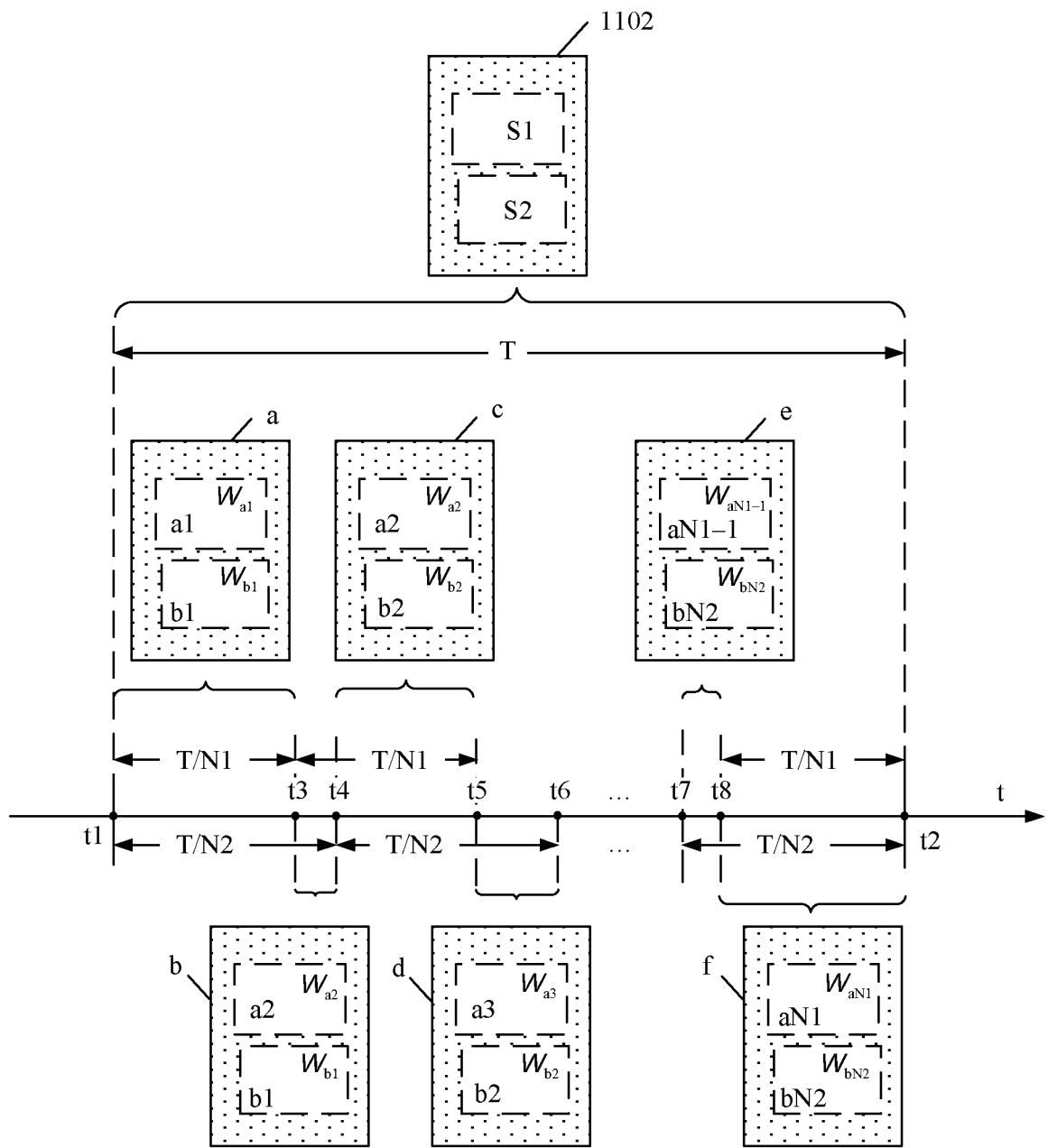
FIG. 18 is a schematic diagram 2 of a principle of an image display method according to an embodiment of this application.

As shown in FIG. 18, the second image 1102 includes the sensitive area S1 and the sensitive area S2, and an area (an area filled with black dots) other than the sensitive area S1 and the sensitive area S2 in the second image 1102 is an insensitive area. A time period T from t1 to t2 is a time in which the terminal displays the second image 1102 by using a conventional solution.

As shown in FIG. 18, in the conventional solution, the terminal displays the second image 1102 in the time period T from t1 to t2. However, in the image display method provided in this embodiment of this application, the terminal may evenly divide the time period T from t1 to t2 into N1 segments, and in each segment T/N1, the terminal may display one frame of first noise-added sub-image of the sensitive area S1 in the sensitive area S1; and the terminal may evenly divide the time period T from t1 to t2 into N2 segments, and in each segment T/N2, the terminal may display one frame of first noise-added sub-image of the sensitive area S2 in the sensitive area S2.

For example, as shown in FIG. 18, in a time period from t1 to t3 (the time period from t1 to t3 belongs to the first T/N1 segment and belongs to the first T/N2 segment), the terminal displays the $a1^{th}$ frame of first noise-added sub-image in the sensitive area S1, and displays the $b1^{th}$ frame of first noise-added sub-image in the sensitive area S2. In other words, the terminal displays an image a shown in FIG. 18.

In a time period from t3 to t4 (the time period from t3 to t4 belongs to the second T/N1 segment and belongs to the first T/N2 segment), the terminal displays the $a2^{th}$ frame of first noise-added sub-image in the sensitive area S1, and displays the $b1^{th}$ frame of first noise-added sub-image in the sensitive area S2. In other words, the terminal displays an image b shown in FIG. 18.

In a time period from t4 to t5 (the time period from t4 to t5 belongs to the second T/N1 segment and belongs to the second T/N2 segment), the terminal displays the $a2^{th}$ frame of first noise-added sub-image in the sensitive area S1, and displays the $b2^{th}$ frame of first noise-added sub-image in the sensitive area S2. In other words, the terminal displays an image c shown in FIG. 18.

In a time period from t5 to t6 (the time period from t5 to t6 belongs to the third T/N1 segment and belongs to the second T/N2 segment), the terminal displays the $a3^{th}$ frame of first noise-added sub-image in the sensitive area S1, and displays the $b2^{th}$ frame of first noise-added sub-image in the sensitive area S2. In other words, the terminal displays an image d shown in FIG. 18.

In a time period from t7 to t8 (the time period from t7 to t8 belongs to the $(N1-1)^{th}$ T/N1 segment and belongs to the $N2^{th}$ T/N2 segment), the terminal displays the $(aN1-1)^{th}$ frame of first noise-added sub-image in the sensitive area S1, and displays the $bN2^{th}$ frame of first noise-added sub-image in the sensitive area S2. In other words, the terminal displays an image e shown in FIG. 18.

In a time period from t8 to t9 (the time period from t8 to t9 belongs to the $N1^{th}$ T/N1 segment and belongs to the $N2^{th}$ T/N2 segment), the terminal displays the $aN1^{th}$ frame of first noise-added sub-image in the sensitive area S1, and displays the $bN2^{th}$ frame of first noise-added sub-image in the sensitive area S2. In other words, the terminal displays an image f shown in FIG. 18.

Figure 19A:
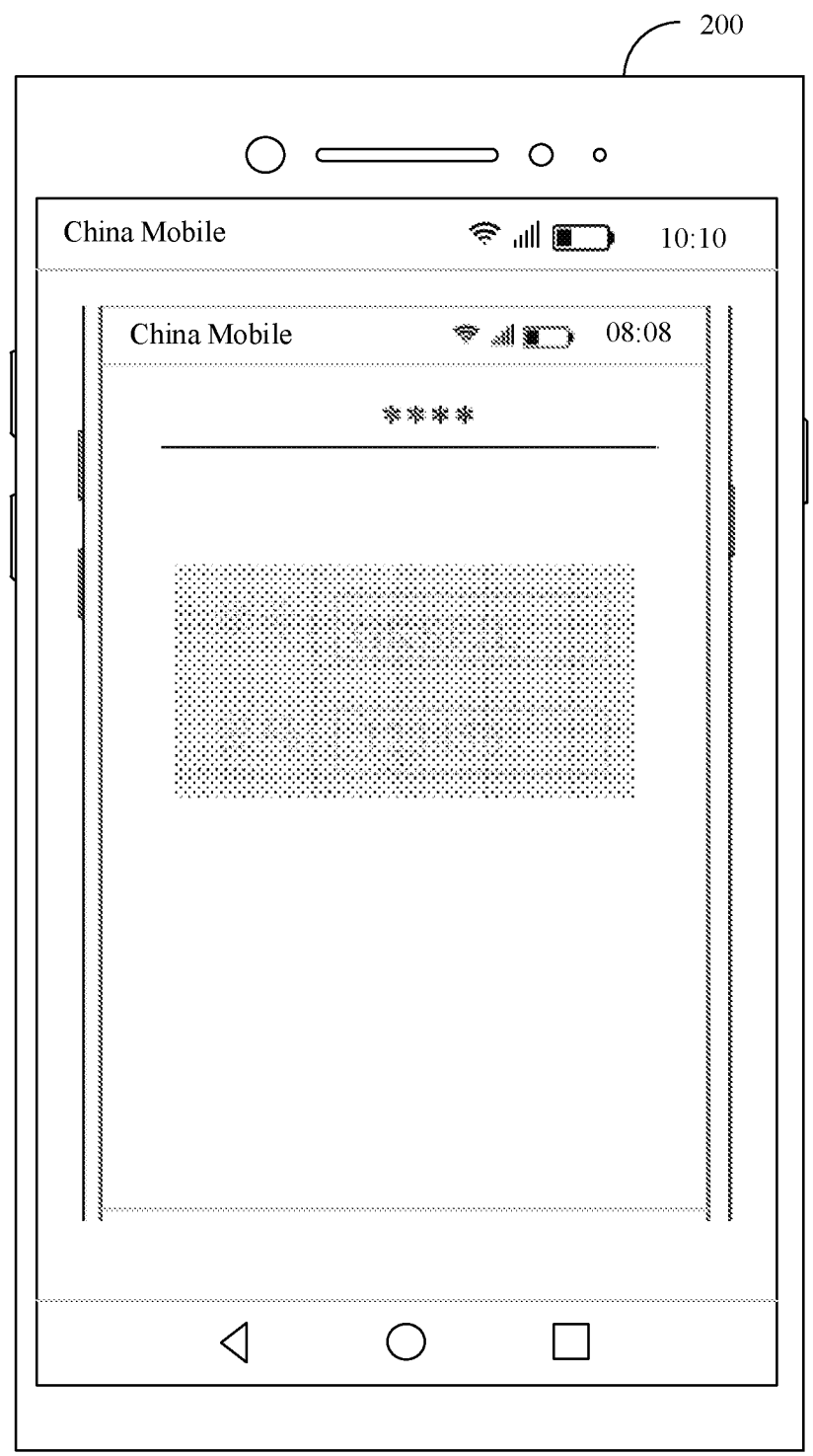
FIG. 19A is a schematic diagram 9 of an example of a display screen according to an embodiment of this application.

For example, a display screen that is displayed by the mobile phone 100 and shown in FIG. 2 and that includes a password input box is used as an example. After the mobile phone 100 performs the image display method provided in this embodiment of this application, if a mobile phone 200 photographs the display screen that is displayed by the mobile phone 100 and shown in FIG. 2, a captured picture shown in FIG. 19A may be obtained.

According to the image display method provided in this embodiment of this application, the terminal may determine the at least one sensitive area of the second image, then generate, for each sensitive area, N (N is an integer greater than or equal to 2) frames of noise-added sub-images based on an image of the sensitive area, and finally output the N frames of first noise-added sub-images frame by frame in the sensitive area by using the second frame rate (the second frame rate is N times an original output frame rate) and the second screen refresh rate (the second screen refresh rate is N times an original screen refresh rate). In this way, the image of the sensitive area may be divided into the N frames of first noise-added sub-images and output frame by frame, and a secret photography device photographs a noise-added sub-image when secretly photographing a screen of the terminal. This can reduce a possibility of leakage of displayed content on the terminal, and effectively protect the displayed content on the terminal.

In addition, a sum of noise parameters used by the terminal to perform noise addition processing on the sensitive area is zero. In this way, it can be ensured that an average value of pixel values of pixels in the N frames of noise-added sub-images after noise addition is the same as a pixel value of the pixel before noise addition processing. In this way, based on a low-pass effect of human vision, human eyes cannot perceive a difference between an image obtained after noise addition processing and an image existing before noise addition processing, so that it can be ensured that the image obtained after noise addition processing and the image existing before noise addition processing are the same from a perspective of human eyes, and visual experience of a user can be ensured. In other words, according to the method provided in this embodiment of this application, a possibility of leakage of displayed content on the terminal can be reduced and the displayed content on the terminal can be effectively protected while visual experience of the user is ensured.

In addition, when the second image includes a plurality of sensitive areas, the terminal may perform different noise addition processing on different sensitive areas (for example, quantities N of frames of noise-added sub-images obtained by performing noise addition processing on different sensitive areas are different, and noise parameters used to perform noise addition processing on different sensitive areas are different). In other words, the terminal may perform noise addition processing of different degrees on different sensitive areas.

Figure 11C:
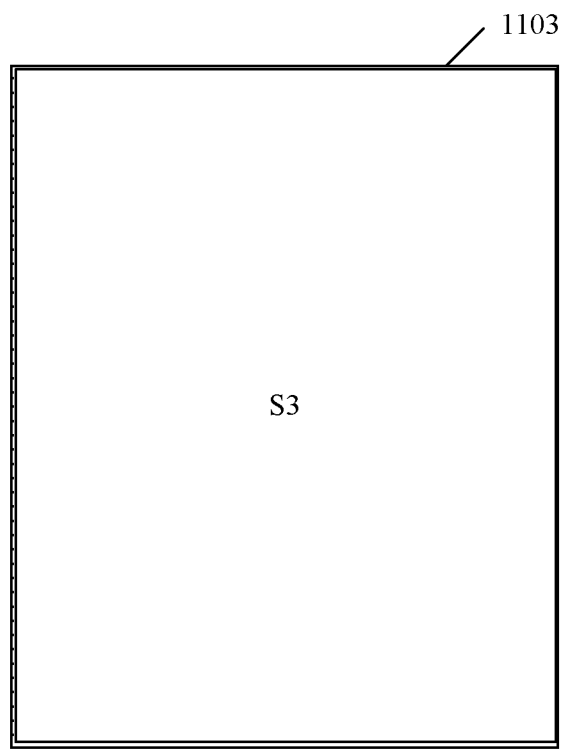

In a second application scenario of this embodiment of this application, the at least a part of the second image may be an entire area of the second image. For example, at least a part of a second image 1003 shown in FIG. 11(c) is an entire area S3 of the second image 1103.

In the second application scenario, that the noise parameter is superimposed on the at least a part of the second image may be specifically: the noise parameter is superimposed on the entire area of the second image. For example, the noise parameter is superimposed on the entire area S3 shown in FIG. 11(c). That the second image includes a plurality of frames of noise-added sub-images is specifically that an image of the entire area of the second image includes a plurality of frames of noise-added sub-images (for example, N frames of noise-added sub-images). The plurality of frames of noise-added sub-images are obtained by superimposing the noise parameter on the image of the entire area of the second image.

It should be noted that, in the second application scenario, although the noise parameter is superimposed on the image of the entire area of the second image, it does not indicate that a same noise parameter is superimposed on the image of the entire area of the second image, and it does not indicate that the entire area of the second image includes a sensitive feature.

A partial area in the second image may include a sensitive feature, and an area other than the partial area may include no sensitive feature. In this case, although the noise parameter is superimposed on the image of the entire area (which includes the area including the sensitive feature and the area including no sensitive feature) of the second image, a noise parameter superimposed on an image of the area including the sensitive feature is different from a noise parameter superimposed on an image of the area including no sensitive feature. Specifically, compared with that of noise parameters superimposed on the area including the sensitive feature, a fluctuation of noise parameters superimposed on the area including no sensitive feature is smaller. A larger fluctuation of noise parameters indicates a higher scrambling degree of an image on which the noise parameters are superimposed. Therefore, a noise addition degree of the image of the area including the sensitive feature is higher than a noise addition degree of the image of the area including no sensitive feature.

Figure 19B:
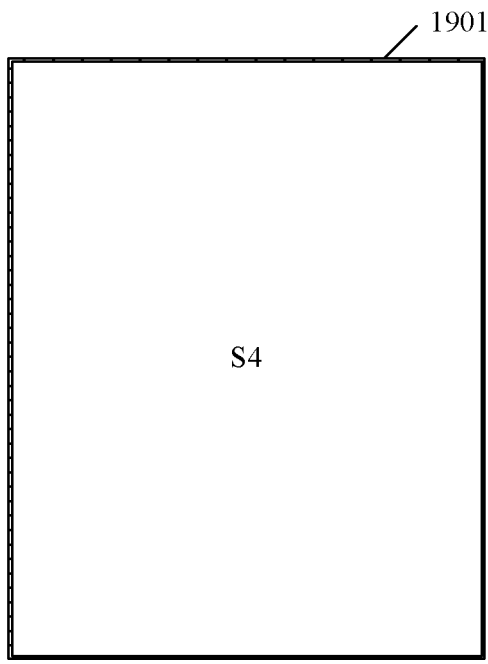
FIG. 19B(a) to FIG. 19B(c) are a schematic diagram of a noise addition principle of a second screen according to an embodiment of this application.
Figure 19B:
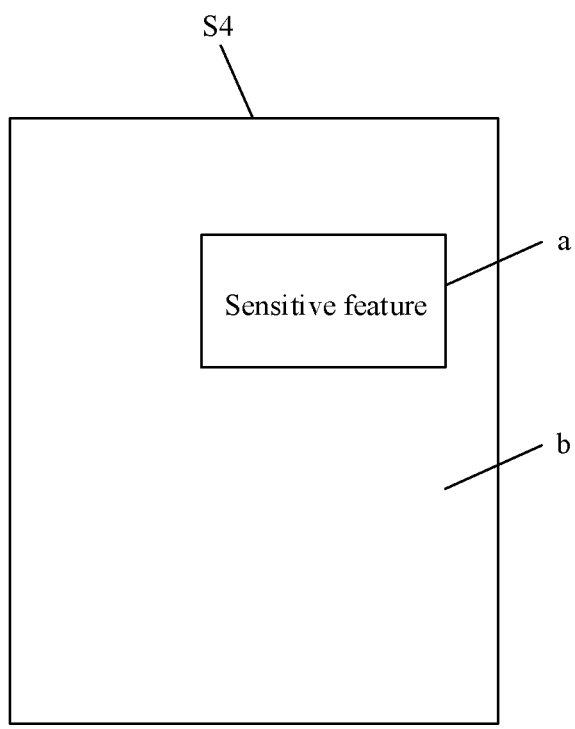
Figure 19B:
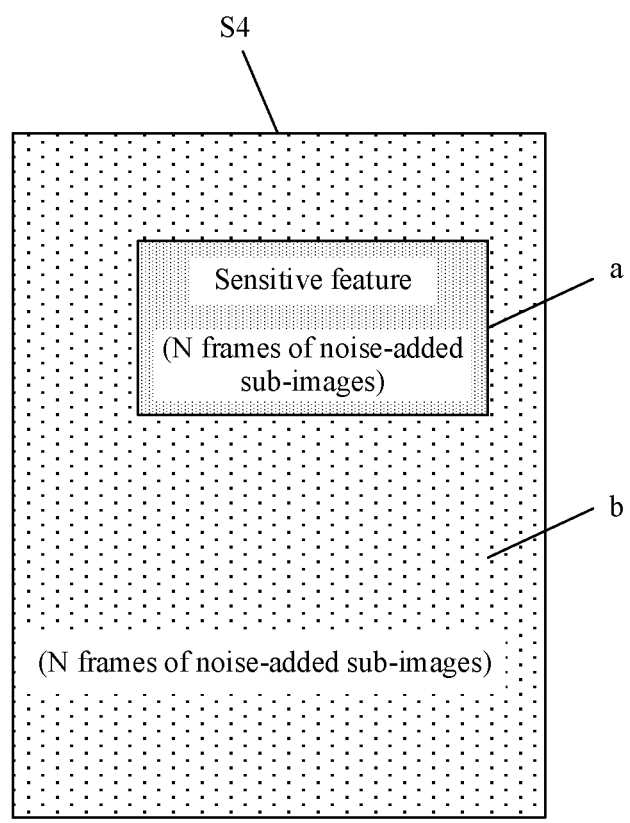

For example, as shown in FIG. 19B(a), it is assumed that at least a part of a second image 1901 is an entire area S4 of the second image 1901. That a noise parameter is superimposed on an image of the entire area S4 of the second image 1901 does not indicate that the entire area S4 includes a sensitive feature. For example, as shown in FIG. 19B(b), in the entire area S4, only a partial area a includes a sensitive feature, and an area b other than the partial area a includes no sensitive feature. In this case, although the terminal may superimpose the noise parameter on the image of the entire area S4, a noise parameter superimposed on an image of the partial area a including the sensitive feature is different from a noise parameter superimposed on an image of the other area b including no sensitive feature. In other words, the terminal may perform noise addition processing of different degrees on the image of the partial area a including the sensitive feature and the image of the other area b including no sensitive feature. A noise addition degree of the image of the partial area a including the sensitive feature is higher than a noise addition degree of the image of the other area b including no sensitive feature. For example, as shown in FIG. 19B(c), relatively dense black dots are used to represent the noise addition degree of the image of the partial area a including the sensitive feature, and relatively sparse black dots are used to represent the noise addition degree of the image of the other area b including no sensitive feature.

A screen refresh rate and a frame rate of the partial area a including the sensitive feature are the same as those of the other area b including no sensitive feature. As shown in FIG. 19B(c), the partial area a including the sensitive feature and the other area b including no sensitive feature each display N frames of noise-added sub-images.

Certainly, the entire area of the second image may include the sensitive feature. For example, when the second image is an image of a private document, the entire area of the second image includes the sensitive feature. In this case, a same noise parameter is superimposed on the image of the entire area of the second image.

In the second application scenario, regardless of whether the partial area in the second image includes the sensitive feature or the entire area of the second image includes the sensitive feature, the entire area of the second image is displayed at the second screen refresh rate, and an output frame rate of the entire area of the second image is the second frame rate. However, when the partial area in the second image includes the sensitive feature, a noise addition degree of an image of the area including the sensitive feature is different from that of an image of the area including no sensitive feature, in other words, a noise parameter superimposed on the image of the area including the sensitive feature is different from that superimposed on the image of the area including no sensitive feature.

It should be noted that, in the second application scenario, for a method for displaying the second image by the terminal at the second screen refresh rate, refer to descriptions of related method steps in FIG. 15D in this embodiment of this application. Details are not described herein again in this embodiment of this application.

Optionally, in an implementation of this embodiment of this application, after segmenting the second image into the M sub-areas, the terminal may set a same N for all the M sub-areas. In other words, for each of the M sub-areas, the terminal may generate N frames of noise-added sub-images of the sub-area based on an image (namely, a sensitive area) of the sub-area.

A difference lies in that sensitivity degrees of different sub-areas in the M sub-areas may be different. Therefore, the terminal may use different noise parameters when generating N frames of noise-added sub-images for different sub-areas. In other words, a fluctuation of N noise parameters used in each sub-area is directly proportional to a sensitivity degree of the sub-area. After identifying the images of the M sub-areas to extract the image feature of each sub-area, for each sub-area, the terminal may determine a sensitivity degree of the sub-area based on an image feature of the sub-area, a pre-stored sensitive feature, and a sensitivity degree of the sensitive feature, and then select a group of noise parameters for the corresponding sub-area based on the sensitivity degree of the sub-area.

In this implementation, because the terminal generates N frames of noise-added sub-images for each sub-area of the second image, the terminal may output the N frames of noise-added sub-images of each sub-area frame by frame by using the second frame rate and the second screen refresh rate. In other words, for the entire area of the second image, a same output frame rate is used when the terminal displays the second image, and a same screen refresh rate is used when the terminal displays the second image.

It may be understood that, even if a secret photography device continuously photographs a plurality of frames of images displayed on the screen of the terminal, for example, the secret photography device shoots a video on the screen of the terminal, the secret photography device still cannot restore, based on the plurality of frames of images that are secretly photographed, an image existing before noise addition processing. A reason is as follows: When the device photographs an image, there may be two scanning manners: interlaced scanning and progressive scanning. If these two scanning manners are used to photograph an image displayed in the display method provided in this embodiment of this application, an obtained image is a garbled image obtained after noise addition processing.

Specifically, the interlaced scanning means that when an image is captured, the image is scanned twice. An odd-numbered row is first scanned, and then an even-numbered row is scanned. The two times of scanning are combined to form a complete image (namely, one frame of image).

Figure 20A:
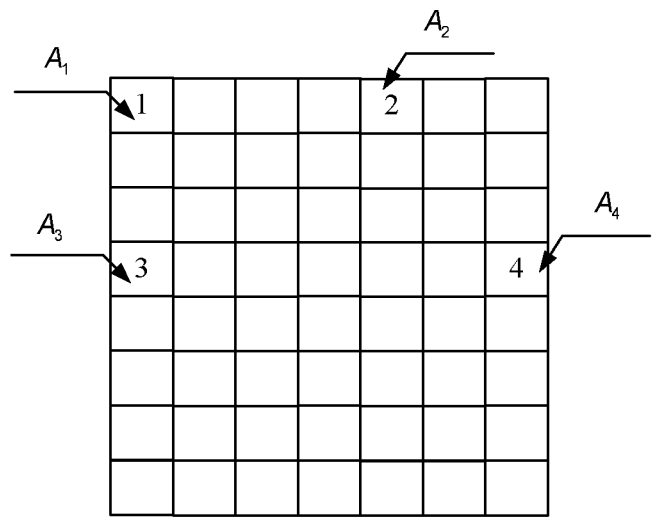
FIG. 20(a) to FIG. 20(c) are a schematic diagram 1 of an image photographing principle according to an embodiment of this application.

For example, the sensitive area includes a plurality of pixels shown in FIG. 20(a). As shown in FIG. 20(a), a pixel value of a pixel 1 is $A_1$, a pixel value of a pixel 2 is $A_2$, a pixel value of a pixel 3 is $A_3$, and a pixel value of a pixel 4 is $A_4$.

Figure 20B:
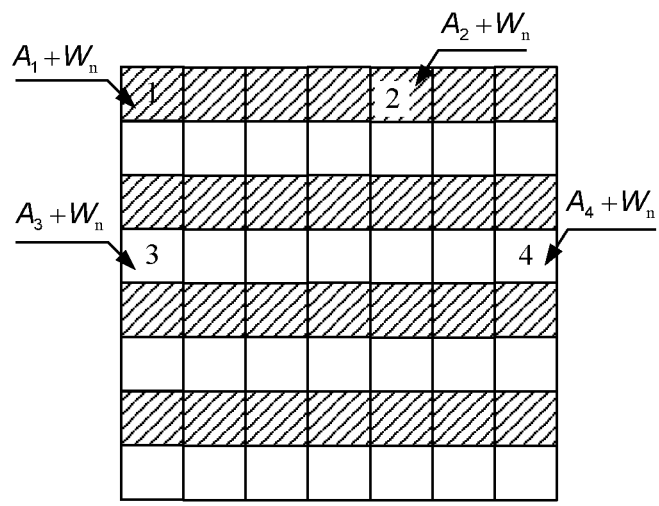

When a secret photography device scans an odd-numbered row filled with slashes in FIG. 20(b), the terminal may display the $n^{th}$ frame of noise-added sub-image in the sensitive area. In the $n^{th}$ frame of noise-added sub-image, a pixel value of the pixel 1 is $A_1+W_n$, a pixel value of the pixel 2 is $A_2+W_n$, a pixel value of the pixel 3 is $A_3+W_n$, and a pixel value of the pixel 4 is $A_4+W_n$. In this case, the secret photography device cannot scan an even-numbered row of the $n^{th}$ frame of noise-added sub-image. In other words, in the pixel 1 to the pixel 4, the secret photography device can obtain only the pixel value $A_1+W_n$ of the pixel 1 and the pixel value $A_2+W_n$ of the pixel 2 through scanning, but cannot obtain the pixel value $A_3+W_n$ of the pixel 3 and the pixel value $A_4+W_n$ of the pixel 4 through scanning.

Figure 20C:
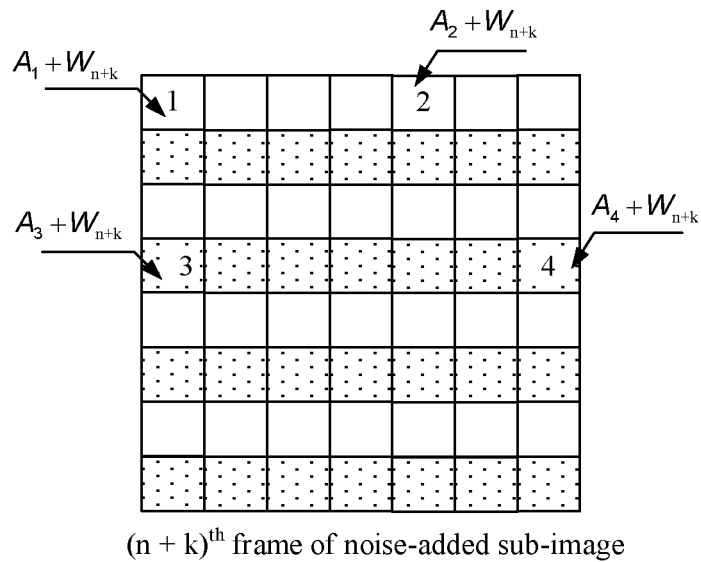

When a secret photography device scans an even-numbered row filled with black dots in FIG. 20(c), the terminal may display the $(n+k)^{th}$ frame of noise-added sub-image in the sensitive area. In the $(n+k)^{th}$ frame of noise-added sub-image, a pixel value of the pixel 1 is $A_1+W_{n+k}$, a pixel value of the pixel 2 is $A_2+W_{n+k}$, a pixel value of the pixel 3 is $A_3+W_{n+k}$, and a pixel value of the pixel 4 is $A_4+W_{n+k}$. In this case, the secret photography device cannot scan an odd-numbered row of the $(n+k)^{th}$ frame of noise-added sub-image. In other words, in the pixel 1 to the pixel 4, the secret photography device can obtain only the pixel value $A_3+W_{n+k}$ of the pixel 3 and the pixel value $A_4+W_{n+k}$ of the pixel 4 through scanning, but cannot obtain the pixel value $A_1+W_{n+k}$ of the pixel 1 and the pixel value $A_2+W_{n+k}$ of the pixel 2 through scanning.

Figure 21:
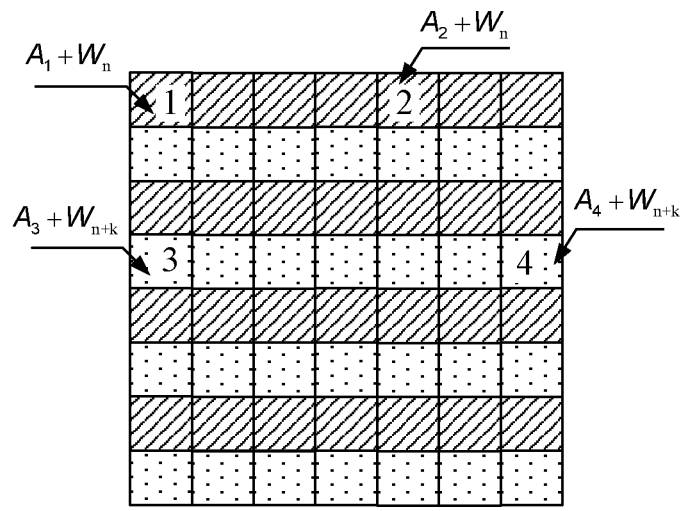
FIG. 21 is a schematic diagram 2 of an image photographing principle according to an embodiment of this application.

The secret photography device may perform one or more times of even-numbered row scanning and one or more times of odd-numbered row scanning on N frames of noise-added sub-images of one frame of image. An example in which the secret photography device performs even-numbered row scanning once and odd-numbered row scanning once on N frames of noise-added sub-images of one frame of image is used. For this frame of image, the secret photography device may obtain, through scanning, odd-numbered row pixel information that is of the sensitive area and that includes a pixel value $A_1+W_{n+k}$ of the pixel 1 and a pixel value $A_2+W_{n+k}$ of the pixel 2, and obtain, through scanning, even-numbered row pixel information that is of the sensitive area and that includes a pixel value $A_3+W_{n+k}$ of the pixel 3 and a pixel value $A_4+W_{n+k}$ of the pixel 4; and then combine the information obtained through scanning to obtain an image shown in FIG. 21. As shown in FIG. 21, a noise addition parameter used for a pixel in an odd-numbered row is different from that used for a pixel in an even-numbered row. Therefore, compared with the image of the sensitive area before noise addition processing, the image that is of the sensitive area and that is obtained after the combination is garbled.

The progressive scanning is a manner in which scanning is sequentially performed row by row. When a secret photography device photographs the screen of the terminal in this embodiment of this application in a progressive scanning manner, the following problem may exist: When the secret photography device scans the $m^{th}$ row, the terminal displays the $n^{th}$ frame of noise-added sub-image in the sensitive area. When the secret photography device scans the $(m+1)^{th}$ the terminal displays the $(n+1)^{th}$ frame of noise-added sub-image in the sensitive area. It can be learned that, for pixels in different rows, different noise addition parameters are used for pixel values, of the pixels, scanned by the secret photography device. Therefore, compared with the image of the sensitive area before noise addition processing, an image that is of the sensitive area and that is obtained by combining scanning results in a plurality of rows is garbled.

It can be learned that, when the terminal displays an image according to the method provided in this embodiment of this application, even if the secret photography device shoots a video on the screen of the terminal, the secret photography device photographs a garbled image when secretly photographing the screen of the terminal. This can reduce a possibility of leakage of displayed content on the terminal, and can effectively protect the displayed content on the terminal.

It can be understood that, to implement the foregoing functions, the terminal includes corresponding hardware structures and/or software modules for performing the functions. A person skilled in the art should easily be aware that, in combination with the examples described in the embodiments disclosed in this specification, units and algorithm steps can be implemented by hardware or a combination of hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the terminal may be divided into function modules based on the foregoing method examples. For example, function modules corresponding to various functions are obtained through division, or two or more functions may be integrated into one processing module. The integrated module may be implemented in a form of hardware, or may be implemented in a form of a software function module. It should be noted that, in the embodiments of this application, division into modules is an example, and is merely logical function division. In actual implementation, there may be another division manner.

Figure 22:
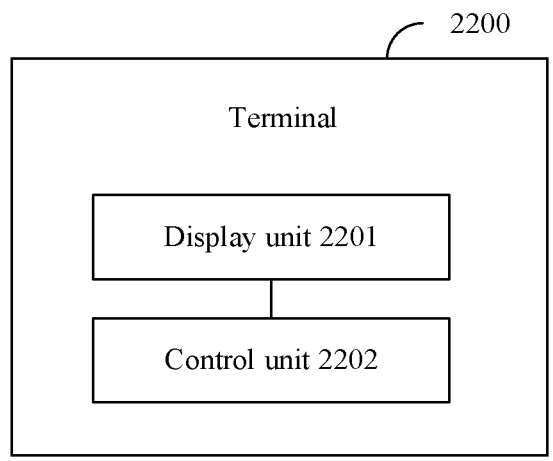
FIG. 22 is a schematic diagram 1 of a structural composition of a terminal according to an embodiment of this application.

When each function module is obtained through division based on each corresponding function, as shown in FIG. 22, an embodiment of this application provides a terminal 2200. The terminal 2200 includes a display unit 2201 and a control unit 2202.

The display unit 2201 is configured to support the terminal 2200 in performing display actions in S701 and S702 in the foregoing method embodiment, S1203, S1204, S1502, and/or another process used for the technology described in this specification. The control unit 2202 is configured to: support the terminal 2200 in controlling the display unit 2201 to display an image, and support the terminal 2200 in performing a detection action in S702 in the foregoing method embodiment, actions of entering a noise addition mode in S702a to S702d and S1201, an action of determining a sensitive area in S1201, S1201a and S1201b, S1201c to S1201e, and/or another process used for the technology described in this specification.

Further, the terminal 2200 may further include a generation unit. The generation unit is configured to support the terminal 2200 in performing S1202 and S1501 in the foregoing method embodiment, and/or another process used for the technology described in this specification.

Certainly, the terminal 2200 may further include another unit module. For example, the terminal 2200 may further include a storage unit and a transceiver unit. The terminal 2200 may interact with another device by using the transceiver unit. For example, the terminal 2200 may send an image file to another device by using the transceiver unit, or receive, by using the transceiver unit, an image file sent by another device. The storage unit is configured to store data, such as a sensitive feature.

When an integrated unit is used, the control unit 2202, the generation unit, and the like may be integrated into one processing module for implementation. The transceiver unit may be an RF circuit, a Wi-Fi module, or a Bluetooth module of the terminal 2200. The storage unit may be a storage module of the terminal 2200. The display unit 2201 may be a display module such as a display (a touchscreen).

Figure 23:
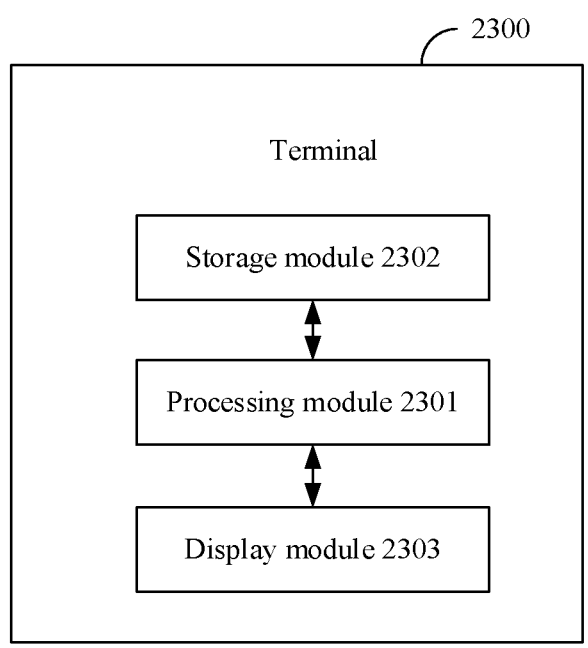
FIG. 23 is a schematic diagram 2 of a structural composition of a terminal according to an embodiment of this application.

FIG. 23 is a schematic diagram of a possible structure of the terminal in the foregoing embodiments. The terminal 2300 includes a processing module 2301, a storage module 2302, and a display module 2303.

The processing module 2301 is configured to control and manage the terminal 2300. The display module 2303 is configured to display an image. The storage module 2302 is configured to store program code and data of the terminal 2300, and a plurality of sensitive features and sensitivity degrees thereof. The terminal 2300 may further include a communications module, and the communications module is configured to communicate with another device. For example, the communications module is configured to: receive a message or an image file sent by another device or send a message or an image file to another device.

The processing module 2301 may be a processor or a controller, and for example, may include a CPU and a GPU, a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of a DSP and a microprocessor. The communications module 2304 may be a transceiver, a transceiver circuit, a communications interface, or the like. The storage module 2302 may be a memory.

When the processing module 2301 is a processor (such as the processor 101 shown in FIG. 1), the communications module is a radio frequency circuit (such as the radio frequency circuit 102 shown in FIG. 1), the storage module 2302 is a memory (such as the memory 103 shown in FIG. 1), and the display module 2303 is a touchscreen (including the touchpad 104-1 and the display 104-2 shown in FIG. 1), the device provided in this application may be the mobile phone 100 shown in FIG. 1. The communications module 2304 may include a radio frequency circuit, and may further include a Wi-Fi module and a Bluetooth module. The communications modules such as the radio frequency circuit, the Wi-Fi module, and the Bluetooth module may be collectively referred to as a communications interface. The processor, the communications interface, the touchscreen, and the memory may be coupled together by using a bus.

An embodiment of this application further provides a control device, including a processor and a memory. The memory is configured to store computer program code, the computer program code includes a computer instruction, and when executing the computer instruction, the processor performs the image display method according to the foregoing method embodiment. The control device may be a control chip.

An embodiment of this application further provides a computer storage medium. The computer storage medium stores computer program code. When the processor executes the computer program code, a device performs related method steps in any one of FIG. 7, FIG. 9, and FIG. 12 to implement the method in the foregoing embodiment.

An embodiment of this application further provides a computer program product. When the computer program product is run on a computer, the computer is enabled to perform related method steps in any one of FIG. 7, FIG. 9, and FIG. 12 to implement the method in the foregoing embodiment.

The terminal 2200, the terminal 2300, the control device, the computer storage medium, and the computer program product provided in this application are all configured to perform corresponding methods provided above. Therefore, for beneficial effects that can be achieved by the terminal 2200, the terminal 2300, the control device, the computer storage medium, and the computer program product, refer to the beneficial effects of the corresponding methods provided above. Details are not described herein again.

The foregoing descriptions about implementations allow a person skilled in the art to clearly understand that, for the purpose of convenient and brief description, only division into the foregoing function modules is taken as an example for illustration. In actual application, the foregoing functions can be allocated to different function modules for implementation based on a requirement. To be specific, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the division into the modules or units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image display method implemented by a terminal, comprising:
   displaying a first image at a first screen refresh rate on a display of the terminal, wherein an output frame rate of the first image is a first frame rate;
   detecting that a preset condition is met;
   superimposing a first noise parameter on a sensitive area of a second image, wherein the second image comprises a plurality of frames of noise-added sub-images;
   displaying the second image on the display, wherein the sensitive area is displayed at a second screen refresh rate, wherein an output frame rate of the sensitive area is a second frame rate, wherein the second frame rate is higher than the first frame rate, and wherein the second screen refresh rate is higher than the first screen refresh rate;
   generating N frames of first noise-added sub-images based on an image of the sensitive area and using a second noise parameter, wherein N is an integer greater than or equal to two; and
   displaying the N frames of first noise-added sub-images in the sensitive area at the second screen refresh rate, wherein an output frame rate of the N frames of first noise-added sub-images is the second frame rate, wherein the second frame rate is N times the first frame rate, and wherein the second screen refresh rate is N times the first screen refresh rate.

2. The image display method of claim 1, further comprising:
   obtaining an operation of enabling a noise addition option; and
   entering, in response to the operation, a noise addition mode before displaying the second image on the display.

3. The image display method of claim 1, further comprising entering a noise addition mode before displaying the second image on the display when the second image comprises a sensitive feature, wherein the sensitive feature comprises at least one of a preset control, a currency symbol, or a preset text, wherein the preset control comprises at least one of a password input box, a user name input box, or an identity card number input box, and wherein the preset text comprises at least one of a balance, a password, a salary, or an account.

4. The image display method of claim 1, further comprising:
   displaying a screen of an application of a preset type, wherein the application comprises at least one of a bank-type application, a payment-type application, or a communication-type application; and
   entering, in response to displaying the screen of the application, a noise addition mode.

5. The image display method of claim 4, further comprising:
   generating N1 frames of first noise-added sub-images based on the image when an amount of remaining electricity of the terminal is greater than or equal to a first threshold; and
   generating N2 frames of first noise-added sub-images based on the image when the amount of remaining electricity of the terminal is less than the first threshold, wherein N1>N2.

6. The image display method of claim 4, further comprising:
   determining a sensitivity degree of the sensitive area based on a sensitive feature of the sensitive area; and
   generating the N frames of first noise-added sub-images based on the sensitivity degree, wherein a plurality of sensitive areas comprising different sensitive features have different sensitivity degrees.

7. The image display method of claim 4, further comprising displaying an insensitive area of the second image at the first screen refresh rate, wherein the insensitive area is an area other than the sensitive area in the second image, and wherein the output frame rate of the insensitive area is the first frame rate.

8. The image display method of claim 7, further comprising:
   generating N frames of second noise-added sub-images based on an image of the insensitive area and using a third noise parameter, wherein the third noise parameter is different from the second noise parameter; and
   displaying the N frames of second noise-added sub-images in the insensitive area at the second screen refresh rate, wherein an output frame rate of the N frames of second noise-added sub-images is the second frame rate, wherein the second frame rate is N times the first frame rate, and wherein the second screen refresh rate is N times the first screen refresh rate.

9. An electronic device comprising:
   a display;
   a non-transitory memory configured to store instructions; and
   a processor coupled to the non-transitory memory and the display, wherein the instructions cause the processor to be configured to:
   display a first image at a first screen refresh rate on the display, wherein an output frame rate of the first image is a first frame rate;
   detect that a preset condition is met;
   superimpose a first noise parameter on a sensitive area of a second image, wherein the second image comprises a plurality of frames of noise-added sub-images;
   display the second image on the display, wherein the sensitive area is displayed at a second screen refresh rate, wherein an output frame rate of the sensitive area is a second frame rate, wherein the second frame rate is higher than the first frame rate, and wherein the second screen refresh rate is higher than the first screen refresh rate;
   generate N frames of first noise-added sub-images based on an image of the sensitive area using a second noise parameter, wherein N is an integer greater than or equal to two; and
   display the N frames of first noise-added sub-images in the sensitive area at the second screen refresh rate, wherein an output frame rate of the N frames of first noise-added sub-images is the second frame rate, wherein the second frame rate is N times the first frame rate, and wherein the second screen refresh rate is N times the first screen refresh rate.

10. The electronic device of claim 9, wherein the instructions further cause the processor to be configured to:

obtain an operation of enabling a noise addition option; and enter, in response to the operation, a noise addition mode.

11. The electronic device of claim 9, wherein the instructions further cause the processor to be configured to enter a noise addition mode when the second image comprises a sensitive feature, wherein the sensitive feature comprises at least one of a preset control, a currency symbol, or a preset text, wherein the preset control comprises at least one of a password input box, a user name input box, or an identity card number input box, and wherein the preset text comprises at least one of a balance, a password, a salary, or an account.

12. The electronic device of claim 9, wherein the instructions further cause the processor to be configured to:

display a screen of an application of a preset type, wherein the application of the preset type comprises at least one of a bank-type application, a payment-type application, or a communication-type application; and enter, in response to displaying the screen of the application of the preset type, a noise addition mode.

13. The electronic device of claim 9, wherein the instructions further cause the processor to be configured to:

generate N1 frames of first noise-added sub-images based on the image of the sensitive area when an amount of remaining electricity of the electronic device is greater than or equal to a first threshold; and generate N2 frames of first noise-added sub-images based on the image of the sensitive area when the amount of remaining electricity of the electronic device is less than the first threshold, wherein N1>N2.

14. The electronic device of claim 9, wherein the instructions further cause the processor to be configured to:

determine a sensitivity degree of the sensitive area based on a sensitive feature of the sensitive area; and generate the N frames of first noise-added sub-images based on the sensitivity degree, wherein a plurality of sensitive areas comprising different sensitive features has different sensitivity degrees.

15. The electronic device of claim 9, wherein the instructions further cause the processor to be configured to display an insensitive area of the second image at the first screen refresh rate, wherein the output frame rate of the insensitive area is the first frame rate, and wherein the insensitive area is an area other than the sensitive area in the second image.

16. The electronic device of claim 15, wherein the instructions further cause the processor to be configured to:

generate N frames of second noise-added sub-images based on the image of the insensitive area using a third noise parameter, wherein the third noise parameter is different from the second noise parameter; and display the N frames of second noise-added sub-images in the insensitive area at the second screen refresh rate, wherein an output frame rate of the N frames of second noise-added sub-images is the second frame rate, wherein the second frame rate is N times the first frame rate, and wherein the second screen refresh rate is N times the first screen refresh rate.

17. A computer program product comprising computer-executable instructions stored on a non-transitory computer readable medium that, when executed by a processor, cause an apparatus to:

display a first image at a first screen refresh rate on a display of the apparatus, wherein an output frame rate of the first image is a first frame rate;

detect that a preset condition is met;

superimpose a first noise parameter on a sensitive area of a second image, wherein the second image comprises a plurality of frames of noise-added sub-images;

display the second image on the display, wherein the sensitive area is displayed at a second screen refresh rate, wherein an output frame rate of the sensitive area is a second frame rate, wherein the second frame rate is higher than the first frame rate, and wherein the second screen refresh rate is higher than the first screen refresh rate;

generate N frames of first noise-added sub-images based on an image of the sensitive area, wherein N is an integer greater than or equal to two; and display the N frames of first noise-added sub-images in the sensitive area at the second screen refresh rate, wherein an output frame rate of the N frames of first noise-added sub-images is the second frame rate, wherein the second frame rate is N times the first frame rate, and wherein the second screen refresh rate is N times the first screen refresh rate.

18. The computer program product of claim 17, wherein the processor further executes the instructions to cause the apparatus to:

obtain an operation of enabling a noise addition option; and enter, in response to the operation, a noise addition mode before displaying the second image on the display.

19. The computer program product of claim 17, wherein the processor further executes the instructions to cause the apparatus to enter a noise addition mode before displaying the second image on the display when the second image comprises a sensitive feature, wherein the sensitive feature comprises at least one of a preset control, a currency symbol, or a preset text, wherein the preset control comprises at least one of a password input box, a user name input box, or an identity card number input box, and wherein the preset text comprises at least one of a balance, a password, a salary, or an account.

20. The computer program product of claim 17, wherein the processor further executes the instructions to cause the apparatus to:

display a screen of an application of a preset type, wherein the application comprises at least one of a bank-type application, a payment-type application, or a communication-type application; and enter, in response to displaying the screen of the application, a noise addition mode.

* * * * *